(12) United States Patent
Tiesler et al.

(10) Patent No.: US 7,140,997 B2
(45) Date of Patent: Nov. 28, 2006

(54) MULTI-STAGE AUTOMATIC TRANSMISSION WITH THREE PLANETARY GEARWHEEL ASSEMBLIES

(75) Inventors: Peter Tiesler, Meckenbeuren (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/631,504

(22) Filed: Jul. 31, 2003

(65) Prior Publication Data

US 2005/0026742 A1 Feb. 3, 2005

(51) Int. Cl.
*F16H 3/62* (2006.01)
*F16H 3/44* (2006.01)
*F16D 11/06* (2006.01)

(52) U.S. Cl. .................... 475/278; 475/280; 192/87.16
(58) Field of Classification Search .............. 475/275, 475/278, 284, 288, 280; 192/87.11, 87.15–16
See application file for complete search history.

(56) References Cited

U.S. PATENT DOCUMENTS

| | | | |
|---|---|---|---|
| 3,744,606 A * | 7/1973 | Bucksch | 192/87.11 |
| 3,776,066 A | 12/1973 | Piret | |
| 3,977,272 A | 8/1976 | Neumann | |
| 4,010,833 A * | 3/1977 | Brendel et al. | 192/87.11 |
| 4,070,927 A | 1/1978 | Polak | |
| 4,395,925 A | 8/1983 | Gaus | |
| 4,732,253 A | 3/1988 | Hiramatsu et al. | |
| 4,939,955 A | 7/1990 | Sugano | |
| 5,106,352 A | 4/1992 | Lepelletier | |
| 5,232,411 A | 8/1993 | Hayashi et al. | |
| 5,250,011 A | 10/1993 | Pierce | |
| 5,295,924 A | 3/1994 | Beim | |
| 5,308,295 A | 5/1994 | Michioka et al. | |
| 5,435,792 A | 7/1995 | Justice et al. | |
| 5,439,088 A | 8/1995 | Michioka et al. | |
| 5,460,579 A | 10/1995 | Kappel et al. | |
| 5,520,588 A | 5/1996 | Hall, III | |
| 5,533,945 A | 7/1996 | Martin et al. | |
| 5,536,220 A | 7/1996 | Martin | |
| 5,542,889 A | 8/1996 | Pierce et al. | |
| 5,647,816 A * | 7/1997 | Michioka et al. | 475/285 |
| 5,735,376 A | 4/1998 | Moroto et al. | |
| 6,139,463 A | 10/2000 | Kasuya et al. | |
| 6,471,616 B1 | 10/2002 | Stevenson | |
| 6,517,463 B1 * | 2/2003 | Sugiura et al. | 475/287 |
| 6,558,287 B1 | 5/2003 | Hayabuchi et al. | |
| 6,572,507 B1 | 6/2003 | Korkmaz et al. | |
| 6,634,980 B1 | 10/2003 | Ziemer | |

(Continued)

FOREIGN PATENT DOCUMENTS

DE 26 19 895 11/1976

(Continued)

*Primary Examiner*—Roger Pang
(74) *Attorney, Agent, or Firm*—Davis & Bujold, P.L.L.C.

(57) ABSTRACT

A multi-stage automatic transmission comprises a drive input shaft (AN), a drive output shaft (AB), three planetary gearwheel assemblies (RS1, RS2, RS3) arranged next to one another in series and five shift control elements (A to E). A sun gearwheel (SO3) of the third planetary gearwheel assembly (RS3) can be fixed relative to a transmission housing (GG) via the first shift control element (A). The drive input shaft (AN) is connected to a sun gearwheel (SO2) of the second planetary gearwheel assembly (RS2) and can be connected via the second shift control element (B) to a sun gearwheel (SO1) of the first planetary gearwheel assembly (RS1) and via the fifth shift control element (E) to a web (ST1) of the first planetary gearwheel assembly (RS1).

50 Claims, 19 Drawing Sheets

U.S. PATENT DOCUMENTS

| | | |
|---|---|---|
| 6,679,802 B1 * | 1/2004 | Raghavan et al. .......... 475/276 |
| 6,723,018 B1 | 4/2004 | Hayabuchi et al. |
| 2002/0091032 A1 | 7/2002 | Hayabuchi et al. |
| 2002/0183160 A1 | 12/2002 | Kao et al. |
| 2003/0060322 A1 | 3/2003 | Raghavan et al. |
| 2003/0083174 A1 | 5/2003 | Tabata et al. |
| 2003/0119623 A1 | 6/2003 | Stevenson et al. |
| 2003/0162625 A1 | 8/2003 | Raghavan et al. |
| 2004/0092357 A1 | 5/2004 | Biermann |
| 2004/0097324 A1 | 5/2004 | Ziemer |
| 2004/0116238 A1 | 6/2004 | Ziemer |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 195 24 698 A1 | 2/1996 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 199 49 507 A1 | 4/2001 |
| DE | 696 16 117 T2 | 7/2002 |
| DE | 102 00 379 A1 | 8/2002 |
| DE | 102 06 145 A1 | 9/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| EP | 0 434 525 A1 | 6/1991 |
| EP | 0 605 953 A1 | 7/1994 |
| EP | 0 719 961 A2 | 7/1996 |
| EP | 1 265 006 A2 | 12/2002 |
| JP | 4290649 | 10/1992 |
| JP | 08200456 | 8/1996 |
| JP | 10259861 A | 9/1998 |
| JP | 2000240741 | 9/2000 |
| JP | 2001082555 | 3/2001 |
| JP | 2002323098 | 11/2002 |
| WO | WO-96/01381 | 1/1996 |

* cited by examiner

| Shifting elements Gear | A | B | E | D | C | Ratio i | Ratio steps PHI |
|---|---|---|---|---|---|---|---|
| 1 | O |   |   | O |   | 4,898 | 1,65 |
| 2 | O |   |   |   | O | 2,967 | 1,63 |
| 3 | O | O |   |   |   | 1,819 | 1,32 |
| 4 | O |   | O |   |   | 1,375 | 1,38 |
| 5 |   | O | O |   |   | 1,000 | 1,33 |
| 6 |   |   | O |   | O | 0,754 | total 6.50 |
| R |   | O |   | O |   | -3,06 |   |

Brake    Clutch

Fig. 4

MULTI-STAGE AUTOMATIC TRANSMISSION WITH THREE PLANETARY GEARWHEEL ASSEMBLIES

FIELD OF THE INVENTION

The present invention concerns a multi-stage automatic transmission with at least three individual planetary gearwheel assemblies and at least five shift control elements.

BACKGROUND OF THE INVENTION

Various automatic transmissions with several gears that can be engaged without range-change are known. For example, DE 199 12 480 A1 describes an automatic transmission of this type with three single-web planetary gearwheel assemblies and three brakes and two clutches for the engagement of six forward gears and one reverse gear, which is characterized by transmission ratios which are very appropriate for motor vehicles, with a high overall spread and suitable gear progressions and a high starting ratio in the forward direction. The individual gears are engaged by the selective closing in each case of two of the six shift control elements, so that to shift from one gear to the next gear up or down, in each case only one of the shift control elements currently actuated is opened and another shift control element is closed.

In this case a drive input shaft of the automatic transmission is permanently connected with a sun gearwheel of the second planetary gearwheel assembly. Furthermore, the drive input shaft can be connected via the first clutch to a sun gearwheel of the first planetary gearwheel assembly and/or via the second clutch to a web of the first planetary gearwheel assembly. In addition or alternatively, the sun wheel of the first planetary gearwheel assembly can be connected via the first brake to a housing of the automatic transmission and/or the web of the first planetary gearwheel assembly via the second brake to the housing and/or a sun gearwheel of the third planetary gearwheel assembly via the third brake to the housing.

For the kinematic clutch of the individual planetary gearwheel assemblies to one another, DE 199 12 480 A1 discloses two different versions. In the first version it is provided that a drive output shaft of the automatic transmission is permanently connected with a web of the third planetary gearwheel assembly and an annular gearwheel of the first planetary gearwheel assembly, and that the web of the first planetary gearwheel assembly is permanently connected with an annular gearwheel of the second planetary gearwheel assembly and a web of the second planetary gearwheel assembly is permanently connected with an annular gearwheel of the third planetary gearwheel assembly. The drive input and output shafts in this case can either be arranged coaxially with one another on opposite sides of the transmission housing, or axis-parallel to one another on the same side thereof. In the second version it is provided that the drive output shaft is connected permanently with the web of the second planetary gearwheel assembly and the annular gearwheel of the first planetary gearwheel assembly, the web of the first planetary gearwheel assembly is connected permanently with the annular gearwheel of the third planetary gearwheel assembly and the annular gearwheel of the second planetary gearwheel assembly is connected permanently with the web of the third planetary gearwheel assembly. Such a structure is particularly suitable for a coaxial arrangement of the drive input and output shafts.

In relation to the spatial arrangement of the planetary gearwheel assemblies, DE 199 12 480 A1 proposes to arrange the three planetary gearwheel assemblies coaxially in series next to one another, with the second planetary gearwheel assembly axially between the first and third planetary gearwheel assemblies. As regards the spatial arrangement of the individual shift control elements relative to one another and relative to the planetary gearwheel assemblies, DE 19912 480 A1 proposes always to arrange the first and second brakes next to one another, such that the second brake is always directly axially adjacent to the first planetary gearwheel assembly, and the third brake always on the side of the third planetary gearwheel assembly facing away from the first planetary gearwheel assembly, and the two clutches are always directly next to one another. In a first arrangement variant both clutches are arranged on the side of the first planetary gearwheel assembly facing away from the third planetary gearwheel assembly, with the first clutch directly axially adjacent to the first brake and closer to the first planetary gearwheel assembly than the second clutch. In combination with a non-coaxial position of the drive input and output shafts, in a second arrangement variant it is proposed that both clutches are arranged on the side of the third planetary gearwheel assembly facing away from the first planetary gearwheel assembly, with the second clutch closer to the third planetary gearwheel assembly than the first clutch and axially adjacent to a drive output spur gearwheel which is in active connection with the output shaft, this in turn being arranged on the side of the third brake facing away from the third planetary gearwheel assembly.

The purpose of the present invention is to provide component arrangements alternative to those of the automatic transmission known from the prior art of DE 199 12 480 A1, with the most compact possible transmission structure. Preferably, the automatic transmission should be able to be used in a motor vehicle with drive input and output shafts not arranged coaxially with one another, but, with comparatively simple modifications, possibly also when the input and output shafts are coaxial.

SUMMARY OF THE INVENTION

Beginning from the generic prior art of DE 199 12 480 A1, the multi-stage automatic transmission according to the invention comprises at least three coupled individual planetary gearwheel assemblies arranged coaxially and spatially adjacent to one another, the second planetary gearwheel assembly being arranged spatially always between the first and third planetary gearwheel assemblies. Furthermore, the automatic transmission according to the invention comprises at least five shift control elements. A sun gearwheel of the third planetary gearwheel assembly can be connected fast to a transmission housing of the automatic transmission via the first shift control element, which is formed as a brake. A drive input shaft of the automatic transmission is permanently connected to a sun gearwheel of the second planetary gearwheel assembly. In addition, the drive input shaft can be connected via the second shift control element, formed as a clutch, with a sun gearwheel of the first planetary gearwheel assembly and, additionally or alternatively, via the fifth shift control element formed as a clutch, with a web of the first planetary gearwheel assembly. Alternatively, the sun gearwheel of the first planetary gearwheel assembly can be connected fast via the third shift control element, formed as a brake, and/or the web of the first planetary gearwheel assembly via the fourth shift control element formed as a brake, to the transmission housing. Thus, if the second and fifth shift control elements are actuated simultaneously, the sun gearwheel and the web of the first planetary gearwheel assembly are connected to one another.

A drive output shaft of the multi-stage automatic transmission is permanently in active connection with an annular gearwheel of the first planetary gearwheel assembly, and the annular gearwheel of the first planetary gearwheel assembly is also permanently connected either to a web of the third planetary gearwheel assembly or to a web of the second planetary gearwheel assembly.

As in the generically similar DE 199 12 480 A1, the web of the first planetary gearwheel assembly (depending on the assembly design) is in addition connected permanently either to the annular gearwheel of the second planetary gearwheel assembly or to that of the third planetary gearwheel assembly. If the annular gearwheel of the first planetary gearwheel assembly and the web of the third planetary gearwheel assembly and the output shaft are coupled together, the web of the second planetary gearwheel assembly is permanently connected with an annular gearwheel of the third planetary gearwheel assembly and the web of the first planetary gearwheel assembly is permanently connected with an annular gearwheel of the second planetary gearwheel assembly. If the annular gearwheel of the first planetary gearwheel assembly and the web of the second planetary gearwheel assembly and the output shaft are coupled together, the web of the third planetary gearwheel assembly is permanently connected to the annular gearwheel of the second planetary gearwheel assembly and the web of the first planetary gearwheel assembly is permanently connected to the annular gearwheel of the third planetary gearwheel assembly.

According to the invention, the second shift control element, by means of which the drive input shaft can be connected to the sun gearwheel of the first planetary gearwheel assembly, and the fifth shift control element, by means of which the input shaft can be connected to the web of the first planetary gearwheel assembly, comprise together a structural group. The structural group comprises at least one disk pack for each of the second and fifth shift control elements, a common disk support for the second and fifth shift control elements to hold the outer and lining disks of the disk packs of the second and fifth shift control elements, and in each case a servo device to actuate the respective disk packs of the second or fifth shift control element. The disk support common to the second and fifth shift control elements forms a clutch space within which are arranged the disk pack and the servo device of the fifth shift control element. The servo devices of the second and fifth shift control elements each have at least one pressure space and a piston, and these two pressure spaces are separated from one another by an outer casing surface of the disk support common to the second and fifth shift control elements.

In an advantageous embodiment of the invention, the actuation directions of the servo devices of the second and fifth shift control elements when actuating their respective disk pack (i.e., when closing the respective shift control element) are opposite. The piston of the servo device of the second shift control element then has an actuating rod that acts upon the disk pack of the second shift control element, which spans radially completely across the disk pack of the second shift control element in the axial direction. In this case the pressure spaces of the servo devices of the second and fifth shift control elements are both directly adjacent to the outer casing surface of the disk support common to the second and fifth shift control elements. The pressure equalization space of the servo devices of the second and fifth shift control elements provided for the dynamic pressure compensation of the respective rotating pressure space are then arranged in each case on the side of the respective pressure space facing away from the disk support's outer casing surface.

In another advantageous embodiment of the invention, the actuation directions of the servo devices of the second and fifth shift control elements when the respective disk pack is actuated, are the same. In this case the pressure space of the servo device of the fifth shift control element and the pressure equalization space of the servo device of the second shift control element (provided for the dynamic pressure compensation of the rotating pressure space of the servo device of the second shift control element) are directly adjacent to the outer casing surface of the disk support common to the second and fifth shift control elements. The pressure space of the servo device of the second shift control element is then arranged on the side of the pressure equalization space of the servo device of the second shift control element opposite to the outer casing surface of the disk support. The pressure equalization space of the servo device of the fifth shift control element (provided for the dynamic pressure compensation of the rotating pressure space of the servo device of the fifth shift control element) is correspondingly arranged on the side of the pressure space of the fifth shift control element opposite to the outer casing surface of the disk support.

Preferably, the structural group comprising the second and fifth shift control elements is arranged close to the first planetary gearwheel assembly, at least mainly axially adjacent to the latter, and on the side of the first planetary gearwheel assembly opposite the second planetary gearwheel assembly. If it is provided that the actuation directions of the servo devices of the second and fifth shift control elements are opposite, then the servo device of the fifth shift control element will actuate the disks of the fifth shift control element axially towards the first planetary gearwheel assembly, while the servo device of the second shift control element will actuate the disks of the second shift control element axially in the direction away from the first planetary gearwheel assembly. The pressure spaces of the servo devices of the second and fifth shift control elements can therefore in this case be arranged axially directly adjacent to one another. In contrast, if it is provided that the actuation directions of the servo devices of the second and fifth shift control elements are the same, then both servo devices will actuate their respective disks axially towards the first planetary gearwheel assembly. The pressure spaces of the servo devices of the second and fifth shift control elements can then be arranged both axially next to one another and radially one over the other.

When viewed in the axial direction, the disk pack of the fifth shift control element made as a clutch is preferably arranged at least partially radially under a disk pack with outer and lining disks of the second shift control element also made as a clutch. It can also be provided, however, that the disk packs of the fifth and second shift control elements are arranged axially next to one another.

In a further embodiment of the invention, the third shift control element, by means of which the sun gearwheel of the first planetary gearwheel assembly can be fixed relative to the transmission housing, and the fourth shift control element, by means of which the web of the first planetary gearwheel assembly (and the annular gearwheel of the second or third planetary gearwheel assembly connected to that web) can be fixed relative to the transmission housing, are arranged next to one another. Viewed in the axial direction, the fourth shift control element is then preferably arranged in and area radially above the three planetary gearwheel assemblies located coaxially next to one another. The third shift control element can then, when viewed axially, also be arranged in the area radially over the three planetary gearwheel assemblies, with the third shift control element closer to the second (or fifth) shift control element than the fourth shift control element, or when viewed axially, in an area radially over the second shift control element.

In a further embodiment of the invention, the first shift control element, by means of which the sun gearwheel of the third planetary gearwheel assembly can be fixed relative to the transmission housing, is arranged on the side of the third planetary gearwheel assembly opposite to the second (or fifth) shift control element.

For the application with non-coaxial drive input and output shafts, in particular for applications with the input and output shafts arranged axis-parallel or at an angle to one another, it is proposed to arrange the first shift control element close to an outer wall of the transmission housing and to arrange spur gearing or a chain drive spatially axially between the third planetary gearwheel assembly and the first shift control element. For this, a first spur gearwheel of the spur gearing or a first chain sprocket wheel of the chain drive is then connected with the annular gearwheel of the first planetary gearwheel assembly and—depending on the design of the planetary gearwheel assembly—either to the web of the third, or that of the second planetary gearwheel assembly. Correspondingly, another spur gearwheel of the spur gearing or a second chain sprocket wheel of the chain drive is connected to the output shaft of the automatic transmission. In a manner favorable from the production technology standpoint, a servo device and/or a disk support of the first shift control element formed as a brake can be integrated in an outer wall of, or a cover attached fast to the transmission housing.

In another embodiment of the spur gearing or chain drive arrangement, however, it can also be provided that the first shift control element is arranged at least partially axially next to the third planetary gearwheel assembly on the side thereof opposite the second planetary gearwheel assembly, and that the spur gearing or chain drive is spatially arranged on the other side of the first shift control element (i.e., on the side of the first shift control element opposite the third planetary gearwheel assembly). In this case a hub of the first spur gearwheel of the spur gearing or the first sprocket wheel of the chain drive, connected to the annular gearwheel of the first planetary gearwheel assembly and to the web of the third or second planetary gearwheel assembly, passes centrally through the sun gearwheel of the third planetary gearwheel assembly in the axial direction. In such an arrangement the first shift control element formed as a brake can be arranged spatially next to the fourth shift control element also formed as a brake, and then an equal disk diameter is preferably provided for both these shift control elements (equivalent component concept).

In a further embodiment of the spur gearing or chain drive arrangement, it can also be provided that the first shift control element is arranged spatially at least largely over the third planetary gearwheel assembly, and the spur gearing or chain drive is positioned spatially on the side of the third planetary gearwheel assembly opposite to the second planetary gearwheel assembly and axially adjacent to the third planetary gearwheel assembly and the first shift control element.

For the application with coaxial drive input and output shafts, it is proposed that the output shaft of the automatic transmission passes centrally through the first shift control element arranged next to the third planetary gearwheel assembly and the sun gearwheel of the third planetary gearwheel assembly in the axial direction, and is spatially connected in the area axially between the second and third planetary gearwheel assemblies to the web of the third or second planetary gearwheel assembly.

Thanks to the component arrangement according to the invention, compared with the prior art of DE 19912 480 A1 a distinctly more compact transmission structure with advantageously shorter length is achieved. Accordingly, the component arrangement according to the invention is particularly well suited for incorporation in a motor vehicle with front-transverse-drive (and input and output shafts axis-parallel to one another). In principle, however, the component arrangement according to the invention is also suitable for incorporation into a motor vehicle with a standard drive (and coaxial input and output shafts) or front-longitudinal-drive or rear-longitudinal-drive (and the input and output shafts positioned at an angle relative to one another).

The proposed spatial arrangement of the second and fourth shift control elements on the large diameter takes particular account of the high thermal and static loading of these two shift control elements consequent upon the concept. The arrangement of the third and fourth (and perhaps also the first) shift control elements next to one another, enables the use of equivalent components and of simple production and assembly technology. The proposed combination of the fifth and second shift control elements in one unit enables on the one hand a good design of the servo devices of these two rotating shift control elements that includes dynamic pressure compensation, and on the other hand a functional multiple utilization of individual components which is favorable in terms of production technology (and, therefore, cost-effective as well), and easy pre-assembly of this structural group (consisting of the second and fifth shift control elements).

By virtue of the kinematic coupling of the individual gearwheel assembly elements with one another and with the drive input and output shafts via five shift control elements, it is possible—as in the prior art of DE 199 12 480 A1—to engage a total of six forward gears in such a way that when shifting from one gear to the next gear up or down, only one of the currently actuated shift control elements is opened and a different shift control element is closed.

BRIEF DESCRIPTION OF THE DRAWINGS

The invention will now be described, by way of example, with reference to the

The invention will now be described, by way of example, with reference to the accompanying drawings in which:

FIG. 4 is a gear-shift scheme of the transmission shown in FIG. 3;

DETAILED DESCRIPTION OF THE INVENTION

Figure 1:
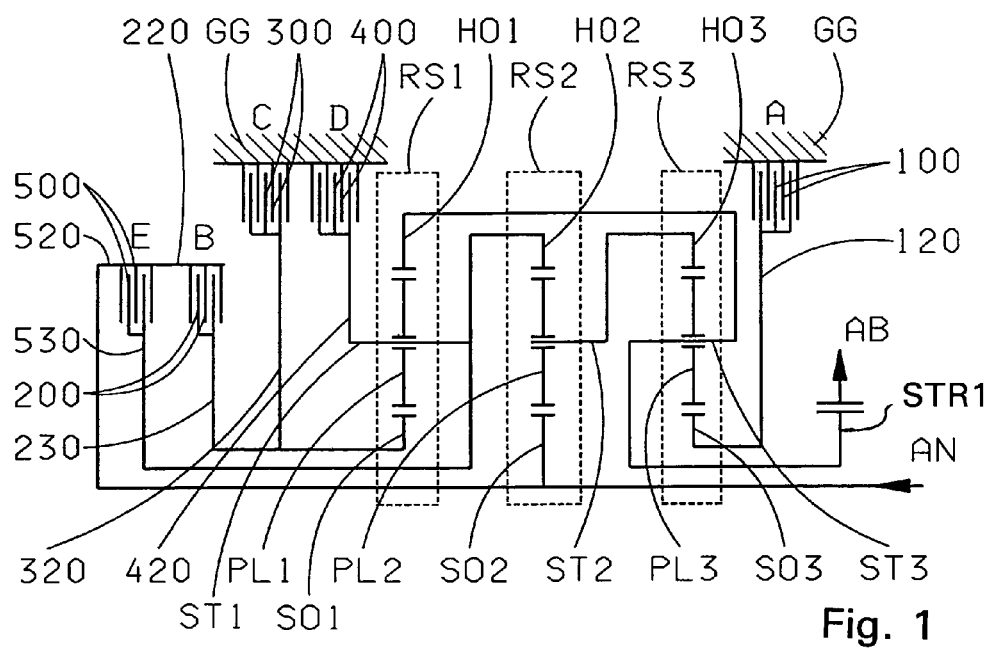
FIG. 1 is a transmission diagram according to the prior art.
Figure 2:
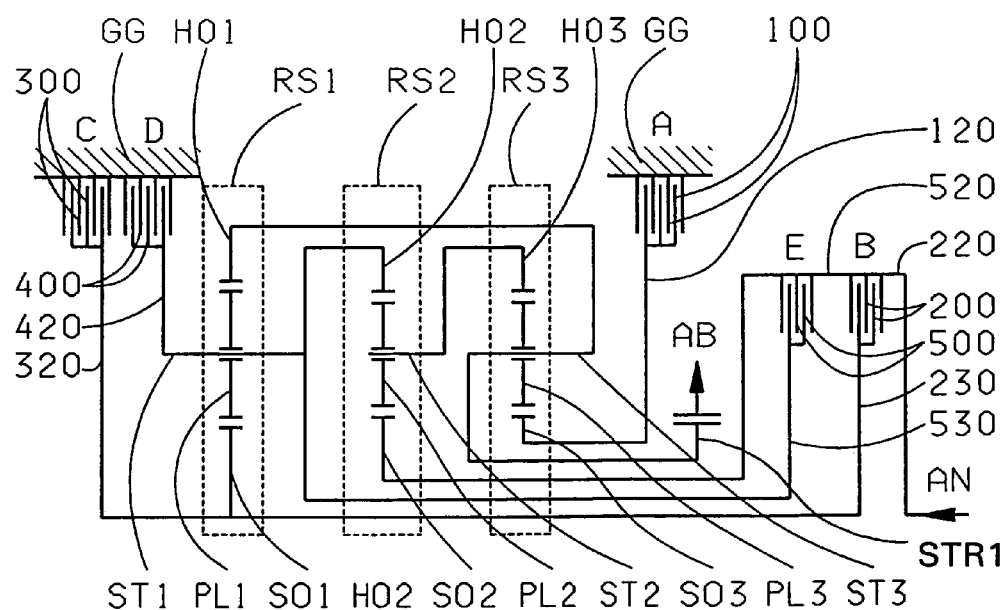
FIG. 2 is a component arrangement alternative to FIG. 1 according to the prior art.

To make clear the component arrangement according to the invention, FIGS. 1 and 2 first show two different component arrangements in a transmission diagram for a multi-stage automatic transmission with a non-coaxial arrangement of the drive input and output shafts, as known from the prior art of DE 199 12 480 A1. Such arrangements can be used for example in a motor vehicle with front transverse drive. The drive input shaft of the automatic transmission, indexed AN, is in active connection with a drive motor of the automatic transmission (for simplicity, not shown here), for example via a torque converter or a clutch or a torsion damper or a two-mass flywheel or a solid shaft. The output shaft of the automatic transmission is in active connection with at least one drive axle of the motor vehicle (for simplicity, not shown). RS1, RS2 and RS3 denote three coupled simple planetary gearwheel assemblies, arranged in series next to one another in a transmission housing GG of the automatic transmission. All three planetary gearwheel assemblies RS1, RS2, RS3 have respective sun gearwheels SO1, SO2, SO3, respective annular gearwheels HO1, HO2, HO3, and respective webs ST1, ST2, ST3 with planetary gearwheels PL1, PL2, PL3, which mesh with the respective sun and annular gearwheels of the corresponding assembly. A to E denote five shift control elements, the first, third and fourth of which A, C, D are formed as brakes and the second and fifth of which B and E are formed as couplings. The respective friction linings of the five shift control elements A to E are indicated as disk packs 100, 200, 300, 400 and 500 (in each case with outer and inner disks or steel and liner disks respectively). The respective input elements of the five shift control elements A to E are denoted by 120, 220, 320, 420 and 520, and the respective output elements of the clutches B and E by 230 and 530. The kinematic connection of the individual gearwheel assemblies and shift control elements relative to one another and to the input and output shafts AN, AB has already been described in detail earlier, as also has the spatial arrangement of these structural elements.

In this connection it should be stressed that the disks 100 of the first shift control element A (made as a brake) are spatially arranged always next to the third planetary gearwheel assembly RS3, the disks 400 of the fourth shift control element D (made as a brake) are spatially arranged always next to the first planetary gearwheel assembly RS1, the disks 300 of the third shift control element C (also made as a brake) are spatially arranged always next to the disks 400 of the fourth shift control element D (on the side of the brake D facing away from the third planetary gearwheel assembly RS3), the disks 200 of the second shift control element B (made as a clutch) and the disks 500 of the fifth shift control element E (also made as a clutch) are always arranged next to one another, and a first spur gearwheel STR1, which is in active connection with the output shaft AB on the drive output side, is always arranged next to the first shift control element A (on the side of the brake A facing away from the third planetary gearwheel assembly RS3).

The two disk packs 200, 500 of the two clutches B, E arranged next to one another are either—as shown in FIG. 1—arranged axially next to the disks 300 of the brake C, and this on the side of the disk pack 300 facing away from the third planetary gearwheel assembly RS3, or—as shown in FIG. 2—next to the spur gearwheel STR1, and this on the side of the spur gearwheel STR1 opposite the brake A.

With reference to FIGS. 3 to 20, in what follows several examples and design details for a component arrangement according to the invention will be explained.

Figure 3:
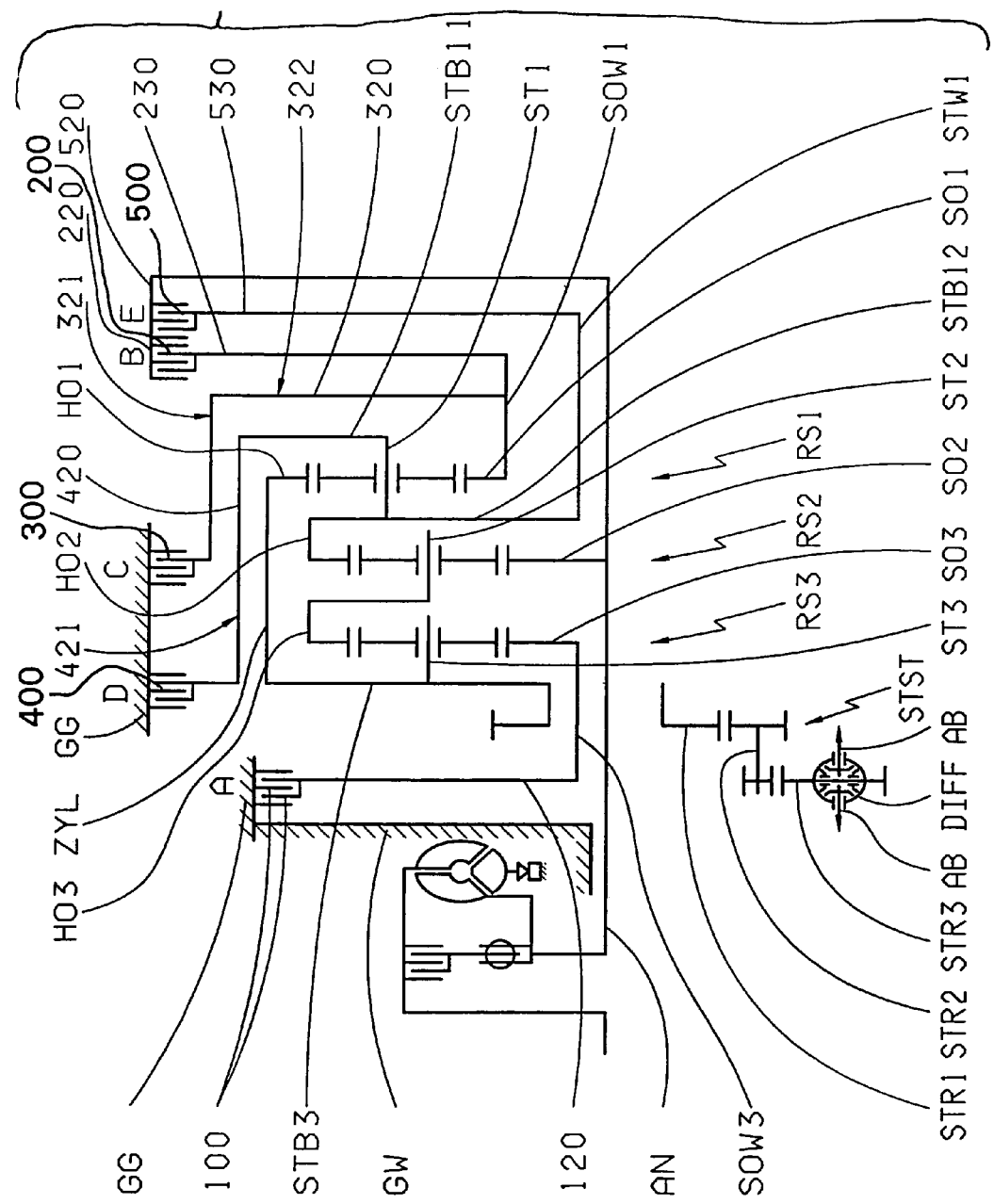
FIG. 3 is a schematic illustration of a first example of a component arrangement according to the invention.

FIG. 3 now shows a schematic illustration of a first component arrangement, presented as an example for achieving the objective of the invention. Starting from the previously described prior art as in DE 199 12 480 A1, the multi-stage automatic transmission according to the invention comprises three coupled individual planetary gearwheel assemblies RS1, RS2, RS3 arranged coaxially with one another in series, the second planetary gearwheel assembly RS2 being positioned axially between the first and third ones RS1 and RS3. The multi-stage automatic transmission also has five shift control elements A to E. The first, third and fourth shift control elements A, C and D are each formed as brakes (disk brakes in the example), and the second and fifth shift control elements B and E are each formed as clutches (disk clutches in the example). A sun gearwheel SO3 of the third planetary gearwheel assembly RS3 can be connected fast via the brake A relative to a transmission housing GG of the multi-stage automatic transmission. A drive input shaft AN of the multi-stage automatic transmission is permanently connected to a sun gearwheel SO2 of the second planetary gearwheel assembly RS2. Furthermore, the input shaft AN can be connected via the clutch B to a sun gearwheel SO1 of the first planetary gearwheel assembly RS1 and in addition or alternatively via the clutch E to a web ST1 of the first planetary gearwheel assembly. Alternatively, the sun gearwheel SO1 of the first planetary gearwheel assembly RS1 can be connected fast via the brake C and/or the web ST1 of the first planetary gearwheel assembly RS1 can be connected fast via the brake D, in each case relative to the transmission housing GG.

A drive output shaft AB of the multi-stage automatic transmission is in permanent active connection with an annular gearwheel HO1 of the first planetary gearwheel assembly RS1, and this annular gearwheel HO1 is, in the example clutch mode of the planetary gearwheel assemblies illustrated, also permanently connected to a web ST3 of the third planetary gearwheel assembly RS3. In addition, a web ST2 of the second planetary gearwheel assembly RS2 is permanently connected to an annular gearwheel HO3 of the third planetary gearwheel assembly RS3, and the web ST1 of the first planetary gearwheel assembly RS1 is permanently connected to an annular gearwheel HO2 of the second planetary gearwheel assembly RS2. The corresponding connecting element between the annular gearwheel HO1 of the first planetary gearwheel assembly RS1 and the web ST3 of the third planetary gearwheel assembly RS3 is formed as a cylinder ZYL. This cylinder ZYL is on the one hand connected to the annular gearwheel HO1 via a suitable active connection, for example a weld joint, and extends in the axial direction from the annular gearwheel HO1 as far as the annular gearwheel HO3. On the other hand the cylinder ZYL is connected on the side of the third planetary gearwheel assembly RS3 facing away from the second planetary gearwheel assembly RS2, via a suitable active connection, to a web plate STB3 of the web ST3, for example via a carrier profile. The cylinder ZYL therefore spans across the second and third planetary gearwheel assemblies RS2 and RS3 completely.

Passing centrally through the first planetary gearwheel assembly RS1 in the axial direction are two shafts, namely a web shaft STW1 made as a hollow shaft and the drive input shaft AN passing radially inside this web shaft STW1. The web shaft STW1 is connected on the side of the first planetary gearwheel assembly RS1 facing towards the second planetary gearwheel assembly RS2 to a web plate STB12 of the web ST1 of the first planetary gearwheel assembly RS1, and on the side of the first planetary gearwheel assembly RS1 facing away from the second planetary gearwheel assembly RS2 to an output element 530 of the clutch E. In turn, at its outer diameter the web plate STB12 is also connected to the annular gear HO2 of the second planetary gearwheel assembly RS2. On the side of the first planetary gearwheel assembly RS1 facing away from the second planetary gearwheel assembly RS2, the web shaft STW1 passes radially inside a sun shaft SOW1 also formed as a hollow shaft. In turn, this sun shaft SOW1 is connected on the one hand to the sun gearwheel SO1 of the first planetary gearwheel assembly RS1, and on the other hand, on the side of the first planetary gearwheel assembly RS1 facing away from the second planetary gearwheel assembly RS2, to an input element 320 of the brake C and to an input element 230 of the clutch B. The web ST1 passes through the first planetary gearwheel assembly RS1 in the axial direction and is, on its side facing away from the second planetary gearwheel assembly RS2, connected to an input element 420 of the brake D.

To form the pressure equalization space 212 of the servo device 210, the cylindrical skirt of the piston 214 is sealed in a lubricant-tight way against the disk-shaped section 222 of the disk support ZYLBE, but can move axially. Accordingly, the pressure equalization space 212 is formed by the piston 214, the disk-shaped section 222 and the cylindrical section 521 of the disk support ZYLBE. This pressure equalization space 212 is filled with lubricant not under pressure, from the pressure equalization space 512 of the clutch E. For this, radial bores are provided both in the cylindrical section 521 of the disk support ZYLBE and in the piston 514 of the servo device of the clutch E, which open into the pressure equalization spaces 212 and 512. The corresponding lubricant feed is indexed 219.

On the side of the web plate STB3 facing away from the second planetary gearwheel assembly RS2, the spur gearing stage STST is axially adjacent to the third planetary gearwheel assembly RS3. In this case, the multiple-gearwheel spur gearing stage STST comprises a first spur gearwheel STR1 which is connected permanently to the web plate STB3 of the third planetary gearwheel assembly RS3, a second spur gearwheel STR2 formed as a stepped gear, whose first tooth array meshes with the first spur gearwheel STR1, and a third spur gearwheel STR3, which meshes with a second tooth array of the second spur gearwheel STR2 and is in active connection with the drive output shaft AB via a differential DIFF. Obviously, this design of the spur gearing stage STST must be regarded as an example. A person with knowledge of the subject can for example also replace the spur gearing stage STST with a chain drive, whose first sprocket wheel is then connected to the web plate STB3 of the third planetary gearwheel assembly RS3 and whose second sprocket wheel is connected (if necessary via a differential) to the output shaft AB.

Centrally within the first spur gearwheel STR1 of the spur gearing stage STST there passes a sun shaft SOW3 formed as a hollow shaft, which is on the one hand connected to the sun gearwheel SO3 of the third planetary gearwheel assembly RS3, and on the other hand, on the side of the first spur gearwheel STR1 facing away from the third planetary gearwheel assembly RS3, to an input element 120 of the brake A. Radially inside this sun shaft SOW3 there passes again the drive input shaft AN.

The brake A by means of which the sun gearwheel SO3 of the third planetary gearwheel assembly RS3 can be held fast, is arranged spatially on the side of the spur gearing stage STST facing away from the third planetary gearwheel assembly RS3. Thus, the input element 120 of the brake A formed as an inner disk support is axially adjacent on one side to the first spur gearwheel STR1 of the spur gearing stage STST, and on the opposite side to a housing wall GW in rotationally fixed connection with the transmission housing GG. Obviously, the housing wall GW and the transmission housing GG can be made as one piece. A disk pack 100 of the brake A with outer and lining disks is arranged on the large diameter in the area of the inside diameter of the transmission housing GG. A carrier profile for the outer disks of the disk pack 100 can be integrated in the transmission housing GG in a simple way. Obviously, however, a separate outer disk support can also be provided for the brake A, which is connected by suitable positive locking, friction-force or material-enclosing means to the transmission housing GG or the housing wall GW attached firmly thereto. A servo device (for simplicity, not shown here) of the brake A for actuating the disks 100 can be arranged spatially between the housing wall GW and the disk pack 100, but also on the side of the disk pack 100 facing towards the first spur gearwheel STR1 and the third planetary gearwheel assembly RS3.

In the example illustrated in FIG. 3 the drive input shaft AN extending centrally within the input element 120 of the brake A passes through the housing wall GW and so extends outwards on the side of the automatic transmission on which the brake A is arranged, i.e., close to the spur gearing stage STST. As can also be seen in FIG. 3, the drive input shaft AN is here for example connected via a torque converter with a bridging clutch and torsion damper to a drive motor of the automatic transmission (for simplicity, not shown). Obviously, the torque converter can be replaced by some other starting element (such as a clutch), or may even be omitted if at least one of the shift control elements within the transmission is designed as a starting shift control element.

As can also be seen in FIG. 3, the two brakes C, D are arranged spatially next to one another in an area in the axial direction radially over the planetary gearwheel assemblies.

A disk pack 400 with outer and lining disks of the brake D is then arranged spatially over the third planetary gearwheel assembly RS3, directly next to the first spur gearwheel STR1 of the spur gearing stage STST when viewed axially, and on a large diameter in the area of the inside diameter of the transmission housing GG. An outer disk support for the outer disks of the disk pack 400 of the brake D is in this case for example integrated in the transmission housing GG, but can obviously also be made as a separate component which is then attached to the transmission housing by suitable means. An input element 420 of the brake D formed as a cylindrical inner disk support extends radially over the cylinder ZYL in the axial direction, spanning across all three planetary gearwheel assemblies RS1, RS2, RS3 and being connected with a first web plate STB11 of the web ST1 of the first planetary gearwheel assembly RS1, this first web plate STB11 being arranged on the side of the web ST1 facing away from the second planetary gearwheel assembly RS2. In the example illustrated, the inner disk support 420 of the brake D thus spans completely across all three planetary gearwheel assemblies RS1, RS2, RS3 in the axial direction. Depending on the design, however, the spatial position of the disk pack 400 of the brake D can also be displaced axially in the direction of the second planetary gearwheel assembly RS2, so that the inner disk support 420 of the brake D then spans axially completely across at least the first two planetary gearwheel assemblies RS1, RS2.

A disk pack 300 with outer and lining disks of the brake C is arranged close to the disk pack 400 of the brake D, spatially approximately over the second planetary gearwheel assembly RS2 and also on a large diameter in the area of the inside diameter of the transmission housing GG. An outer disk support for the outer disks of the disk pack 300 of the brake C is in this case for example integrated in the transmission housing GG, but can obviously also be made as a separate component attached to the latter. To simplify the production technology and use equivalent components in a cost-effective way, the same outer and lining disks can be provided for both brakes C, D. An input element 320 of the brake C formed as a pot-shaped inner disk support has a cylindrical section 321 and a disk-shaped section 322. The cylindrical section 321 extends radially over a cylindrical section 421 of the input element 420 of the brake D in the axial direction, spanning across the first and second planetary gearwheel assemblies RS1, RS2. In this area the disk-shaped section 322 is adjacent to the cylindrical section 321 and extends, on the side of the first web plate STB11 facing away from the second planetary gearwheel assembly RS2, radially inwards as far as the sun shaft SOW1, to which it is connected. As already mentioned, the sun shaft SOW1 for its part is connected to the sun gearwheel SO1 of the first planetary gearwheel assembly RS1. In the example illustrated, the inner disk support 320 spans completely across the brake C and so too, therefore, the two planetary gearwheel assemblies RS1, RS2. Depending on the design, however, the spatial position of the disk pack 300 of the brake C can also be displaced axially, either towards the first planetary gearwheel assembly RS1 so that the inner disk support 320 of the brake C then spans completely across at least the first planetary gearwheel assembly RS1 in the axial direction, or towards the third planetary gearwheel assembly RS3 so that the inner disk support 320 of the brake C possibly also spans partially across the third planetary gearwheel assembly RS3 in the axial direction.

Construction details of the design of the servo devices (for simplicity, not shown in FIG. 3) of the two brakes C, D for actuating the respective disks 300 and 400, will be described in detail later. Appropriately, either these two servo devices are arranged axially between the two disk packs 300, 400, or the two disk packs 300, 400 are arranged immediately next to one another between the two servo devices. In both these cases the actuation directions of the servo devices of the brakes C, D are opposite.

The other two shift control elements B and E are arranged on the side of the first planetary gearwheel assembly RS1 facing away from the second planetary gearwheel assembly RS2, in the example shown in FIG. 3 on the side of the automatic transmission opposite to the drive motor (not shown). It is appropriate for the two clutches B, E to be combined in a pre-assembled structural group. As can be seen from FIG. 3, a disk pack 200 with outer and lining disks of the clutch B is arranged near the first planetary gearwheel assembly RS1. A disk pack 500 with outer and lining disks of the clutch E is axially directly adjacent to the disk pack 200 of the clutch B, on the side of the disk pack 200 opposite to the planetary gearwheel assembly RS1. Thus, the disks 300 of the brake C are positioned closer to the disks 200 of the clutch B than the disks 400 of the brake.

On the side of the automatic transmission opposite the drive motor is arranged an input element 520 of the clutch E, here formed as an outer disk support and connected to the drive input shaft AN. An input element 220 of the clutch B also formed as an outer disk support is connected to the input shaft AN via the input element 520 of the clutch E. In this, both outer disk supports 220, 520 can advantageously be combined as a common disk support, on the one hand enabling a simplification from the standpoint of production technology and on the other hand also enabling the cost-effective use of equivalent components for the outer and lining disks of the two clutches B, E.

An output element 230 of the clutch B formed as an inner disk support extends axially adjacent to the disk-shaped section 322 of the inner disk support 320 of the brake C—radially inwards as far as the sun shaft SOW1 of the first planetary gearwheel assembly RS1, to which it is connected. To save structural length, a person skilled in the art can if necessary make the inner disk support 230 of the clutch B and the disk-shaped section 322 of the inner disk support 320 of the brake C as a common component.

An output element 530 of the clutch E also formed as an inner disk support extends—axially between the disk-shaped inner disk support 230 of the clutch B and the disk-shaped section of the outer disk support 520 of the clutch E—radially inwards as far as the web shaft STW1 of the first planetary gearwheel assembly RS1, to which it is connected. As already mentioned, this web shaft STW1 passes centrally through the sun shaft SOW1 and, on the side of the first planetary gearwheel assembly RS1 adjacent to the second planetary gearwheel assembly RS2, it is connected both to the web ST1 of the first planetary gearwheel assembly RS1 and to the annular gearwheel HO2 of the second planetary gearwheel assembly RS2.

Various appropriate spatial arrangements and possible design details for servo devices (for simplicity, not shown in FIG. 3) for the two clutches B, E will be described in more detail later. For the arrangement shown in FIG. 3, it is appropriate to arrange the servo device of the clutch E inside the clutch space formed by the outer disk support 520 of the clutch E.

The component arrangement shown in FIG. 3 produces a transmission structure which, overall, is spatially very compact and sparing of structural length. The disks 200 of the thermally highly stressed clutch B are advantageously arranged on a large diameter, as also are the disks 400 of the brake D which, of all five shift control elements, is the one subjected to the highest static load. To save costs, the same types of disks or disk sizes can be used for both brakes C, D and for both clutches B, E.

Since, as explained earlier, the drive input shaft AN passes axially through all the internal rotating components of the automatic transmission, depending on the application a person skilled in the art can optionally arrange the drive motor at the end of the automatic transmission on which the brake A or the spur gearing is also arranged, or at the opposite end of the automatic transmission, at which the structural group with the two clutches B, E is also arranged.

FIG. 4 shows a gear-shift scheme with the associated gear ratio steps and the total transmission ratio of the automatic transmission shown in FIG. 3. By the selective actuation in each case of two of the five shift control elements A to E, six forward gears can be engaged without range-change, i.e., in such manner that to shift from one gear to the next gear up or down, only one shift control element of the two currently actuated is opened and another shift control element is closed. In first gear "1" the brakes A and D are closed, in second gear "2" the brakes A and C, in third gear "3" the brake A and the clutch B, in fourth gear "4" the brake A and the clutch E, in fifth gear "5" the clutches B and E, and in sixth gear "6" the brake C and the clutch E. In a reverse gear "R" the clutch B and the brake D are closed. The individual gear steps allow good driving characteristics, with an advantageously high total transmission ratio (spread) of the automatic transmission.

Figure 5:
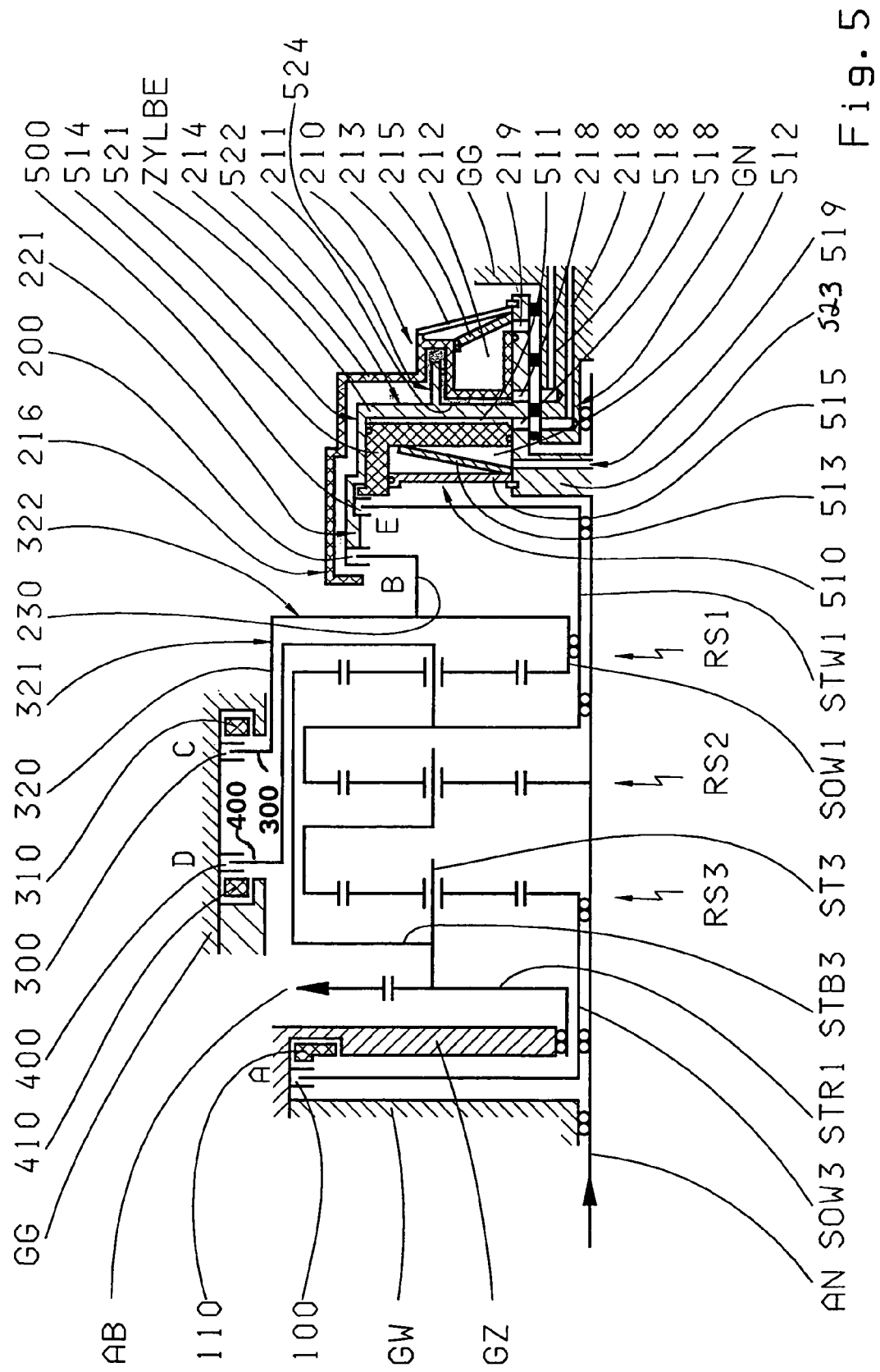
FIG. 5 is a detail of the first component arrangement shown in FIG. 3.

FIG. 5 shows a detail of the first component arrangement according to FIG. 3, now supplemented by radial shaft and component bearings and by servo devices of the five shift control elements A to E. The kinematic clutch of the three individual planetary gearwheel assemblies RS1, RS2, RS3 and the five shift control elements A to E and the drive input and output shafts AN, AB corresponds to the transmission illustrated schematically in FIG. 3. Even the spatial arrangement of the planetary gearwheel assemblies RS1, RS2, RS3 and shift control elements A to E relative to one another within the transmission housing GG has been taken from FIG. 3 practically unchanged.

The servo device of the brake A, indexed 110, is shown in simplified form and is arranged on the side of the disk pack 100 of the brake A opposite to the first spur gearwheel STR1 in active connection with the drive output shaft AB or the third planetary gearwheel assembly RS3. As usual, the servo device 110 comprises a piston fitted to move axially in a corresponding piston- or pressure space, and a restoring element for this piston. When pressure is applied to the piston space via a corresponding pressure medium feed, the piston then actuates the disks 100 of the brake A against a restoring force of the restoring element, axially towards the housing wall GW, which—analogously to FIG. 3—forms the outer wall of the transmission housing facing towards the drive motor. In this case the piston- or pressure space of the servo device 110 is integrated in a housing partition wall, which is formed as part of the transmission housing GG and, starting from the inner diameter of the transmission housing, extends radially inwards. Obviously, the housing partition wall can also be made as a separate component, which is then connected rotationally fast to the transmission housing GG by suitable means. On the housing partition wall GZ is also mounted the first spur gearwheel STR1. In addition, in this area of FIG. 5 a radial mounting between the drive input shaft AN and the housing wall GW and a radial mounting between the sun shaft SOW3 and the input shaft AN are shown.

Analogous to FIG. 3, the two brakes C and D are spatially arranged over the planetary gearwheel assemblies RS1 to RS3, the brake C axially in a radial zone over the first and (middle) second planetary gearwheel assemblies RS1, RS2 and the brake D axially in a radial zone over the (middle) second and third planetary gearwheel assemblies RS2 and RS3. Like the servo device 110 of the brake A, the servo devices 310 and 410 of the brakes C and D respectively are shown in simplified form and—as usual—each comprises a piston fitted to move axially in a corresponding piston- or pressure space, and in each case a restoring element for the respective piston. When the piston space in question is pressurized by a corresponding pressure medium feed, the piston in question actuates the disks 300 or 400 of the brake C or D against a restoring force of the respective restoring element. In the example shown in FIG. 5 the disk packs 300, 400 are axially directly adjacent to one another. The servo device 410 of the brake D is arranged on the side of the disk pack 400 of brake D facing towards the spur gearwheel STR1 or the brake A or the housing partition wall GZ, and actuates the disks 400 axially towards the brake C. The servo device 310 of brake C is arranged on the side of the disk pack 300 of brake C facing away from the brake D and actuates these disks 300 axially towards the brake D. The actuation directions of the two servo devices 310, 410 are thus opposite to one another.

Analogous to FIG. 3, the clutches B and E are both arranged on the side of the first planetary gearwheel assembly RS1 opposite to the second planetary gearwheel assembly RS2, such that the disk packs 200, 500 of clutches B and E are arranged immediately adjacent to one another and the disk pack 200 of clutch B is closer to the first planetary gearwheel assembly RS1 than is the disk pack 500 of clutch E, and such that the input element of clutch E and the input element of clutch B are made as a common disk support ZYLBE, here having the function of an outer disk support. The disk support ZYLBE comprises a hub 523 connected to the drive input shaft AN and mounted on a hub GN attached fast to the transmission housing. The nomenclature chosen shows that the hub 523 is associated with the input element 520 of the clutch E. The hub GN attached fast to the transmission housing is a cylindrical projection of an outer wall of the transmission housing GG, which extends axially towards the first planetary gearwheel assembly RS1. Obviously, the hub GN can also be integrated in a housing cover, which is then attached rotationally fast to the transmission housing by suitable means. The drive input shaft AN itself is also mounted on the hub GN in the example illustrated. In addition, the disk support ZYLBE common to the clutches B, E comprises sections 521, 522, 524 and 221 of different geometrical forms, which in accordance with their nomenclature are associated either with the input element 520 of the clutch E or with the input element 220 of the clutch B. Viewed axially, the disk-shaped section 522 is connected to the hub 523 approximately in the middle thereof, and extends radially outwards, beginning at the outer diameter of the hub 523. To the outer diameter of this disk-shaped section 522 is connected the cylindrical section 521, which extends axially towards the first planetary gearwheel assembly RS1 as far as the disk pack 500 of the clutch E. At its inner diameter the cylindrical section 521 has a suitable carrier profile to hold the outer disks of the disk pack 500 of the clutch E. At its inner diameter the cylindrical section 521 has a suitable carrier profile to hold the outer disks of the disk pack 500 of clutch E. Viewed further in the direction of the planetary gearwheel assembly RS1, the cylindrical section 521 is connected to a cylindrical section 221 (associated with the input element 220 of clutch B). At its inner diameter the cylindrical section 221 has a suitable carrier profile to hold the outer disks of the disk pack 200 of the clutch B. Even if this cannot be seen in the example illustrated in FIG. 5, it can be provided that the two carrier profiles for holding the outer disks of the clutches E and B are identical.

The servo device of clutch E is indexed 510 and is arranged inside the clutch space formed by the first cylindrical section 521 and the disk-shaped section 522 of the input element 520 of clutch E, i.e., on the side of the disk-shaped section 522 facing towards the first planetary gearwheel assembly RS1. The first cylindrical section 521, the disk-shaped section 522 and the hub 523 of the disk support ZYLBE (or input element 520 of the clutch E) form a piston- or pressure space 511 in which a piston 514 of the servo device 510 is arranged and can move axially. When the pressure space 511 of the servo device 510 is pressurized, the piston 514 actuates the disks 500 of the clutch E axially towards the first planetary gearwheel assembly RS1, against a restoring force of a restoring element 513 of the servo device 510, in this case for example made as a cup spring. The pressure medium is fed to the pressure space 511 by a pressure medium feed 518 which passes partly within the hub 523 and partly within the hub GN attached to the housing.

To compensate the dynamic pressure of the pressure space 511 which always rotates at the speed of the input shaft AN, the servo device 510 also has a pressure equalization space 512 arranged on the side of the piston 514 opposite to the pressure space 511, which is formed by the piston 514 itself and a pressure disk 515, and is preferably geometrically designed such that at least largely complete dynamic pressure compensation is achieved. For this, the pressure equalization space 512 is filled via a lubricant feed 519 with lubricant not under pressure, the lubricant feed 519 passing partly within the hub 523 and partly within the drive input shaft AN.

The servo device of the clutch B is denoted 210. A piston- or pressure space 211 of this servo device 210 is arranged on the side of the disk-shaped section 522 of the outer disk support ZYLBE common to the clutches E, B opposite to the pressure space 511 of the clutch E. The pressure space 211 is formed by the hub 523, the disk-shaped section 522 and a second cylindrical section 524 of the disk support ZYLBE (or input element 520 of the clutch E), this second cylindrical section 524 extending axially in the direction away from the pressure space 511 of the clutch E. A piston 214 of the servo device 210 is arranged and can move axially in the pressure space 211. When the pressure space 211 is pressurized, the piston 214 actuates the disks 200 of the clutch B axially in the direction opposite to the first planetary gearwheel assembly RS1, against a restoring force of a restoring element 213 of the servo device 210 in this case made for example as a cup spring. The piston 214 spans completely across the disk support ZYLBE common to the two clutches E, B radially in the axial direction, in particular its sections 522, 524, 521 and 221. In this, an actuating rod 216 of the piston 214 acts on the disk pack 200 from the side of the disk pack 200 opposite to the pressure space 211. Preferably, the geometrical contour of the piston 214 is adapted to the outer casing surface of the disk support ZYLBE formed by the sections 522, 524, 521 and 221 of the latter. The pressure medium feed to the pressure space 211 takes place via a pressure medium feed 218 which passes partly within the hub 523 and partly also within the hub GN attached fast to the housing.

To compensate the dynamic pressure of the pressure space 211 which always rotates at the speed of the drive input shaft AN, the servo device 210 of the clutch B also has a pressure equalization space 212 arranged on the side of the piston 214 opposite to the pressure space 211. This pressure equalization space 212 is formed by a compression disk 215 and a section of the piston 214 arranged under the disk support section 524. Preferably, the pressure equalization space 212 is geometrically designed such that at least largely complete dynamic pressure compensation is achieved. For this, the pressure equalization space 212 is filled with lubricant not under pressure, the lubricant feed 219 passing partly within the hub 523 and partly within the hub GN attached fast to the housing.

Thus, in this arrangement according to the invention, in relation to the spatial position of the pressure space 211 of the servo device 210 the disks 200 of the clutch B are actuated by a "pull". In contrast, in relation to the spatial position of the pressure space 511 of the servo device 510, the disks 500 of the clutch E are actuated by a "push".

The disk-shaped section 522 forms essentially the radially directed outer casing surface of the disk support ZYLBE, on whose side facing towards the planetary gearwheel assembly RS1 is arranged the pressure space 511 of the servo device of the clutch E, and on whose side facing away from the planetary gearwheel assembly RS1 is arranged the pressure space 211 of the servo device of the clutch B. This area of the outer casing surface of the disk support ZYLBE thus separates the two pressure spaces 211 and 511 from one another. The pressure equalization spaces 212 and 512 respectively of the servo devices of the clutches B and E, provided for the dynamic pressure compensation of the respective rotating pressure spaces 211 and 511, are respectively arranged on the sides of the pressure spaces 211 and 511 facing away from this area of the outer casing surface of the disk support ZYLBE.

Figure 6:
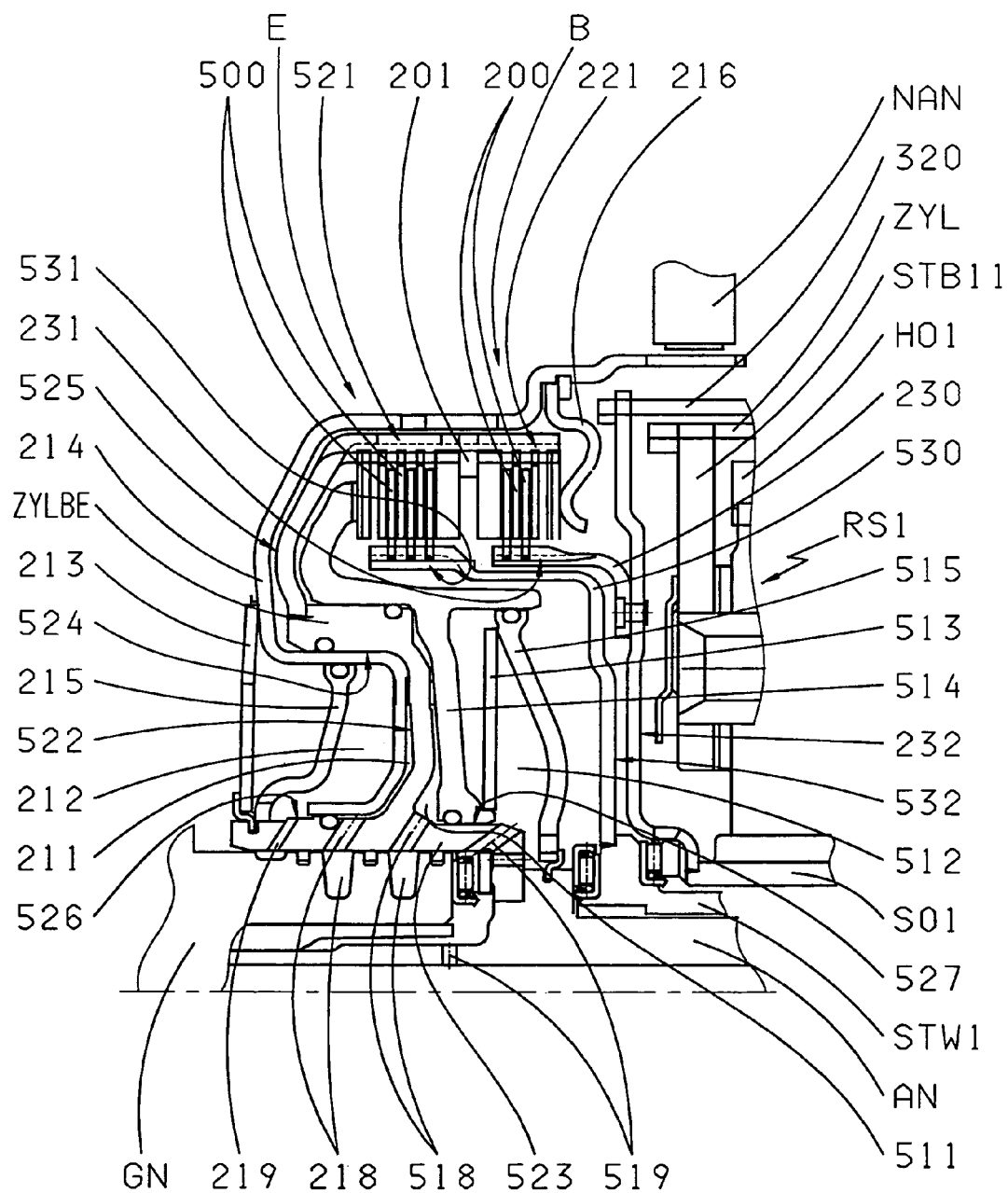
FIG. 6 is a sectional view of a first example of a design detail for a transmission according to FIG. 5.
Figure 7:
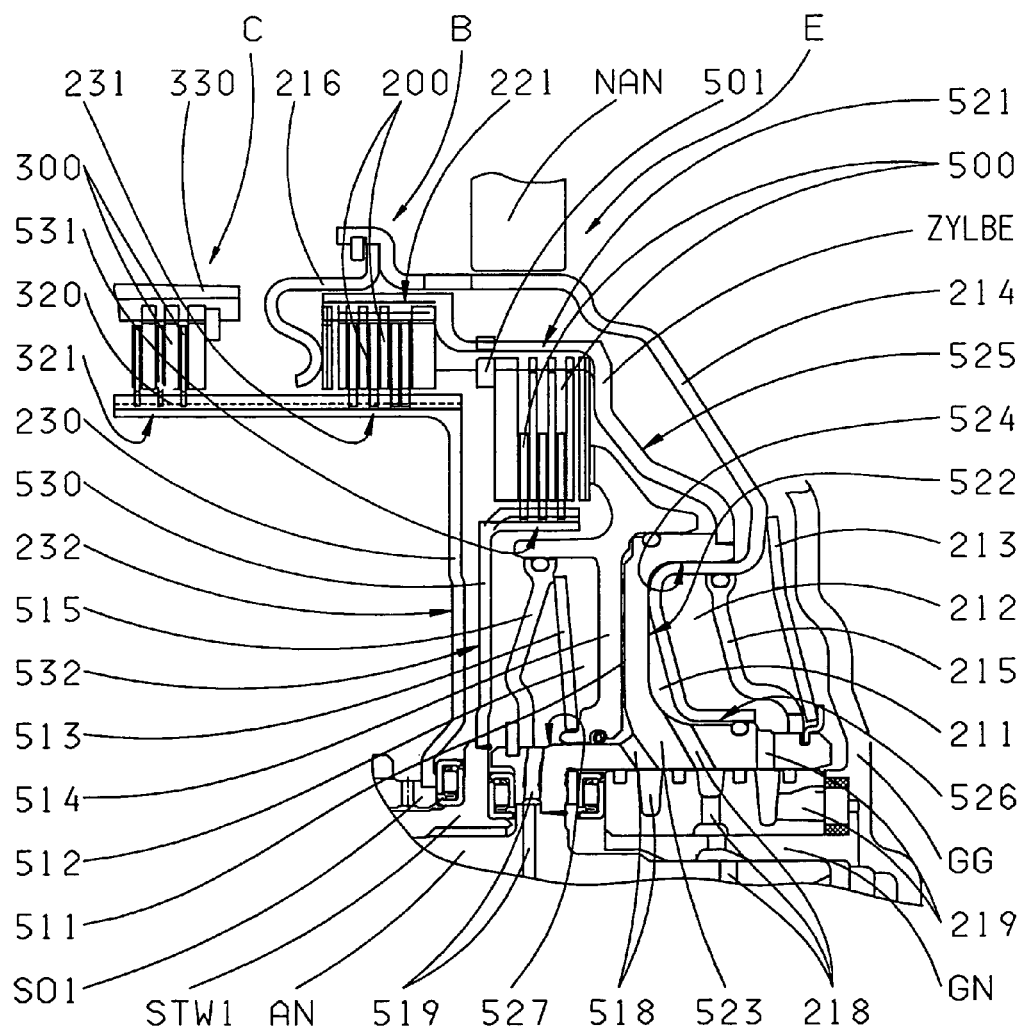
FIG. 7 is a sectional view of a second example of a design detail for a transmission according to FIG. 5.

With reference to FIGS. 6 and 7 below, two design details based on the component arrangement of FIG. 5 will now be explained. FIG. 6 shows a sectional view of a transmission with a first example design detail for the structural group with the two clutches B and E. As in FIG. 5, here too the disk packs 200 and 500 of the two clutches B, E are arranged directly adjacent to one another, with the disk pack 200 positioned close to the first planetary gearwheel assembly RS1. As in FIG. 5, a common disk support ZYLBE is provided, which functions as an outer disk support and is divided into geometrically different sections 221, 521, 525, 524, 522 and 523. The two cylindrical sections 521 and 524 and the two disk-shaped sections 525 and 522, together with the hub 523, form the input element of the clutch E, which is connected to the drive input shaft AN. The cylindrical section 221 forms the input element of the clutch B, which is connected to the input shaft AN via the input element of the clutch E.

At its inner diameter the cylindrical section 221 has a suitable carrier profile to hold the outer disks of disk pack 200. The cylindrical section 221 is axially connected in the direction opposite to the planetary gearwheel assembly RS1 to the first cylindrical section 521 of the input element of the clutch E, in this case being of the same diameter. The first cylindrical section 521 has at its inner diameter a suitable carrier profile to hold the outer disks of the disk pack 500. Advantageously, the disk carrier profiles of the two sections 221 and 521 can be identical, which makes it possible to use similar outer disks for both clutches B, E. A locking ring 201, whose outer diameter engages in the disk carrier profile of the cylindrical section 221 of the outer disk support ZYLBE, is secured by suitable means on the outer diameter of the disk support ZYLBE, so that the two clutches B, E can be actuated completely independently of one another, the actuation of one of them having no reaction effect on the respective other clutch. Thus, when the respective pressure space 211, 511 is pressurized, the disk packs 200, 500 rest against the locking ring 201. It will be clear to a person with knowledge of the subject that before this locking ring is fitted and secured axially, the disk support common to the two clutches B, E must first be completed with the servo device and disk pack 500 of the clutch E. Such axial securing can as in the example illustrated be effected by subsequently forming a radial recess (material indentation) in the area of the locking ring, but for example also as a subsequent flanging of the locking ring 201 onto the disk support ZYLBE, or as a radial material displacement made subsequently in the carrier profile, or even by pinning the locking ring 201 radially onto the disk support ZYLBE. In a different version it can also be provided that instead of the locking ring 201 on the cylindrical section 211 of the cylinder ZYLBE, a material indentation directed inwards is made, which after the piston 514 and the disk pack 500 have been fitted in the cylindrical section 211 of the cylinder ZYLBE, is pressed in and then forms the axial abutment surface for the two disk packs 500, 200.

Starting from the hub 523 (hub of the input element of clutch E), which in this case is connected in a positive locking way with the drive input shaft via a carrier profile, the first disk-shaped section 522 extends radially outwards at approximately the middle of the hub. A first cylindrical section of the hub 523, denoted as 526, extends axially on the side of the disk-shaped section 522 facing away from the planetary gearwheel assembly 522. A second cylindrical section of the hub 523, indexed 527, extends axially on the side of the disk-shaped section 522 facing towards the planetary gearwheel assembly RS1. On both sides of the first disk-shaped section 522 are arranged in each case a pressure space. On the side of the first disk-shaped section 522 facing away from the planetary gearwheel assembly RS1, radially above the hub section 526, is arranged the pressure space 211 of the servo device of the clutch B. On the side of the first disk-shaped section 522 facing towards the planetary gearwheel assembly RS1, radially above the hub section 527, is arranged the pressure space 511 of the servo device of the clutch E. At its outer diameter the first disk-shaped section 522 is followed by a second cylindrical section 524 which extends axially in the direction away from the planetary gearwheel assembly RS1 about as far as the first cylindrical section 526 of the hub 523 also extends. Here, the second cylindrical section 524 is followed by a second, at least largely disk-shaped section 525, which extends radially outwards about as far as the outer diameter of the disk pack 500, up to the first cylindrical section 521 of the input element of the clutch E. As can be seen in FIG. 6, the disk support ZYLBE (or input element of the clutch E) with its sections one following another in the sequence 521, 525, 524, 522 and 523, forms an overall meandering shaped structure when viewed in the radial direction and therefore forms a clutch space inside which are arranged the servo device of clutch E and the disk packs 200 and 500 of the two clutches B, E.

The disk-shaped section 522 and the cylindrical hub section 527 of the disk support ZYLBE (or input element of the clutch E), together with the piston 514 of the servo device of clutch E, form the pressure space 511 of the servo device of clutch E. The pressure medium feed to this pressure space 511 passes in one section through the hub 523 (in the hub section 527) of the common outer disk support of clutches B, E and in another section through the hub GN attached to the housing. The pressure equalization space 512 formed by the piston 514 and the compression disk 515 for compensating the dynamic pressure of the rotating pressure space 511 is arranged on the side of the piston 514 opposite to the pressure space 511, and so nearer the first planetary gearwheel assembly RS1 than the pressure space 511. The lubricant feed 519 to this pressure equalization space 512 passes in one section through the hub 523 (in the hub section 527) of the common disk support ZYLBE of the clutches B, E and in another section through the drive input shaft AN. The restoring element 513 for example formed as a cup spring is pre-stressed between the piston 514 and the compression disk 515, and the compression disk 215 rests axially against the input shaft AN.

The disk-shaped section 522 and the cylindrical section 524 and the cylindrical hub section 526 of the disk support ZYLBE (or input element of clutch E), together with the piston 214 of the servo device of clutch B, form the pressure space 211 of the servo device of clutch B. Spatially, the piston 214 essentially follows the meandering shaped structure of the common disk support ZYLBE of the clutches B, E and in the axial direction spans, in sections, radially completely across the second cylindrical section of the disk support ZYLBE and the clutch space formed by the disk support ZYLBE for the clutch E and the disks 200 of clutch B. The piston 214 extends in the axial direction far beyond the disk pack 200 of clutch B, as far as an area over the first planetary gearwheel assembly RS1. For the "pulling" actuation of the disks 200 of clutch B, the actuating rod 216 that acts on the disk pack 200 is attached to the piston 214 in the area above the disk pack 200 and extends radially inwards almost as far as the inner diameter of the disk pack 200. The pressure medium feed line 218 to the pressure space 211 of the servo device of clutch B passes in one section through the hub GN attached to the housing. The servo device of clutch B also has dynamic pressure compensation means. The corresponding pressure equalization space 212 for compensating the dynamic pressure of the rotating pressure space 211 is arranged spatially below the cylindrical section 524 of the disk support ZYLBE and is formed by the piston 214 and the compression disk 215. The lubricant feed 219 to this pressure equalization chamber 212 passes in one section through the hub 523 (in the hub section 526) of the disk support ZYLBE, in another section through the hub GN attached to the housing, and in another section through the drive input shaft AN. The restoring element 213 to restore the piston 214, made as a cup spring, is arranged outside the pressure equalization space 212 and is positioned on the side of the structural group consisting of clutches B and E opposite to the planetary gearwheel assembly RS1, against an outer surface of the piston 214. This cup spring 213 is axially pre-stressed between the outer surface of the piston 214 and a support collar of the hub 523 arranged at the outer rim of the first cylindrical hub section 526.

The first disk-shaped section 522 thus forms essentially the radially directed (here, largely perpendicular) outer casing surface of the disk support ZYLBE, on whose side facing towards the planetary gearwheel assembly RS1 is arranged the pressure space 511 of the servo device of clutch E, and on whose side facing away from the planetary gearwheel assembly RS1 is arranged the pressure space 211 of the servo device of clutch B. Thus, this area of the outer casing surface of the disk support ZYLBE separates the two pressure spaces 211 and 511 from one another. The pressure equalization spaces 212 and 512 of the servo devices of clutches B and E provided to compensate the dynamic pressures of the respective rotating pressure spaces 211 and 511, are in each case arranged on the side of the respective pressure space 211 and 511 facing away from this area of the outer casing surface of the disk support ZYLBE.

As a further detail it is provided that the piston 214 of the servo device of the clutch B, in its section spatially arranged over the planetary gearwheel assembly RS1, has a suitable transmitter profile at its outer diameter, which is sensed by a drive speed sensor NAN to determine the driveshaft speed (without contact).

The output element 230 of the clutch B is formed as an inner disk support. A cylindrical section 231 of this arranged inner disk support 230 extends starting from the disk pack 200 of clutch B, axially almost as far as the web plate STB11 of the first planetary gearwheel assembly RS1. On the outer diameter of this cylindrical section 231 there is a suitable carrier profile to hold the linings disks of disk pack 200. A disk-shaped section 232 of the inner disk support 230 of clutch B extends radially parallel to the web plate STB11 of the first planetary gearwheel assembly RS1 and is connected rotationally fast with the cylindrical section 231 about at the middle of its diameter, in this case for example riveted. On its outer diameter this disk-shaped section 232 is connected rotationally fast to the sun gearwheel SO1, in this case for example welded. The outer diameter of the disk-shaped section 232 is larger than the outer diameter of the web plate STB11 and the cylinder ZYL, which spans across the annular gearwheel HO1 of the planetary gearwheel assembly RS1 and is suspended and in which, in a form-locked way, the web plate STB11 is suspended. In the area of the outer diameter of the disk-shaped section 232 of the output element 230 of the clutch B, the input element 320 of the brake C (not shown in this section) is for example suspended with positive locking.

The output element 530 of the clutch E is also formed as an inner disk support. A cylindrical section 531 of this inner disk support 530 extends axially starting from the disk pack 500 of clutch E almost as far as the disk-shaped section 232 of the inner disk support 230 of clutch B. On the outer diameter of this cylindrical section 531 a section of a suitable carrier profile is provided to hold the lining disks of the disk pack 500. In one part the cylindrical section 531 of the inner disk support 530 of clutch E also extends radially just under the cylindrical section 231 of the inner disk support 230 of clutch B. A disk-shaped section 532 of the output element 530 is connected to the cylindrical section 531 and extends radially inwards, parallel to the disk-shaped section 232 of the inner disk support 230 of clutch B as far as the web shaft STW1, with which it is in rotationally fast connection, here for example by means of a weld joint. As is known, the web shaft STW1 extends radially over the drive input shaft AN and centrally within the sun gearwheel SO1, and so passes centrally through the first planetary gearwheel assembly RS1 and is kinematically linked on the side of the first planetary gearwheel assembly RS1 opposite to the web plate STB11 to further planetary gearwheel assembly elements (not shown in this section).

FIG. 7 shows a sectional view of the transmission according to FIG. 5, with a second example design detail for the structural group with the two clutches B and E. From a comparison between FIG. 7 and FIG. 6 described earlier in detail, it is easy to see that in this second design detail (according to FIG. 7) many design features from the first design detail (according to FIG. 6) of the structural group with the two clutches B and E are the same. Thus, the design of the servo devices (with their pressure spaces 211 and 511, the pistons 214 and 514, the restoring elements 213 and 513, the pressure medium feeds 218 and 518, the pressure equalization spaces 212 and 512, the compression disks 215 and 515, and the lubricant feeds 219 and 519) of the two clutches B, E are adopted virtually unchanged. Also as in FIG. 6 is the geometrical structure of the input element of the clutch E (with the hub 523, the disk-shaped sections 522 and 525, and the cylindrical sections 524 and 521) as a meandering shaped component when viewed in the radial direction, as a section of the outer disk support ZYLBE common to the clutches B and E. The pressure spaces 511 and 211 of the servo devices of the two clutches B and E are thus, as before, separated from one another by an outer casing surface of the disk support ZYLBE common to both clutches B,E, this surface being formed essentially by the first disk-shaped section 522.

Although the disk packs 200 and 500 of the two clutches B, E are as before arranged next to one another when viewed in the axial direction, in contrast to FIG. 6 this time they are offset in the radial direction. The disk pack 200 of clutch B has a larger diameter than the disk pack 500 of clutch E. In particular, therefore, a friction surface inner diameter of the lining disks of the disk pack 200 of clutch B is larger than a friction surface outer diameter of the lining disks of the disk pack 500 of clutch E. In this, the diameter of the disk pack 200 is chosen such that when viewed axially, the disk pack 200 can be arranged radially over the first planetary gearwheel assembly RS1 close to the clutch arrangement. This "nesting" of components has advantages on the one hand in relation to the structural length of the transmission, and on the other hand also in relation to the outer diameter of the transmission housing in a section of the transmission housing for which, in a vehicle whose drive motor is mounted transversely to the driving direction, notoriously restricted structural space is available because of the body structure.

Correspondingly, the transition between the cylindrical section 221 of the disk support ZYLBE (to be associated with the input element of clutch B) and the first cylindrical section 521 of the disk support ZYLBE (associated with the input element of clutch E) also comprises a diameter change or step. Against this step rest the disks 200 of the clutch B when they are axially actuated (by a "pull"). To provide axial support for the disks 500 of the clutch E during their ("pushed") actuation, a locking ring 501 is fitted, which engages with the disk carrier profile of the cylindrical section 521 and is secured axially to the section 521 of the disk support ZYLBE by suitable means. It will be clear to those with knowledge of the subject that before the fitting and axial securing of this locking ring 501, the disk support ZYLBE common to both clutches B, E must be completed with the servo device and disk pack 500 of the clutch E. Such axial securing means can for example be a groove milled at the corresponding axial position in the area over the locking ring 501 radially into the carrier profile of the disk support ZYLBE, or impressed radially as a recess in the material (material indentation). Other examples of such axial securing are a subsequent flanging-over of the locking ring 501 onto the disk support ZYLBE, or radial recesses (material indentations) in the carrier profile of the disk support ZYLBE formed subsequently next to the locking ring 501 on the side thereof facing away from the disk pack 500, or even pinning of the locking ring 501 onto the disk support ZYLBE.

As an alternative connection method between the disk support ZYLBE and the drive input shaft AN, FIG. 7 now shows as an example a permanent joint. Spatially, the input shaft AN is welded to the hub 523 of the disk support ZYLBE in the area of the hub section 527 close to the planetary gearwheel assembly.

Compared with FIG. 6, the drive speed sensor is in a slightly different position. The transmitter profile on the outer diameter of the piston 214 of the servo device of clutch B, which is sensed by the speed sensor NAN in order to measure the rotation speed of the drive input shaft, is now spatially arranged over the disk pack 500 of the clutch E.

The output element 530 of the clutch E formed as the inner disk support has an axial, only short cylindrical section 531, at whose outer diameter a suitable carrier profile for holding the lining disks of the disk pack 500 is provided. Directly next to the disk pack 500, on the side thereof facing away from the servo device of the clutch E, this cylindrical section 531 is followed by the disk-shaped section 532 which extends—axially directly adjacent to the compression disk 515—radially inwards as far as the web shaft STW1, to which it is connected.

The output element 230 of the clutch B, formed as an inner disk support, has a cylindrical section 231 arranged axially next to the disk pack 500 of the clutch B and also next to the servo device of the clutch E, which when viewed axially, extends radially over the (here incompletely pictured) first planetary gearwheel assembly and has at its outer diameter a suitable carrier profile for holding the lining disks of the disk pack 200. On the side of the cylindrical section 231 facing the clutch E, the cylindrical section 231 is followed by a disk-shaped section 232 of the inner disk support 230 of clutch B which extends—axially directly adjacent to the side of the disk pack 500 facing away from the pressure space and the disk-shaped section 532 of the inner disk support 530 of clutch E—radially inwards as far as the sun gearwheel SO1 of the first planetary gearwheel assembly. As can be seen from FIG. 7, in contrast to FIG. 6 the inner disk support 530, therefore, does not extend in a section within a space formed by the inner disk support 230 of the clutch B.

As can also be seen from FIG. 7, the brake C is arranged next to the disk pack 200 of clutch B, on the side of the disk pack 200 opposite to clutch E. In terms of diameter the disks 300 of the brake C are at least of similar size to the disks 200 of the clutch B. The input element 320 of brake C formed as an inner disk support and the inner disk support 230 of clutch B are made as one piece. The cylindrical section 321 of this input element 320 has at its outer diameter a suitable carrier profile to hold the lining disks of disk pack 300 and is axially directly adjacent to the cylindrical section 231 of the output element 230 of the clutch B. From the production technology standpoint it is advantageous for the lining disk carrier profiles of both disk packs 300, 200 to be identical, which also enables the use of the same type of lining disks.

Also shown in FIG. 7 is an output element 330 of the brake C, formed as a cylindrical outer disk support with a corresponding disk carrier profile for the outer disks of disk pack 300, this element being made as a separate structural unit. Such a cylinder can for example also comprise the servo device of brake C and even the complete brake D (including its servo device and disks) and be pre-assembled as a structural group, which is then incorporated in the transmission housing and secured against rotation.

Figure 8:
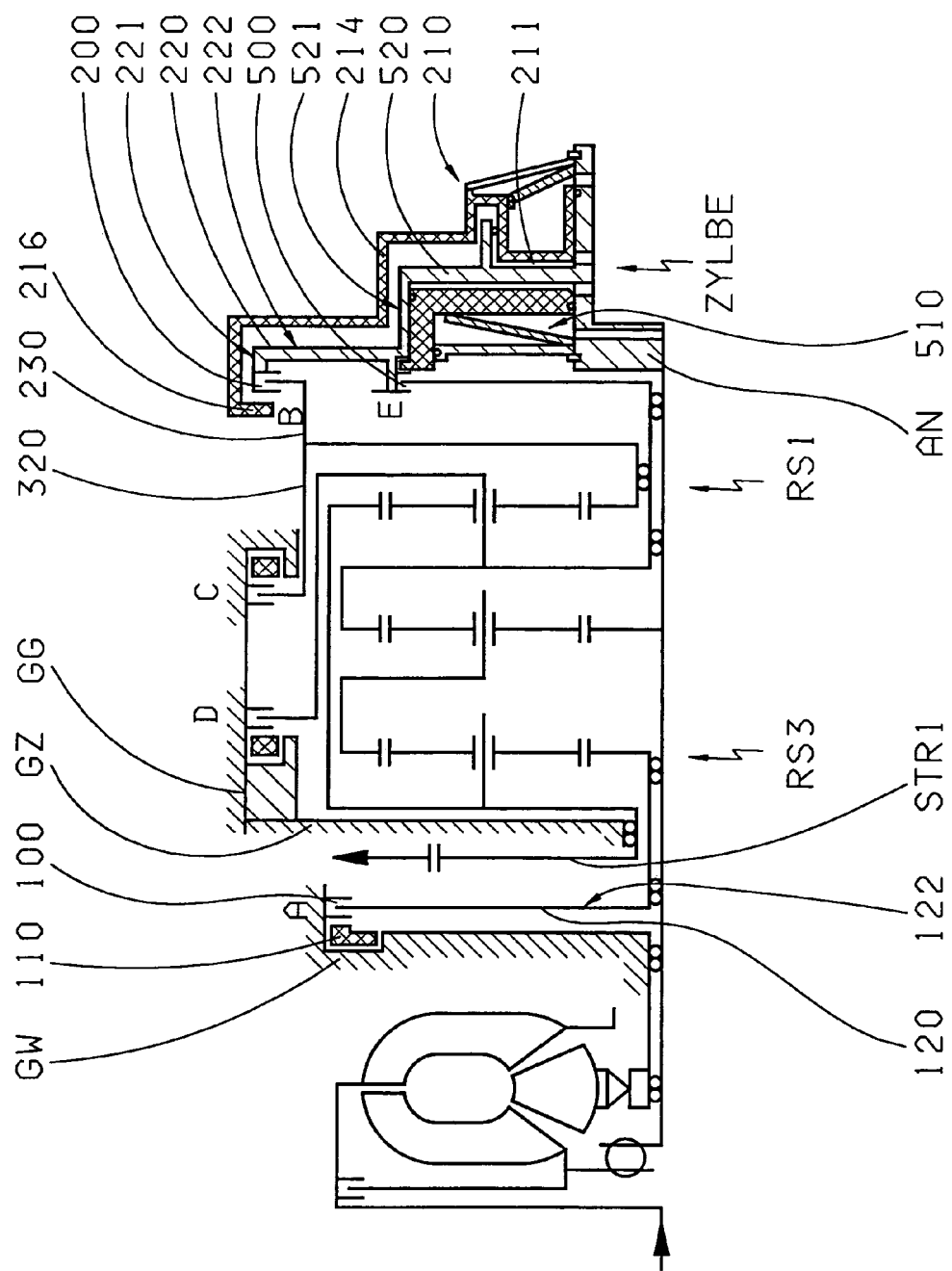
FIG. 8 is a schematic illustration of a second example of a component arrangement according to the invention.

With reference to FIG. 8, a second example component arrangement according to the invention will now be described in more detail. This second component arrangement according to the invention is similar to the first component arrangement described in detail with reference to FIG. 5. The essential differences from FIG. 5 relate to the spatial arrangement of the disk packs 200 and 500 of the second and fifth shift control elements B, E relative to one another and relative to the first planetary gearwheel assembly RS1, the spatial arrangement and mounting of the first spur gearwheel STR1 relative to the brake A and the third planetary gearwheel assembly RS3, and the spatial arrangement of the servo device 110 of the brake A.

As can be seen from FIG. 8, the structure of the structural group comprising the two clutches B and E and the spatial arrangement of this structural group as a whole in the automatic transmission are essentially identical to FIG. 5. In contrast to FIG. 5, however, the disk packs 200 and 500 are spatially no longer adjacent, but are arranged one over the other. In this, the disk pack 200 of clutch B, viewed in the axial direction, is arranged at least mainly radially over the disk pack 500 of clutch E. Thus, both disk packs 200, 500 are positioned close to the first planetary gearwheel assembly RS1. The advantageously large diameter of the disks 200 allows for the high thermal loading of the clutch B determined by the design.

For both clutches B, E a common disk support ZYLBE is provided as their input elements 220, 520, this being formed as an outer disk support for the two clutches B, E and being connected to the drive output shaft AN. The input element 220 of clutch B is thus again connected to the drive output shaft AN via the input element 520 of the clutch E. As far as the geometrical link of the input element 220 of clutch B to the input element 520 of clutch E, the geometrical and functional design of this common outer disk support ZYLBE is identical to FIG. 5. The input element 220 of clutch B now also comprises, adjacent to the cylindrical section 221 at whose inner diameter the disk pack 200 of clutch B is arranged, a disk-shaped section 222. This disk-shaped section 222 extends on the side of the disk pack 200 facing towards the pressure space 211 of the servo device 210 of the clutch B, and starting from the cylindrical section 221, radially inwards as far as the (first) cylindrical section 521 of the input element 520 of the clutch E, to which it is connected. As in FIG. 5, the piston 214 of the servo device 210 of clutch B spans radially completely across the input element 220 and the disk pack 200 of clutch B in the axial direction. The disks 200 are actuated by the servo device 210 of clutch B in a "pulling" mode, while in contrast the disks 500 of clutch E are actuated by the servo device 510 of clutch E in a "pushing" mode, as described earlier in detail with reference to FIG. 5.

As can also be seen from FIG. 8, the housing partition wall GZ attached fast to the transmission housing, on which the first spur gearwheel SRT1 of the spur gearing stage in active connection with the drive output shaft is mounted, is now spatially arranged between the third planetary gearwheel assembly RS3 and the spur gearwheel STR1, directly axially adjacent to the planetary gearwheel assembly RS3 and the spur gearwheel STR1. Obviously, instead of the spur gearing stage a chain drive can be provided. On the side of the first spur gearwheel STR1 opposite to the housing partition wall GZ is arranged the brake A, with a disk-shaped section 122 of the input element 120 of the brake A formed in this case as an inner disk support axially directly adjacent to the spur gearwheel STR1. The servo device 110 of the brake A is now integrated in the housing wall GW, which as before forms an outer wall of the automatic transmission, and actuates the disks 100 of the brake A axially in the direction of the spur gearwheel STR1 or the third planetary gearwheel assembly RS3.

Figure 9:
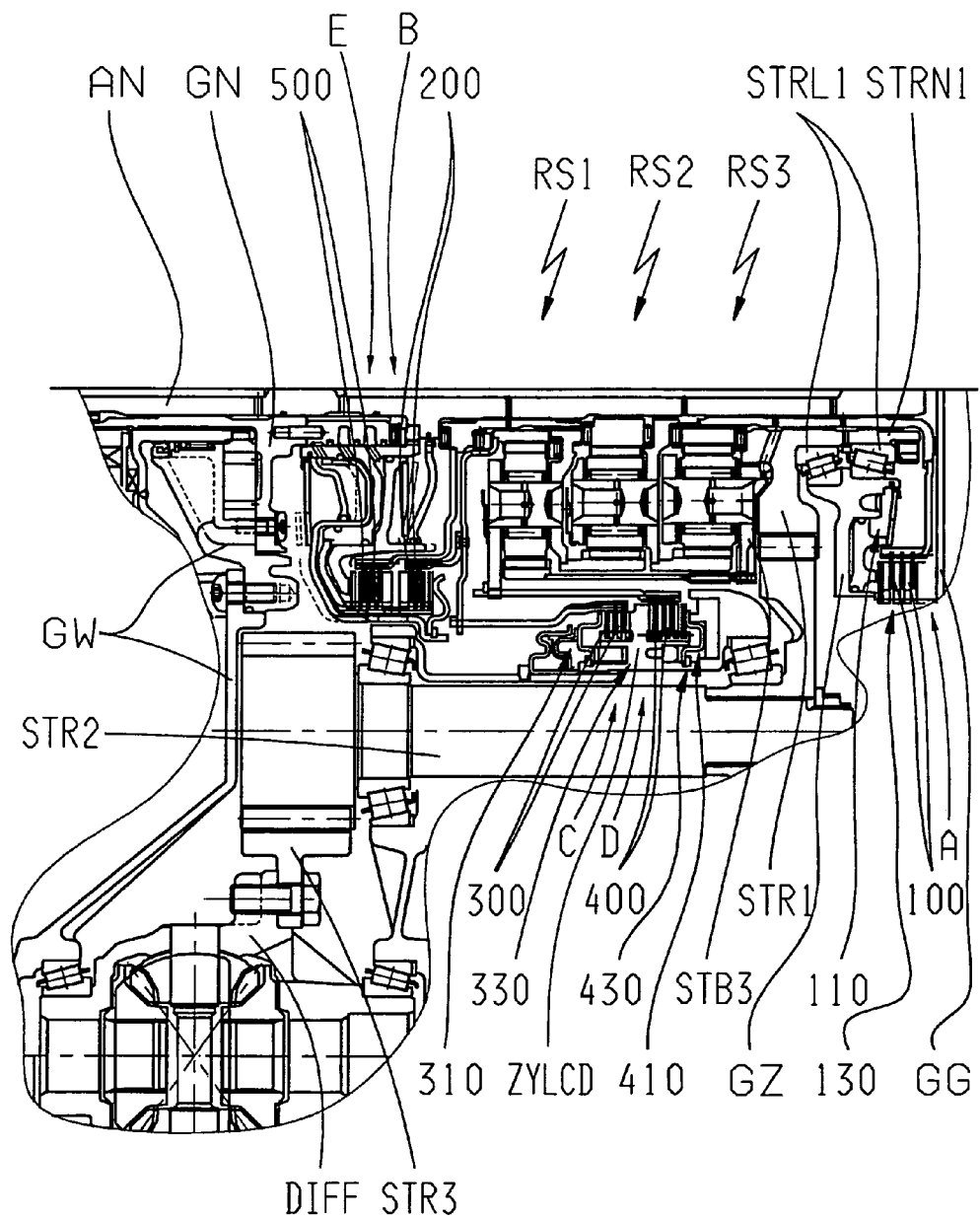
FIG. 9 is a sectional view of an example transmission according to FIG. 5.

FIG. 9 now shows a sectional view of a transmission structure produced in practice, based on the transmission section shown in FIG. 5 with the essential features of the design detail shown in FIG. 6. Relative to the spatial arrangement known from FIG. 5 for the three planetary gearwheel assemblies RS1, RS2, RS3 and the five shift control elements A to E, the position of the drive motor of the automatic transmission is now mirror-reflected. The drive motor in active connection with the input shaft AN is thus now arranged on the side of the transmission where the structural group with the two clutches B and E is positioned. The differential DIFF of the automatic transmission connected to the drive output shaft (not shown here), however, is again arranged near the drive motor, so that between the first spur gearwheel STR1 of the spur gearing stage STST and the third spur gearwheel STR3 thereof, which is connected (here for example bolted) to the differential DIFF, there is a large axial distance, which is bridged by the second gearwheel STR2 of the spur gearing stage STST in this case made as a lateral shaft. The first spur gearwheel STR1 of the spur gearing stage in active connection with the drive output shaft (not shown here) of the automatic transmission is directly adjacent to the third planetary gearwheel assembly RS3, on the side of the web plate STB3 of the third planetary gearwheel assembly RS3 opposite the second (middle) planetary gearwheel assembly RS2. The mounting STRL1 of the first spur gearwheel STR1 is made for example as a rigid conical-roller mounting with two conical-roller bearings immediately adjacent to one another. The inner bearing rings of these two conical-roller bearings are clamped axially by a shaft nut on a spur gearwheel hub STRN1 of the spur gearwheel STR1, which extends axially in the direction opposite to the third planetary gearwheel assembly RS3. The outer bearing rings of the two conical-roller bearings are each held in a mounting bore of the housing partition wall GZ and are each supported against an abutment shoulder of the housing partition wall GZ which is located axially between the two conical-roller bearings and extends radially inwards. Thus, the spur gearwheel hub STRN1 of the spur gearwheel STR1 passes centrally through the housing partition wall GZ.

The partition wall GZ at the same time forms an output element 130 of the brake A, which is formed as an outer disk support with a corresponding carrier profile to hold the outer disks of the disk pack 100 of brake A. Viewed in the axial direction, brake A is arranged partly radially over the mounting STRL1 of the first spur gearwheel STR1, in particular the servo device 110 of brake A integrated in the housing partition wall GZ. The housing partition wall GZ is attached on, and rotationally fixed relative to the transmission housing GG, the corresponding (usual) bolts not being shown in FIG. 9 for simplicity. The mounting of the intermediate shaft STR2 is formed for example of two conical-roller bearings, the first of these being spatially arranged in the area over the third planetary gearwheel assembly RS3 on the side of the first spur gearwheel STR1 facing away from the mounting STRL1 or the brake A. The second of these conical-roller bearings is spatially arranged in the area over the adjacent disk packs 200 and 500 of the clutches B and E, axially in front of the third spur gearwheel STR3 as viewed from the direction of the first spur gearwheel STR1. The housing wall GW on the drive motor side is in this example made in two pieces, one part of this two-piece housing wall GW being a differential cover which covers the differential DIFF on the drive motor side. In the part of the two-piece housing wall GW near the drive input shaft are integrated a pump and various pressure medium ducts, for supplying the various transmission components with lubricant and the shift control elements with pressure medium. The brake A is correspondingly arranged at the end of the transmission housing GG facing away from the drive motor.

The brakes C and D form a pre-assembled structural group incorporated as a whole in the transmission housing. This structural group comprises the output elements 330, 430 of the two brakes C and D formed as outer disk supports, the disk packs 300, 400 of the two brakes C, D, and their respective servo devices 310, 410. Advantageously, the two outer disk supports 330 and 430 are made as a single cylindrical component, denoted as ZYLCD in FIG. 9, in which parts of the servo devices 310 and 410 are also integrated. Such a structural group is for example known from DE 101 31 816 A1 by the present applicant. As a further detail, FIG. 9 also shows that the cylinder ZYLCD has a bearing seat for the conical-roller bearing of the mounting of the lateral shaft STR2 close to the spur gearwheel STR1.

Below, with reference to FIGS. 10 to 17 various component arrangements according to the invention will be explained in greater detail, in which the servo devices of the two clutches B and E have the same actuation direction when the clutches are closed.

Figure 10:
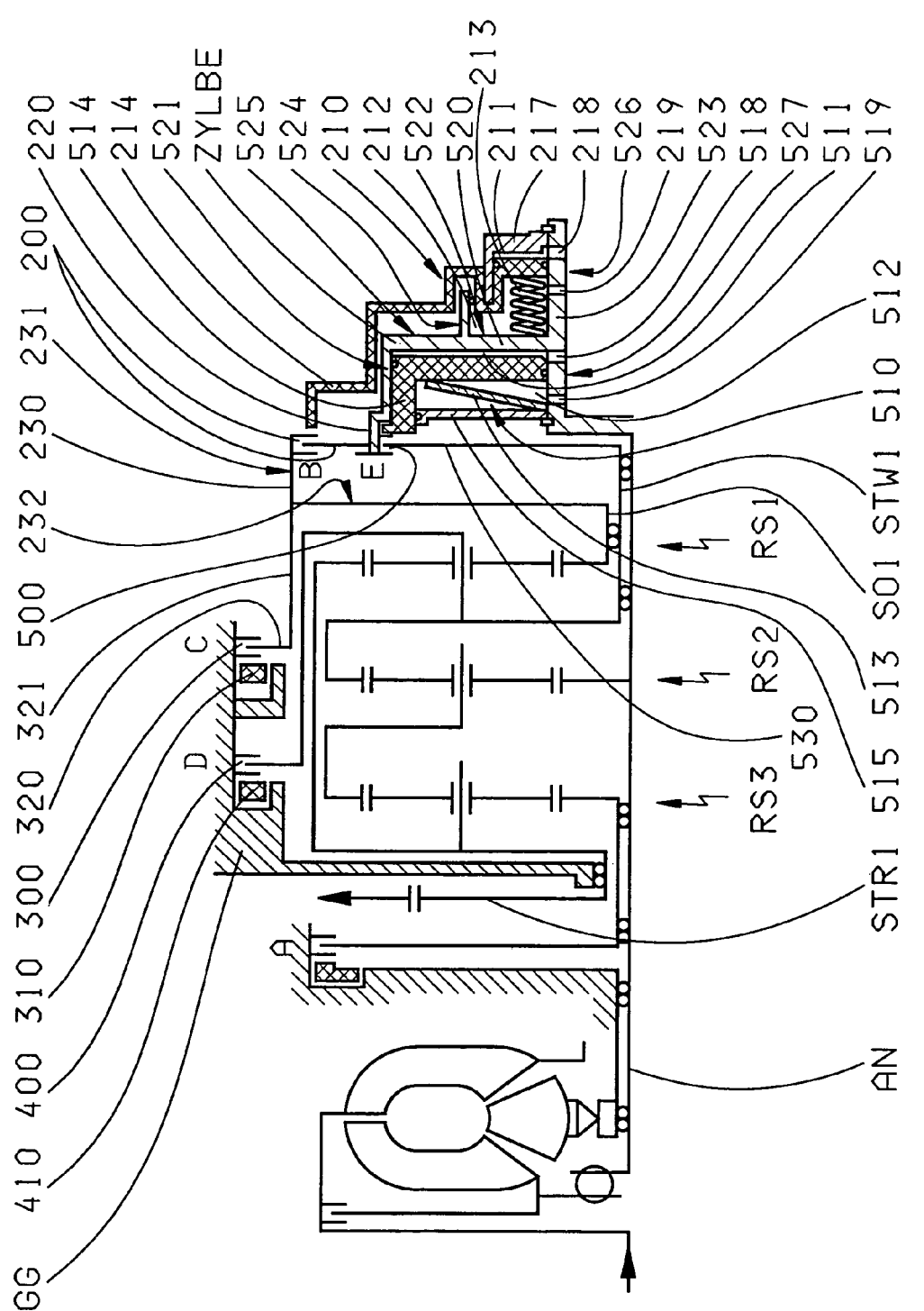
FIG. 10 is a schematic illustration of a third example of a component arrangement according to the invention.

FIG. 10 now illustrates schematically an example third component arrangement according to the invention. In this case the third component arrangement according to the invention is similar to the second component arrangement illustrated schematically in FIG. 8.

As can be seen from FIG. 10, the clutches B and E form a pre-assembled structural group arranged on the side of the first planetary gearwheel assembly RS1 opposite the other planetary gearwheel assemblies RS2, RS3. The input element 520 of clutch E and the input element of clutch B are combined as a common disk support ZYLBE which is connected to the drive input shaft AN by suitable means (carrier profile, weld joint, construction as one piece, etc.). The input element 220 of clutch B is thus connected in the same way as before to the drive input shaft AN via the input element 520 of clutch E. Accordingly, the common disk support ZYLBE forms the outer disk support 520 of clutch E and the inner disk support 220 of clutch B. The disk packs 200 with the outer and lining disks of clutch B and 500 with the outer and lining disks of clutch E are spatially at least largely arranged over one another, such that—as in FIG. 8—the disk pack 200 of clutch B is the outer of the two disk packs and both disk packs 200, 500 are arranged axially next to the first planetary gearwheel assembly RS1.

In contrast to the example embodiments of the invention described earlier, both the actuation of the disks 500 when the clutch E is closed—relative to the spatial position of the pressure space 511 of the servo device 510 of clutch E—and the actuation of the disks 200 when the clutch B is closed—relative to the spatial position of the pressure space 211 of the servo device 210 of clutch B—take place by "pushing". In accordance with the arrangement of the two disk packs 200, 500 in the transmission relative to the planetary gearwheel assemblies, the two servo devices 210, 510 actuate the disks 200 or 500 respectively associated with them axially in the direction of the first planetary gearwheel assembly RS1 when the clutch is closed.

As is evident from the nomenclature chosen, the geometrically differently formed sections 523, 522, 525, 521 and 524 of the disk support ZYLBE common to clutches B and E are associated with the input element 520 of clutch E. The hub 523 is connected to the input shaft AN and for its part comprises two cylindrical hub sections 527 and 526 that extend axially. These two hub sections 527 and 526 are spatially separated from one another by the first disk-shaped section 522. Starting from the outer diameter of the hub 523, this first disk-shaped section 522 extends approximately from the middle of the hub radially outwards and merges into the second disk-shaped section 525, which then extends further radially outwards. The hub section 527 is on the side of the disk-shaped section 522 facing towards the planetary gearwheel assembly RS1. Correspondingly, the hub section 526 is on the side of the disk-shaped section 522 facing away from the planetary gearwheel assembly RS1. The outer diameter of the disk-shaped section 525 is followed by the first cylindrical section 521, which extends axially towards the planetary gearwheel assembly RS1 as far as the disk pack 500 of the clutch E. At its inner diameter the first cylindrical section 521 has a suitable carrier profile for holding the outer disks of the disk pack 500 of clutch E. In addition, the first cylindrical section 521 has at its outer diameter a suitable carrier profile to hold the lining (inner) disks of the disk pack 200 of clutch B. The outer diameter of the first disk-shaped section 522 is again connected to the second cylindrical section 524, which extends radially over the hub section 526 axially in the direction opposite to the planetary gearwheel assembly RS1 and to the disk packs 500, 200.

Thus, the disk support ZYLBE common to clutches B, E forms a clutch space within which is arranged the clutch E with its disk pack 500 and its servo device 510. In this, the servo device 510 of clutch E (including its pressure space 511, its piston 514, its pressure equalization space 512, its restoring element 513 and its compression disk 515), is spatially arranged at least largely radially over the hub section 527. The pressure space 511 is formed by the piston 514 and the disk-shaped section 522, the cylindrical hub section 527 and part of the cylindrical section 521 of the disk support ZYLBE. The pressure equalization space 512 formed by the piston 514 and the compression disk 515 for compensating the dynamic pressure of the rotating pressure space 511 is arranged on the side of the piston 514 opposite to the pressure space 511, i.e., closer to the first planetary gearwheel assembly RS1 than is the pressure space 511. The pressure medium feed line to the pressure space 511 is again indexed 518, and the lubricant feed line to the pressure equalization space 512 is indexed 519. The restoring element 513, in this case made for example as a cup spring, is pre-stressed between the piston 514 and the compression disk 515, and the compression disk 515 rests axially against the hub 523 of the disk support ZYLBE.

The pressure space 211, the pressure equalization space 212 and the restoring element 213 of the servo device 210 of the clutch B are spatially arranged radially over the hub section 526. The pressure equalization space 212 is immediately adjacent to the first disk-shaped section 522 of the disk support ZYLBE, and is formed by this disk-shaped section 522, the cylindrical hub section 526, the cylindrical section 524 and the piston 514. In this area the piston 514 is thus separated by the pressure equalization space 212 from the outer casing surface of the disk support ZYLBE. The piston 214 can be displaced axially relative to the second cylindrical section 524 and is sealed (in an at least largely lubricant-tight way) preferably against the inner diameter of the second cylindrical section 524. The piston 214 covers the second cylindrical section 524 in the axial and radial direction. In the radially lower area of the pressure equalization space 212 is arranged the restoring element 213, in this case for example made as a helical spring pack and pre-stressed between the disk support section 522 and the piston 514, so that in the area of the pressure equalization space 212 the piston 214 has a meandering shaped structure directed radially overall. Geometrically, in its further course the piston 214 at least largely follows the outer contour of the disk support ZYLBE common to both clutches in the axial and radial directions, and finally extends axially as far as the disk pack 200 of clutch B.

The pressure space 211 for actuating the piston 214 is correspondingly arranged on the side of the piston 214 opposite to the pressure equalization space 212. The space 211 is formed by the piston 214, the cylindrical hub section 526 and by a cylindrical supporting disk 217. This supporting disk 217 has a disk-shaped section whose inner diameter is pushed over the hub section 526 of the hub 523, axially secured in the area of the axially outer (away from the gearwheel assembly) edge of the hub section 526 on the hub 523, and thereby also sealed against the hub 523 (in a pressure-medium-tight way). The outer diameter of the disk-shaped section of the supporting disk 217 is followed by a cylindrical section which extends axially in the direction of the pressure equalization space 212. The piston 214 can be axially displaced relative to this cylindrical section of the supporting disk 217 and to the cylindrical hub section 526, against which it is sealed (pressure-medium-tight). The pressure medium feed to the pressure space 211 is again indexed 218 and the lubricant feed to the pressure equalization space 212 is indexed 219.

It will be clear to a person with knowledge of the field that the radial extension of the pressure equalization space 212, i.e., the diameter of the second cylindrical section 524 is adapted to the geometry of the pressure space 211, preferably in such manner that the rotational pressure component of the clutch pressure of clutch B is at least largely compensated.

As can be seen in FIG. 10, the pressure space 511 of the servo device 510 of clutch E and the pressure equalization space 212 (provided so as to compensate the dynamic pressure of the rotating pressure space 211) of the servo device 210 of clutch E, are directly adjacent to the outer casing surface (sections 522 and 525) of the disk support ZYLBE common to the two clutches B, E. The pressure space 211 of the servo device 210 of clutch B is arranged correspondingly on the side of this disk support outer surface (sections 522 and 525) opposite to the pressure equalization space 212 of the servo device 210 of clutch B. The pressure equalization space 512 (provided so as to compensate the dynamic pressure of the rotating pressure space 512) of the servo device 510 of clutch E, is correspondingly arranged on the side of this disk support outer casing surface (sections 522 and 525) opposite to the pressure space 511 of the servo device 510 of clutch E.

As in FIG. 8, so too in FIG. 10 the output element 530 of clutch E is formed as an axially narrow inner disk support, which, starting from the inner diameter of the disk pack 500, axially adjacent to the servo device 510 of clutch E and its pressure equalization space 512, extends radially inwards as far as the web shaft STW1, to which it is connected. As already described several times, the web shaft STW1 is mounted on the drive input shaft AN, passes centrally through the sun gearwheel SO1 of the first planetary gearwheel assembly RS1, and forms the kinematic connection between the inner disk support 530 of clutch E and the other gearwheel assembly elements in accordance with the force-flow scheme.

The output element 230 of clutch B is now formed as an outer disk support, with a cylindrical section 231 at whose inner diameter a suitable carrier profile is provided for holding the outer disks of the disk pack 200 of the clutch, and with a disk-shaped section 232 adjacent to the cylindrical section 231 on the side thereof facing away from the actuation side of the disk pack 200, which extends radially inwards as far as the sun gearwheel SO1 of the first planetary gearwheel assembly RS1, to which it is connected.

The input element 320 of the brake C is formed as a cylindrical inner disk support, which when viewed axially, extends radially above the second and first planetary gearwheel assemblies RS2, RS1 and spans completely over the first planetary gearwheel assembly RS1. On its side facing the clutch B, the cylindrical section 321 of the inner disk support 320 of the brake C abuts against the outer disk support 230 of clutch B, in this case for example against its cylindrical section 231, and is connected thereto by suitable means (for example in a positive locked or material-enclosing way). In a different design it could for example be provided that the cylindrical section 321 of the inner disk support 320 of the brake C (or the entire inner disk support of brake C) and the cylindrical section 231 of the outer disk support 230 of the clutch B are made as one piece.

As can also be seen from FIG. 10, the first spur gearwheel STR1 is for example mounted directly on an inner wall of the transmission housing GG, which extends radially into the inside space of the transmission. This inner wall thus forms, as it were, the housing partition wall shown in FIG. 5, but this time as a fixed section of the transmission housing. As in FIG. 5, the two brakes C, D are spatially arranged in an area over the adjacent planetary gearwheel assemblies RS1, RS2, RS3, with brake D mainly over the third planetary gearwheel assembly RS3 and brake C mainly over the (middle) second planetary gearwheel assembly RS2. In contrast to FIG. 5, the actuation directions of the servo devices 310 and 410 of the two brakes C, D when actuating the respective disk packs 300, 400 are the same. On closing, both servo devices 310, 410 actuate the disk pack 300 or 400 respectively associated with them axially towards the first planetary gearwheel assembly RS1 and the structural group comprising the two clutches B and E.

Figure 11:
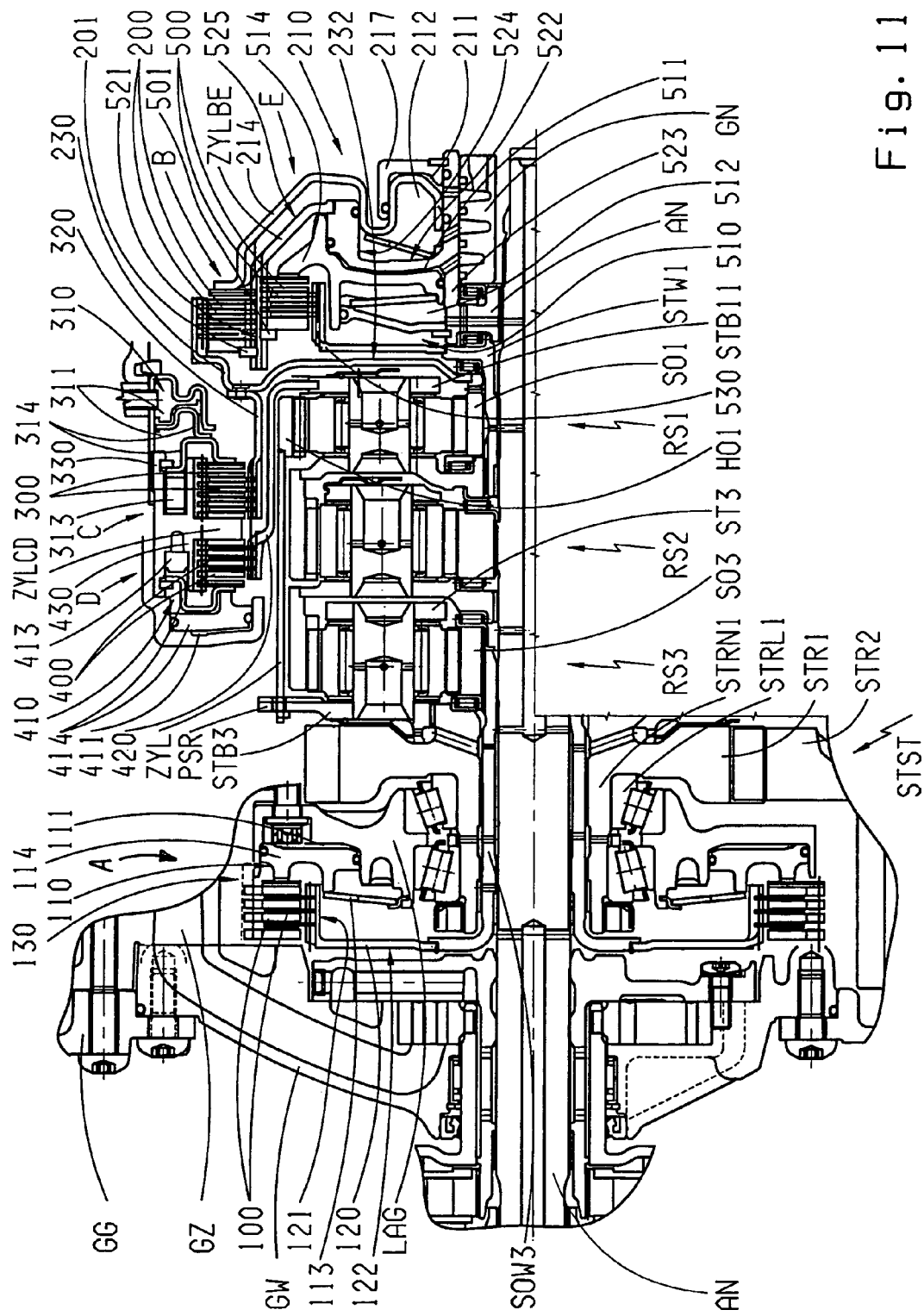
FIG. 11 is a sectional view of an example transmission according to FIG. 10.

FIG. 11 now shows a sectional view of a transmission design produced in practice, according to FIG. 8. The design of the structural group with clutches B, E corresponds to the arrangement proposed in FIG. 10, so that it is largely unnecessary to reiterate a detailed description of the individual elements of this structural group (which are indexed in the same way). For the structural design of the disk support ZYLBE common to both clutches, reference is also made to the embodiment of the disk support ZYLBE illustrated here, which is favorable in terms of production technology and cost. As can be seen in FIG. 11, the disk support ZYLBE is made as a two-part structure. The first structural element of the disk support ZYLBE is a cast, forged or turned component and comprises the disk support hub 523, the first disk-shaped section 522 and the second cylindrical section 524 of the disk support ZYLBE. The second element of the disk support ZYLBE is a shaped sheet component and comprises the second (approximately) disk-shaped section 525 and the first cylindrical section 521 of the disk support ZYLBE. The two structural elements of the disk support ZYLBE are connected to one another, here for example welded. Thanks to this design of the disk support ZYLBE, the disk carrier profile for the lining disks of the (outer) disk pack 200 of clutch B and the carrier profile for the (inner) disk pack 500 of clutch E can advantageously be made in one working step, with correspondingly matched carrier profiles for the disks concerned. As a detail, in addition two locking rings 201 and 501 are also shown. The locking ring 201 serves as an axial abutment surface for the disk pack 200 of clutch B, against which this disk pack 200 rests when the pressure space 211 of the servo device 210 is pressurized. The locking ring 501 serves as an axial abutment for the disk pack 500 of clutch E, against which this disk pack 500 rests when the pressure space 511 of the servo device 510 is pressurized. Both locking rings 201 and 501 are axially fixed on the disk support ZYLBE by suitable means. In the example shown, the locking rings 201, 501 are set into appropriately shaped grooves in the disk support ZYLBE provided for that purpose.

The brakes C and D form a pre-assembled structural group, which is incorporated in the transmission housing as a whole. This group comprises the output elements of the two brakes C and D, formed as outer disk supports, the disk packs 300, 400 of the brakes C, D, and their servo devices 310, 410. Advantageously, the two outer disk supports 330 and 430 are made as a one-piece cylindrical component ZYLCD, in which parts of the servo devices 310 and 410 are also integrated. The two disk packs 300, 400 are separated from one another by a contact shoulder of the common outer disc support ZYLCD approximately mid-way along the cylinder. The pistons 314 and 414 of the servo devices 310, 410 are in each case arranged on the outer end face of the respective disk pack 300 or 400. The restoring elements 313 and 413 of the servo devices 310, 410 are each arranged spatially radially over the respective disk pack 300 or 400. The actuation directions of the two servo devices 310, 410 when the respective brakes C or D are closed as a result of pressurization of the respective pressure spaces 311 or 411 of the servo devices 310 or 410, are thus opposite to one another. Such a structural group is known from DE 101 31 816 A1 by the present applicant. Brake C is positioned closer to the structural group with the two clutches B and E than is brake D. Viewed axially, brake C is arranged in an area radially over the first and second (middle) planetary gearwheel assemblies RS1, RS2, and brake D in an area radially over the second (middle) and third planetary gearwheel assemblies RS2, RS3.

As a detail, it should also be mentioned here that for brake C, in this case for example two pressure spaces 311 that can be actuated independently of one another are provided, which both act on the disk pack 300. In this way the closing pressure of brake C can be controlled or regulated as a differential pressure between the two pressure spaces 311, which is known to be particularly favorable when the shift control element in question has to be engaged in several shift modes whose shift pressure levels are distinctly different from one another because of the torques to be engaged. Obviously, in a different design it can also be provided that in addition or even exclusively for brake D, two pressure spaces that can be actuated independently of one another are provided.

As a further detail, something should also be said about the example design of the restoring element of the servo device 410 of brake D as a hydraulically actuated pressure space that acts on the piston 414. A person with knowledge of the subject will use such a hydraulic piston restoring device if necessary also for differential-pressure control or regulation. Obviously, in another design it can also be provided that such a hydraulic piston restoring device can be additionally or even exclusively provided for the brake C. Obviously, such a hydraulic piston restoring device can also be combined with a mechanical restoring element, for example with a cup spring arranged in the annular pressure space of the hydraulic piston restoring device or a packet of parallel helical springs arranged in the annular space.

As can be seen from FIG. 11, the disks 200, 300 and 400 of clutch B, brake C and brake D have at least approximately the same diameter. The output element (outer disk support) 230 of the clutch B is for example made as a cylindrical sheet structure, which at the smallest diameter of its disk-shaped section 232 is connected (here for example, welded) to the sun gearwheel SO1 of the first planetary gearwheel assembly RS1. The input element 320 (inner disk support) of brake C is for example made as an annular sheet structure which—spatially, approximately over the web plate STB11 of the web of the first planetary gearwheel assembly RS1 facing towards clutch E and approximately at the diameter of the disks 200 of clutch B—is connected (here for example, riveted) to the disk-shaped section 232 of the outer disk support 230 of clutch B. The input element (inner disk support) 420 of brake D is also for example made as a cylindrical sheet structure, which, viewed axially, spans radially completely across the first and second planetary gearwheel assemblies RS1, RS2 and thus, in sections, passes radially under the inner disk support 320 of brake C and at its smallest diameter is connected at the outer diameter of the web plate STB11 of the first planetary gearwheel assembly RS1 facing towards the clutches B, E to the web plate STB11, here for example by welding, on a diameter which is somewhat smaller than the part-circle diameter of the annular gearwheel HO1 of the first planetary gearwheel assembly RS1.

As a further detail FIG. 11 shows a parking brake gear PSR which, viewed axially, is arranged radially over the web plate STB3 of the web ST3 of the third planetary gearwheel assembly RS3 opposite the second planetary gearwheel assembly RS2. In this, the web plate STB3 and the parking brake gear PSR are made as one piece. In a known way, a circumferential toothed profile is provided on the outer diameter of the parking brake gear PSR, in which a parking brake pawl (for simplicity, not shown in FIG. 11) can engage to block the transmission output. The cylinder ZYL, which according to the kinematic clutch of the individual gear assembly elements forms the connection between the web plate STB3 of the third planetary gearwheel assembly RS3 and the annular gearwheel HO1 of the first planetary gearwheel assembly RS1, passes through corresponding axial cut-outs in the web plate STB3 under the toothed profile of the parking brake gear PSR and is axially secured on the side facing away from the gearwheel assembly.

As can also be seen from FIG. 11, to transmit the initial rotation speed of the planetary gearwheel assembly combination (here, the speed of the web ST3 of the third planetary gearwheel assembly RS3 connected to the annular gearwheel HO1 of the first planetary gearwheel assembly RS1) to the drive output shaft (for simplicity, not shown in FIG. 11) of the automatic transmission, for example a spur gearing stage STST is again provided. The first spur gearwheel STR1 of this spur gearing STST is in this case spatially arranged axially between the third planetary gearwheel assembly RS3 and the brake A, on the one hand axially directly adjacent to the sun gearwheel SO3 and the web plate STB3 (arranged on the side of the third planetary gearwheel assembly RS3 facing away from the middle planetary gearwheel assembly RS2) of the third planetary gearwheel assembly RS3, and on the other hand axially directly adjacent to the inner disk support 120 of the brake A. In the example illustrated, a positive locking connection is provided between the spur gearwheel STR1 and the web plate STB3, such that the corresponding carrier profile is spatially arranged on the inner diameter of the web plate STB3. To support the axial forces of an oblique tooth array of the first spur gearwheel STR1 in the direction of the planetary gearwheel assembly, an axial bearing is arranged between the spur gearwheel STR1 and the sun gearwheel SO3. The mounting of the first spur gearwheel STR1, for example made as a rigid conical-roller mounting, is indexed STRL1 and comprises for example two immediately adjacent conical-roller bearings. The inner bearing rings of these two conical-roller bearings are axially fixed on a spur gearwheel hub STRN1 of the first spur gearwheel STR1, which extends in the direction opposite to the third planetary gearwheel assembly RS3, by means of a shaft nut. The outer bearing rings of the two conical-roller bearings are set into respective bearing bores of a mounting plate LAG and are each supported on an inward-extending contact shoulder of the mounting plate LAG located axially between the two conical-roller bearings. Obviously, instead of the two individual conical-roller bearings, the spur gearwheel mounting STRL1 can consist for example of a composite conical-roller bearing or even a grooved ball bearing.

The mounting plate LAG itself is set into a corresponding mounting plate bore of the housing partition wall GZ, and is bolted to this housing partition wall. Thus, the spur gearwheel hub STRN1 of the spur gearwheel STR1 passes centrally through the mounting plate LAG and the housing partition wall GZ, both located on the side of the first spur gearwheel STR1 facing away from the gearwheel assembly. The housing partition wall GZ, for its part, is bolted in the area of its outer diameter to the transmission housing GG (on the side of the first spur gearwheel STR1 facing away from the gearwheel assembly). On the side of the housing partition wall GZ facing away from the spur gearing, the housing wall GW is axially adjacent to the housing partition wall GZ and is also bolted to the latter. In the example illustrated in FIG. 11, the housing wall GW in turn forms the outer wall of the transmission housing GG, which faces the drive motor (not shown here) of the automatic transmission that is in active connection with the drive input shaft AN. Thus, the structural group comprising the two clutches B and E is arranged on the side of the transmission away from the drive motor. In the example shown, the housing wall GW is at the same time a pump housing of an oil pump of the automatic transmission, for supplying pressure medium to the shift control elements and to supply lubricant to the various shift control elements, gear teeth and bearings. Correspondingly, various ducts for delivering the pressure medium and lubricant are integrated in the housing wall GW and the housing partition wall GZ.

The brake A is positioned directly next to the housing wall GW, axially between the latter (pump housing) and the mounting plate LAG. In this case, the output element 130 of the brake A formed as an outer disk support is integrated in the housing partition wall GZ. Correspondingly, on its pump side the wall GZ has a large enough axial bore, on whose inner diameter a suitable carrier profile is provided to hold the outer disks of the disk pack 100 of the brake A. The outer diameter of the disk pack 100 of brake A is somewhat larger than the outer diameter of the mounting plate LAG. The disk pack 100 of brake A is axially directly adjacent to the housing wall GW (or the pump housing). On the side of the disk pack 100 opposite to the housing wall GW, the radially outer area of the mounting plate LAG is axially adjacent to the disk pack 100. As a detailed design solution, the servo device 110 of brake A is integrated in the mounting plate LAG. Correspondingly, the mounting plate LAG has a piston- or pressure space 111, inside which a piston 114 of this servo device 110 is arranged and can move axially. When this pressure space 111 is pressurized (via non-rotating pressure medium ducts, for simplicity not shown here), the piston 114 actuates the disk pack of brake A axially towards the housing wall GW against the restoring force of a restoring element 113, here for example made as a cup spring, which is supported axially against a correspondingly formed collar of the mounting plate LAG. The servo device 110 of brake A is thus spatially arranged largely over the mounting STRL1 of the first spur gearwheel STR1 of the spur gearing STST.

As a further detailed design solution, from the disk side of the brake A the mounting plate LAG is inset into the housing partition wall GZ. The mounting plate LAG is also bolted to the housing partition wall GZ from the disk side. To arrange the bolts on as large a diameter as possible, in the pressure space 111 of the servo device 110 of brake A axially directed recesses are provided opposite the piston 114 of the servo device 110, which are distributed around the circumference of the pressure space 111 and accommodate the heads of the mounting plate bolts.

Thus, the housing partition wall GZ, the mounting plate LAG with the spur gearwheel mounting STRL1 and the first spur gearwheel STR1, with the brake A and its servo device 110 and disk pack 100, form a pre-assembled structural group which can be incorporated as a whole in the transmission housing. Obviously, it can also for example be provided as a likewise favorable assembly sequence (without reversing the assembly direction), that the housing partition wall GZ is first mounted in the transmission housing GG, then the pre-assembled mounting plate LAG with its spur gearwheel mounting STRL1 and the first spur gearwheel STR1 are mounted on the housing partition wall, then the servo device 110 of the brake A is mounted on the mounting plate LAG, and finally the disk pack 100 of the brake A is mounted in the housing partition wall GZ.

The input element 120 of the brake A is an inner disk support and is made for example as a cylindrical sheet or forged structure. This axially short inner disk support 120 has a cylindrical section 121 on whose outer diameter a carrier profile is provided to hold the lining disks of the disk pack 100 of brake A, and under whose inner diameter is arranged the restoring element 113 of the servo device of brake A. On the side of this cylindrical section 121 facing the housing wall GW, a disk-shaped section 122 of the inner disk support 120 of brake A follows the cylindrical section 121 and extends radially inwards as far as a hub-shaped section of the sun shaft SOW1, to which it is welded. In turn, the sun shaft SOW1 is connected in a positive locked way to the sun gearwheel SO3 of the third planetary gearwheel assembly RS3 via a suitable carrier profile, so that the sun shaft SOW3 can also be interpreted as the hub of the inner disk support 120 of brake A. The drive input shaft AN again runs radially within the sun shaft SOW3 and passes centrally through the housing wall GW.

The second spur gearwheel STR2 of the spur gearing forms an intermediate gear between the first spur gearwheel STR1 and the third spur gearwheel (not shown here) of the spur gearing STST. To produce the necessary transmission ratio of the spur gearing and the correct rotation direction of the drive output shaft (also not shown here) of the automatic transmission, the second spur gearwheel STR2 is made as a stepped gearwheel, with a first tooth array which meshes with the teeth of the first spur gearwheel STR1 and a second tooth array which meshes with that of the third spur gearwheel STR3. Spatially, the second tooth array of the second spur gearwheel is arranged closer to the drive motor, in an area radially over the brake A when viewed axially.

Figure 12:
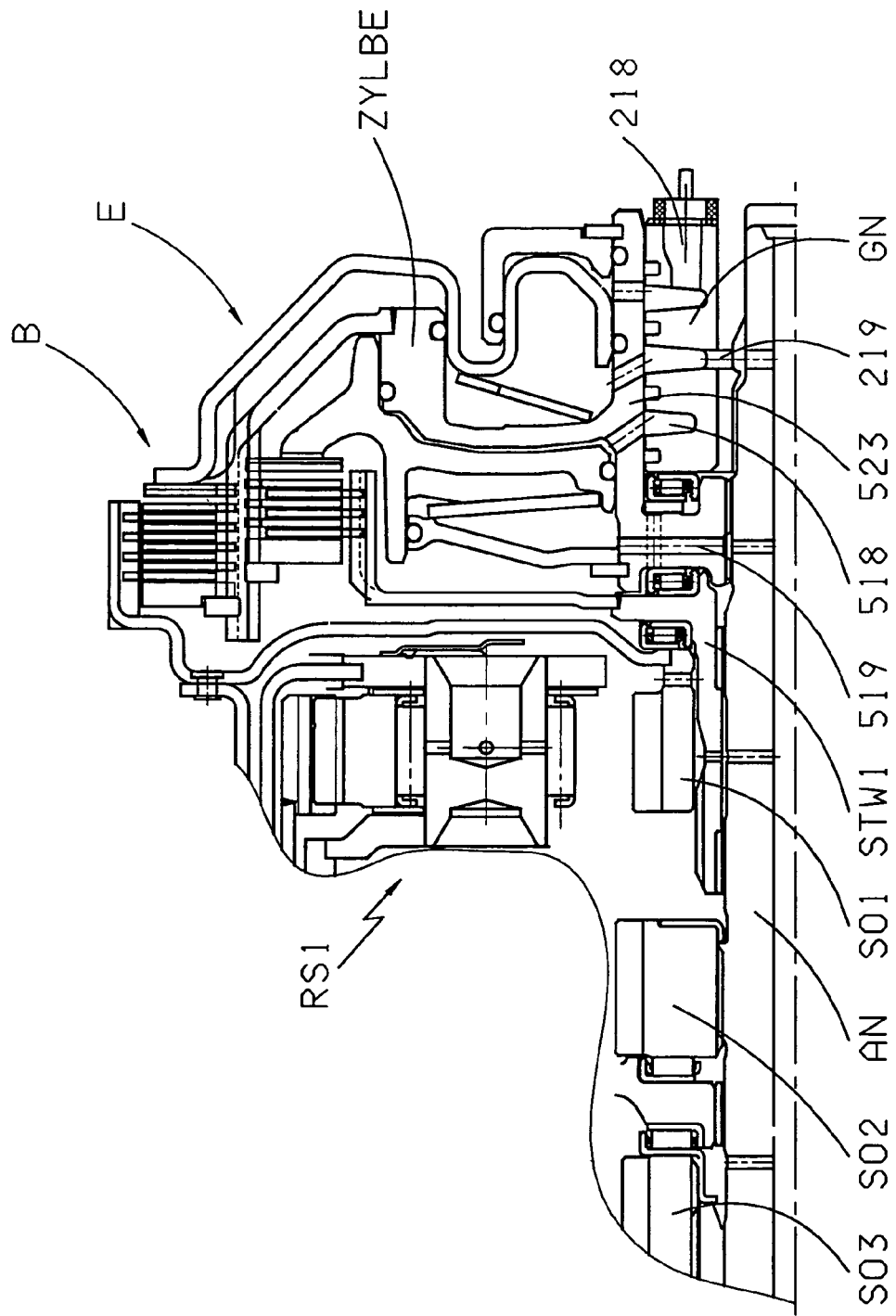
FIG. 12 is a sectional view of a transmission according to FIG. 10 or 11, with a third example design detail.

With reference to FIG. 12 a third example design detail of the transmission according to the invention illustrated in FIG. 10 or 11 will now be explained. FIG. 12 shows a sectional view of the transmission in the area of the first planetary gearwheel assembly RS1 and of the structural group near it with the two clutches B, E and concerns mainly the design of the drive input shaft AN. In contrast to FIGS. 10 and 11, the input shaft AN and hub 523 of the common disk support ZYLBE of the two clutches B, E are no longer made as one piece (FIG. 10) or welded together (FIG. 11), but are now connected together in a positive locking way by a suitable carrier profile. The connection between the drive input shaft AN and the sun gearwheel SO2 of the second (middle) planetary gearwheel assembly RS2 is also made as a positive locking connection with a suitable carrier profile. This allows the drive input shaft AN to be made as a slender shaft, saving both material and cost.

Figure 13:
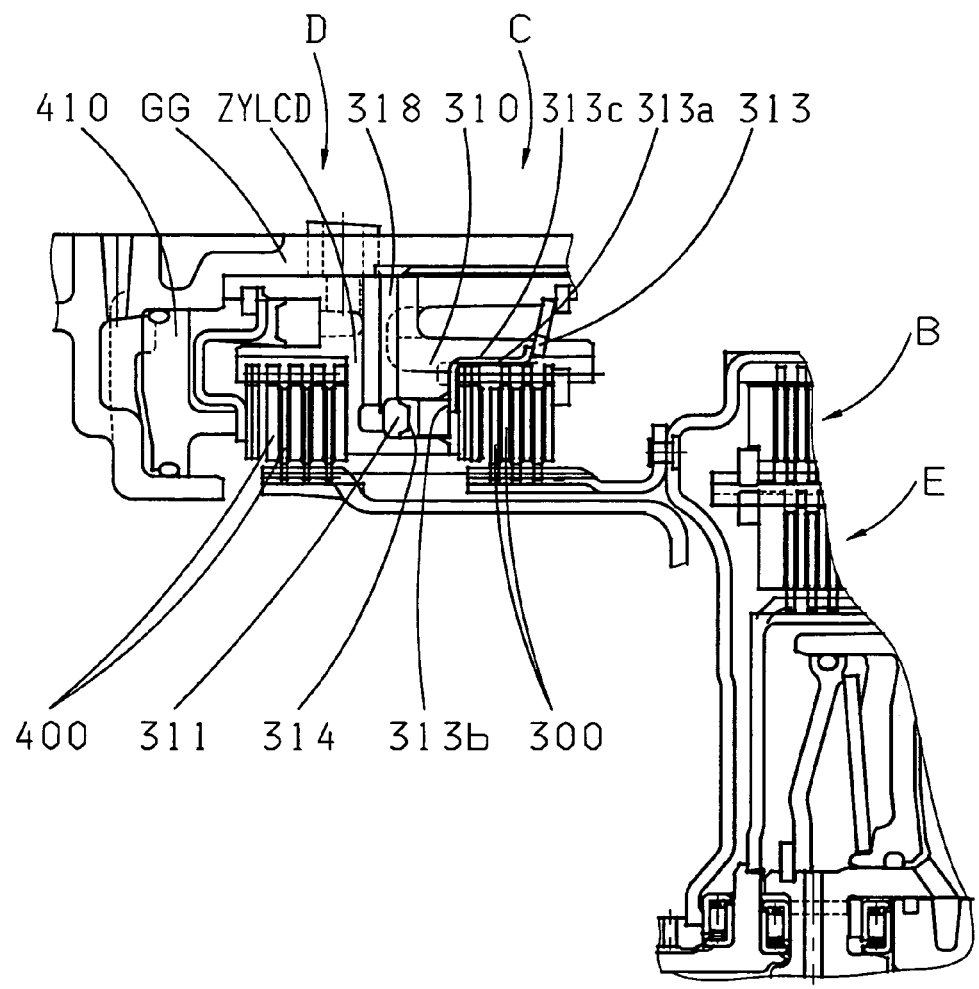
FIG. 13 is a sectional view of a transmission according to FIG. 10 or 11, with a fourth example design detail.

With reference to FIG. 13 a fourth example design detail of the transmission according to the invention illustrated in FIG. 10 or 11 will now be explained. FIG. 13 shows a sectional view of the transmission in the area of the structural group with the two brakes C and D, and concerns mainly the design of the servo device 310 of the brake C. In contrast to FIG. 9 but as in FIG. 10, the actuation directions of the servo devices 310, 410 of the respective brakes C, D when the brakes C and D are closed are the same, here for example axially towards the nearby structural group with the clutches B and E. As in FIG. 11, a common outer disk support ZYLCD is provided for the two disk packs 300, 400 of brakes C, D. As in FIG. 11, parts of the servo devices 310 and 410 of the two brakes C, D are arranged inside this common outer disk support ZYLCD. The servo device 410 of brake D is constructed identically to that of FIG. 11. As a result of the reversed actuation direction of brake C compared with FIG. 11, it is now possible completely to integrate the piston- or pressure space 311 of the servo device 310 of brake C as well in the common outer disk support ZYLCD. Correspondingly, the piston 314 arranged to move axially in the piston- or pressure space 311 is now positioned on the side of the disk pack 300 facing towards brake D. A corresponding pressure medium feed to the pressure space 311 is indexed 318 and runs in one section inside the outer disk support ZYLCD and in another section in the transmission housing GG, within which the outer disk support ZYLCD is held rotationally fast.

As a further design detail, in FIG. 13 a pressure disk 313a is provided, which transmits the spring force of the restoring element 313 here made as a cup spring to the piston 314. This cup spring 313 is spatially arranged radially over the last disk of the disk pack 300 facing away from the piston, and in the area of its outer diameter is axially supported against an outer collar of the outer disk support ZYLCD. Starting from its annular contact surface 313b with the piston, the pressure plate 313a extends radially outwards just as far as the disk carrier profile of the outer disk support ZYLCD for the outer disks of the disk pack 300, and there merges into a slotted section 313c of the pressure plate 313a. This slotted section 313c extends in the axial direction inside corresponding, axially directed cut-outs in the area of the disk carrier profile, radially above the disks 300, and extends axially as far as the inner diameter of the cup spring 313, against which it rests. Thus, the pressure plate 313a essentially spans across the disk pack 300.

Figure 14:
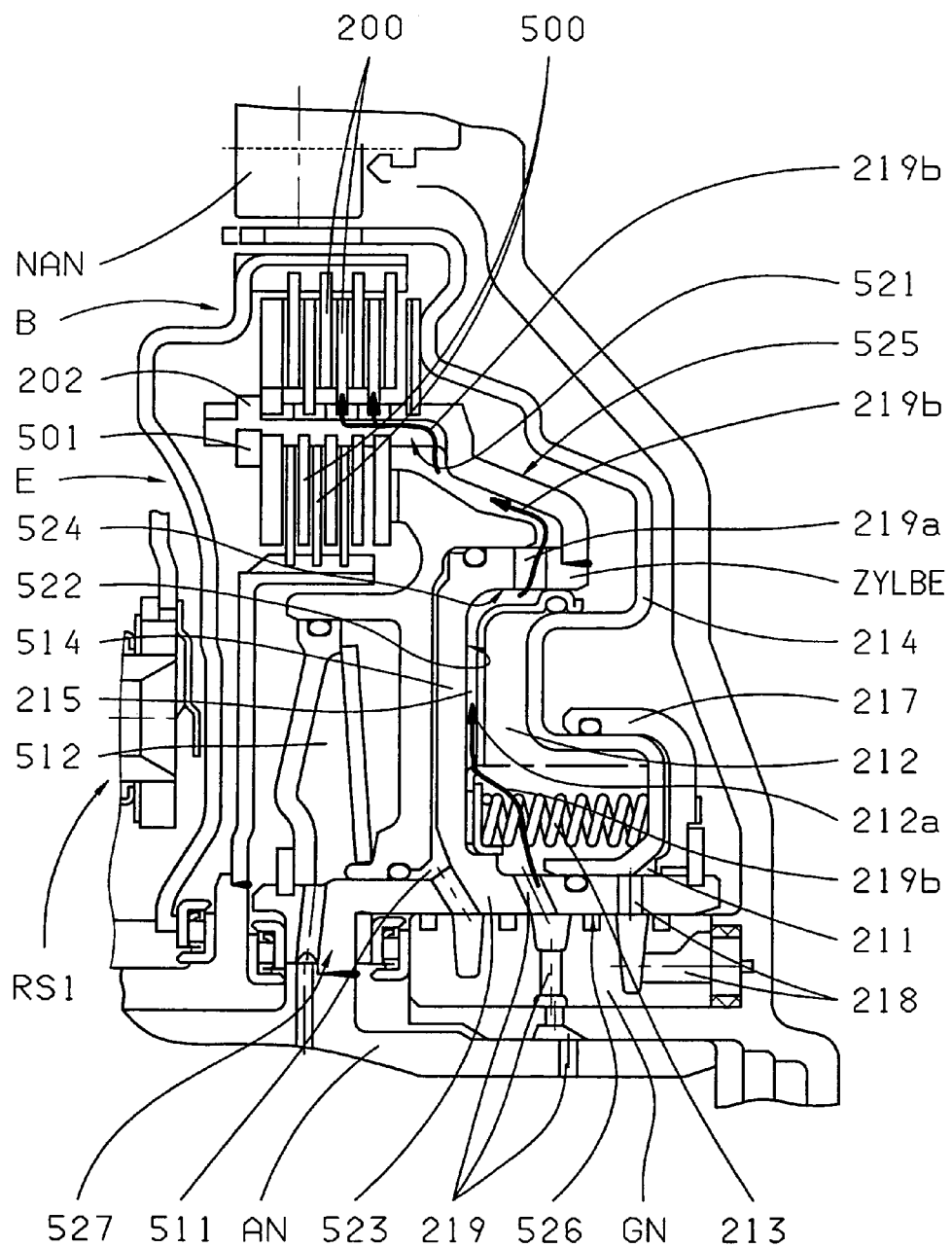
FIG. 14 is a sectional view of a transmission according to FIG. 10 or 11, with a fifth example design detail.

With reference to FIG. 14 a fifth example design detail of the transmission according to the invention illustrated in FIG. 10 or 11 will now be explained. FIG. 14 shows a sectional view of the transmission in the area of the first planetary gearwheel assembly RS1 and of the nearby structural group with the two clutches B and E, and concerns mainly a coolant medium duct to the disks 200 of the clutch B.

As far as an additional coolant duct in the area of the pressure equalization space 212 of clutch B and in the area of the first cylindrical section 521 of the common disk support ZYLBE for the two clutches B, E, the design of the structural group with the clutches B and E corresponds largely to the design in FIGS. 10 and 11 explained earlier in detail. For clarity, the important index numbers have been retained in FIG. 14.

In contrast to FIGS. 10 and 11, on the side of the first) disk-shaped section 522 of the disk support ZYLBE, opposite the pressure space 511 of the servo device of clutch E, a coolant space 212a is now additionally arranged, into which a quantity of coolant for cooling the disk pack of clutch B is fed and intermediately stored. To form this coolant space 212a and to separate it from the pressure equalization space of the servo device of clutch B, a compression disk 215 is inserted between an outer surface section of the disk support ZYLBE consisting of the (first) disk-shaped section 522 and the (second) cylindrical section 524, and the piston 214 of the servo device of clutch B. This compression disk 215 is for example made as a spring plate and is adapted to the contour of the outer surface section of the disk support ZYLBE in such manner that, spatially, the coolant space 212a is formed axially next to the disk-shaped section 522 and radially under the cylindrical section 524 of the disk support ZYLBE. The compression disk 215 has two contact surfaces, which maintain the distance between the compression disk 215 and the outer surface section of the disk support ZYLBE. On the one hand the compression disk 215, in the area of the side of the cylindrical section 524 facing away from the pressure space 511, rests against the cylindrical section 524 radially in at least a largely lubricant-tight manner and, radially under this contact surface, is sealed against the piston 214 of the servo device of clutch B so that it can move axially but is lubricant-tight (for example by virtue of a conventional O-ring). On the other hand, the compression disk 215 also rests spatially in a diameter zone of the restoring element 213 of the servo device of clutch B (here consisting of helical springs connected in parallel) axially against the disk-shaped section of the disk support ZYLBE, this contact surface of the compression disk 215 having slots or cut-outs through which lubricant can enter radially into the coolant space 212a.

The additional coolant space 212a is thus formed by the compression disk 215, the (second) cylindrical section 524 of the disk support ZYLBE and a (radially upper) part of the (first) disk-shaped section 522 of the disk support ZYLBE. Correspondingly, the pressure equalization space 212 of the servo device of clutch B is now formed of the other (radially lower) part of the (first) disk-shaped section 522 of the disk support ZYLBE, the compression disk 215, the hub section 526 of the hub of the disk support ZYLBE and the piston 214 of the servo device of clutch B. The lubricant feed to the pressure equalization space 212 is again indexed 219 and extends in sections inside the hub 523 (in the hub section 526) of the disk support ZYLBE, the hub GN attached to the transmission housing, and the drive input shaft AN. The lubricant supply to the cooler space 212a comes from the pressure equalization space 212, and in this area no additional shaft and/or hub bores are therefore needed. This design has the added advantage that the pressure equalization space 212 which is important for the function of controlling the clutch is filled first. After that, when a sufficient quantity of lubricant oil is available, the coolant space 212a of the clutch B is filled automatically.

In the area of the coolant space 212a the (second) cylindrical section 524 of the disk support ZYLBE has at least one radial coolant bore 219a, through which the lubricant stored intermediately in the coolant space 212a as a coolant passes on to the disks 200 of the clutch B. The corresponding coolant feed to the disks 200 of the clutch E is indicated by the arrow indexed 219b in FIG. 14. In the area radially above the coolant bore 219a the coolant feed passes spatially first between the piston 514 of the servo device of clutch E and the (second) at least largely disk-shaped section 525 of the disk support ZYLBE, then in the area of the (first) cylindrical section 521 of the disk support ZYLBE axially along the grooves of the disk carrier profile for the outer disks of the disk pack 500 of clutch E, and from there via corresponding radial bores or cut-outs of the cylindrical section 521 radially outwards to the area of the disk carrier profile for the lining disks of the disk pack 200 of the clutch B. In this way, effective cooling of the disk pack 200, which is highly thermally stressed by virtue of its design, is achieved.

As a further design detail FIG. 14 shows a cost-saving method for axially securing the two disk packs 200 and 500 of the clutches B and E. In this, the disk pack 500 of clutch E arranged radially under the first cylindrical section 521 of the disk support ZYLBE common to both clutches B and E is secured axially by a locking ring 501. The disk pack 500 is supported against this locking ring 501 when the piston 514 of the servo device of clutch E is actuated. The locking ring 501 is inset in a corresponding groove, which is impressed from the inner diameter of the cylindrical section 521 of the disk support ZYLBE radially outwards into the carrier profile of the disk pack ZYLBE for the outer disks of the disk pack 500. This impression on the inner diameter of the cylindrical section 521 of the disk support ZYLBE in turn produces a ridge of material 202 on the outer diameter of the cylindrical section 521 in the area of the carrier profile of the disk support ZYLBE for the outer disks of the disk pack 200. The ridge of material 202 of the clutch B is now used as an axial abutment surface for the disk pack 200 of of the clutch B is now used as an axial abutment surface for the disk pack 200 of clutch B. Thus when the piston 214 of the servo device of clutch B is actuated, the disk pack 200 rests against the material ridge 202.

Figure 15:
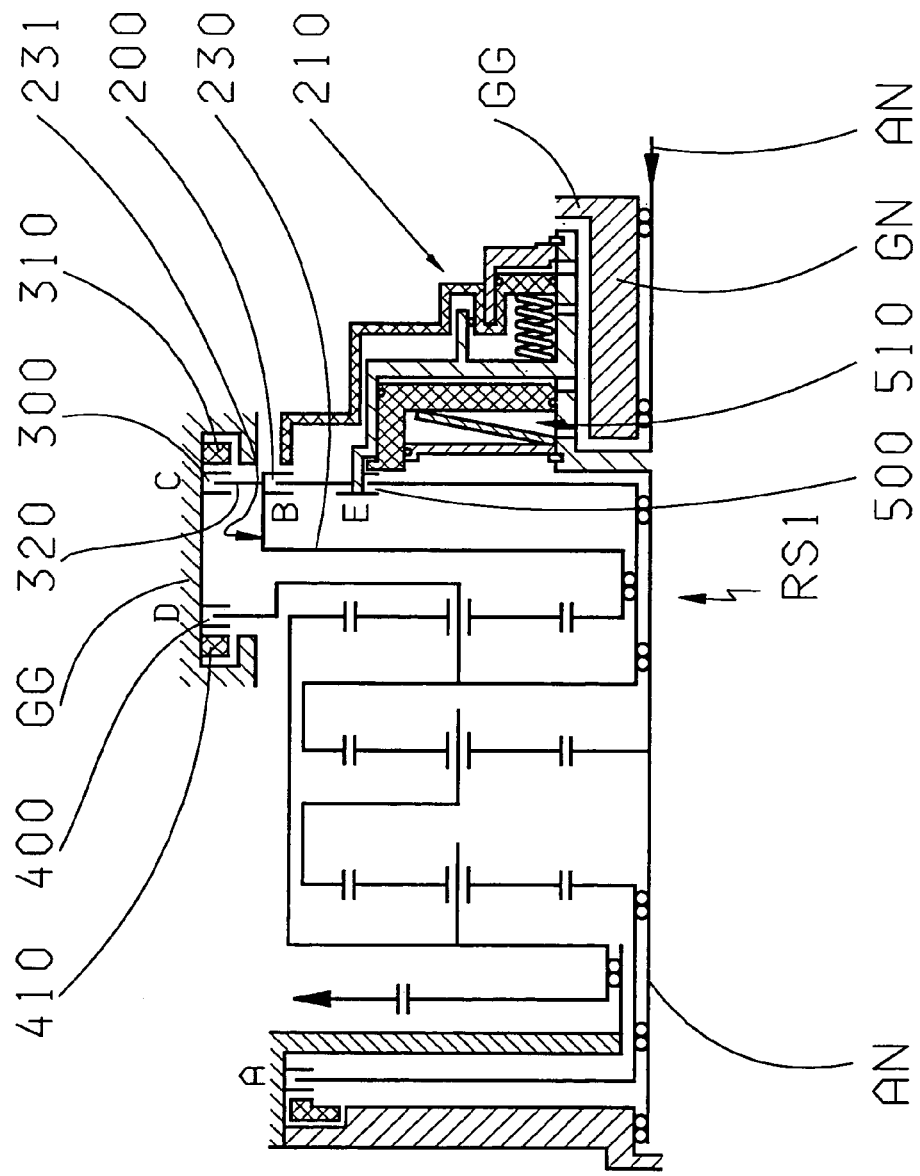
FIG. 15 is a schematic illustration of a fourth example of a component arrangement according to the invention.

FIG. 15 now illustrates schematically an example fourth component arrangement according to the invention, based on the third schematic component arrangement illustrated in FIG. 10. The changes compared with the third component arrangement according to the invention concern essentially the spatial arrangement of the two brakes C and D relative to the three planetary gearwheel assemblies RS1, RS2, RS3 arranged next to one another in series, and relative to the structural group comprising the two clutches B, E. As can be seen from FIG. 13, viewed in the axial direction the brake C is now arranged in an area radially over the structural group of the two clutches B and E. The disks 300 of brake C are arranged at least largely radially above the disk pack 200 of clutch B. The output element 230 of clutch B, made as an outer disk support, can therefore in a simply designed way also simultaneously be made as the inner disk support (input element 320) for the brake C, in that on the outer diameter of the cylindrical section 231 of the output element 230 a carrier profile for holding the lining disks of the disk pack 300 of brake C is additionally provided. The servo device 310 for actuating the disks 300 of brake C is for example arranged on the same disk side as the servo devices 210 and 510 of the clutches B and E respectively, i.e., on the side of the disk pack 300 facing away from the planetary gearwheel assembly RS1.

To a person familiar with the field it will be clear that such an arrangement of three disk shift control elements E, B, C radially one above the other results in a transmission with a comparatively large diameter. As shown in FIG. 15, it can therefore also be favorable for the three radially superimposed shift control elements E, B, C to be arranged on the side of the transmission near the drive motor, because in this engine space area of the vehicle there is usually comparatively more structural space available for the transmission.

As can also be seen from FIG. 15, the brake D is now spatially arranged in an area over the first planetary gearwheel assembly RS1, i.e., axially close to the brake C. This enables the two brakes C and D if necessary to be combined as a pre-assembled structural group, as for example already suggested in the design details according to FIG. 11 or 13.

Figure 16:
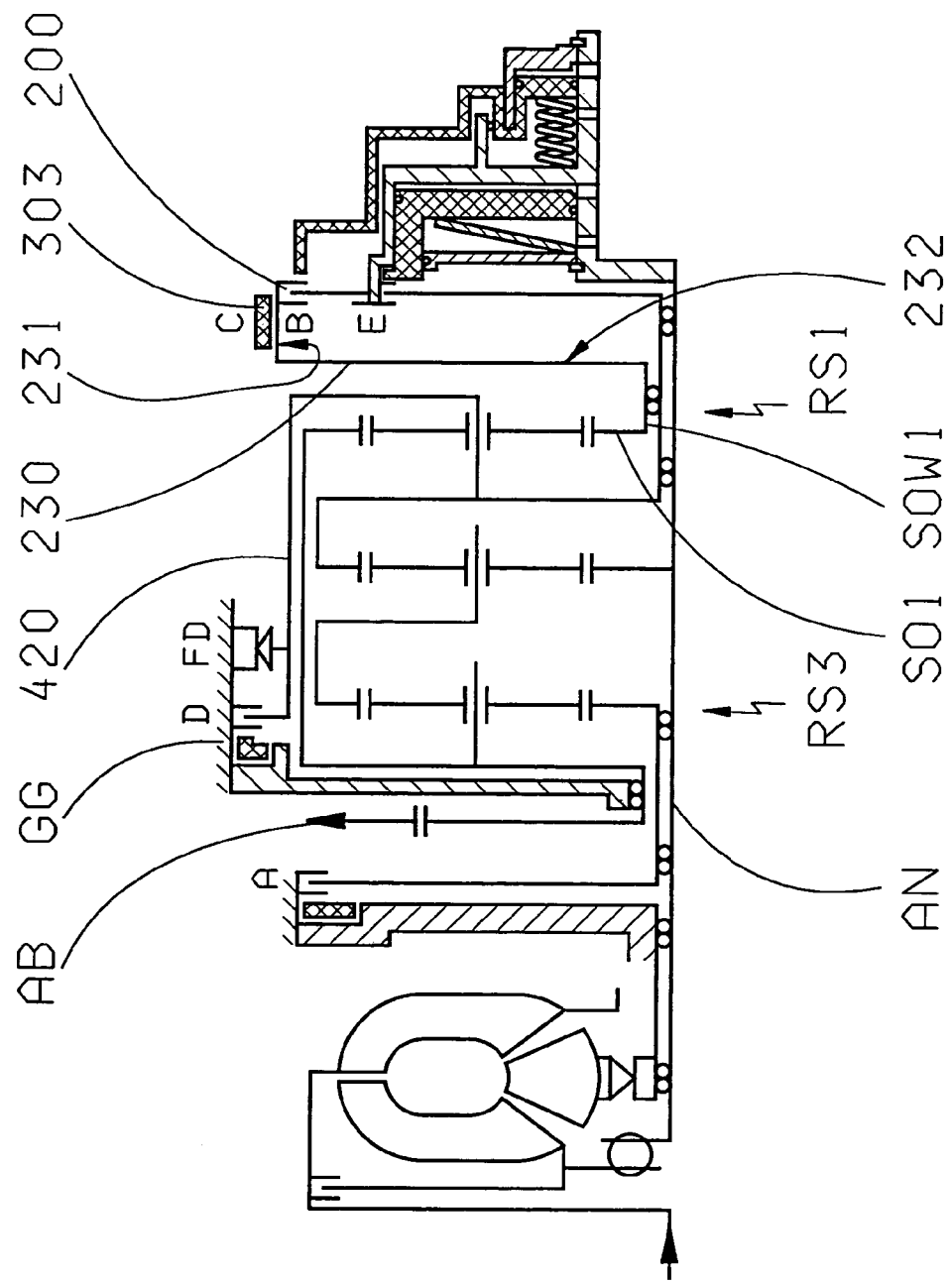
FIG. 16 is a schematic illustration of a fifth example of a component arrangement according to the invention.

FIG. 16 now illustrates schematically an example fifth component arrangement according to the invention, based on the fourth component arrangement illustrated schematically in FIG. 15. Starting from the spatial arrangement of the brake C, viewed axially, radially above the disk pack 200 of the clutch B, the brake C—instead of being constructed as a multiple disk brake—is this time made as a band brake. For this, the band brake C can be made either as a single- or multiple-loop simplex band brake, or as a duplex band brake. The friction lining of the brake C is then geometrically made as an ordinary commercial brake band 303 attached to the transmission housing GG by at least one fastening (for simplicity, not shown in FIG. 16). Viewed in the axial direction, the brake band 303 is at least partially arranged radially over the disk pack 200 of clutch B.

According to the invention the output element 230 of clutch B forms both the outer disk support of clutch B and the inner friction surface for the brake band 303 as the input element of brake C. Correspondingly, the output element 230 of clutch B is formed as a cylinder, with a cylindrical section 231 on whose inner diameter a carrier profile is arranged to hold the outer disks of the disk pack 200 of clutch B, and whose outer diameter is formed as the counter-surface for the brake band 303 provided with the frictional surface. The disk-shaped section 232 of the output element 230 of clutch B connects the cylindrical section 231 to the sun shaft SOW1 or the sun gearwheel SO1 of the first planetary gearwheel assembly RS1.

By virtue of this structure of brake C as a band brake, the radial space required for the automatic transmission in the area of the three shift control elements E, B, C arranged radially over one another is considerably reduced compared with the third component arrangement according to the invention illustrated in FIG. 15. Another advantage is the improved transmission efficiency in all the transmission operation ranges in which the brake C is not engaged, caused by the fact that compared with disk brakes, band brakes in the disengaged condition are known to have lower drag torque losses. Since a disk brake can in principle be constructively replaced by a band brake, in other embodiments of the automatic transmission according to the invention it can also be provided that instead of or in addition to the brake C, the brake D which is not engaged in the second to sixth forward gears and/or the brake A not engaged in the fifth and sixth forward and the reverse gears, is/are made as band brakes. For those familiar with the field, this substitution of a disk brake by a band brake if necessary, may also seem appropriate in the other component arrangements according to the invention described earlier.

As a further detail, an idler wheel FD is also provided, which is kinematically connected in parallel to brake D and supports the input element 420 of brake D on the transmission housing GG (by means of suitable clamping elements of the idler wheel FD) when the transmission is operating in traction (i.e., when an internal torque path exists from the drive input shaft AN to the drive output shaft AB). When the transmission is in thrust operation (i.e., when an internal torque path exists from the drive output shaft AB to the drive input shaft AN), the idler wheel FD is run down. This incorporation of an additional idler wheel can be provided in order to increase shifting comfort during the familiarly comfort-critical coasting shift from second to first gear of the transmission when the vehicle is coasting.

Obviously, a person with knowledge of the field will if necessary combine the features of the fifth component arrangement according to the invention appropriately with the other component arrangements and design details according to the invention.

Figure 17:
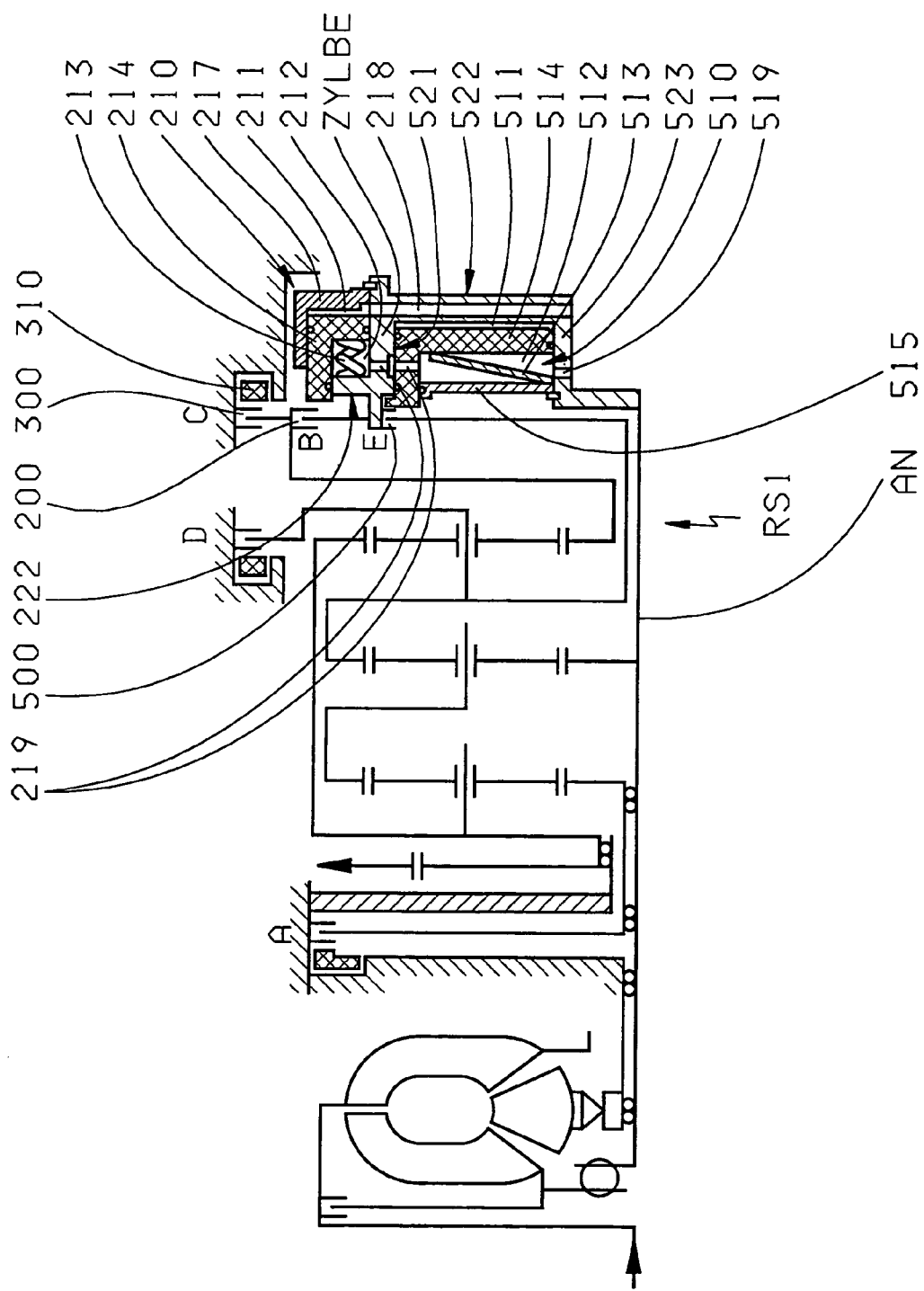
FIG. 17 is a schematic illustration of a sixth example of a component arrangement according to the invention.

FIG. 17 now illustrates schematically an example sixth component arrangement according to the invention. This sixth schematic component arrangement is similar to the fourth component arrangement illustrated in FIG. 15 and concerns primarily the structure and arrangement of the pressure spaces and pressure equalization spaces of the two servo devices in the structural group comprising the two clutches B and E. As before, for both clutches B, E a common disk support ZYLBE is provided, which forms the outer disk support for clutch E and the inner disk support for clutch B. As before also, the two disk packs 200 and 500 of clutches B and E are arranged on the side of the disk support ZYLBE facing towards the first planetary gearwheel assembly RS1 and are actuated by the respective servo devices 210 and 510 of clutches B and E axially towards the planetary gearwheel assembly RS1 when the clutches are closed, the disk pack 200 being spatially arranged radially over the disk pack 500. And as before, both servo devices 210, 510 each have dynamic pressure equalization means. According to FIG. 17, however, the spatial position of the pressure- and pressure equalization spaces 211, 511, 212, 512 of the two servo devices 210 and 510 are modified relative to one another compared with FIG. 15.

As can be seen from FIG. 17, the disk support ZYLBE common to clutches B and E is geometrically divided into sections 523, 522, 521 and 222. The hub 523, the disk-shaped section 522 and the cylindrical section 521 are associated with the input element of clutch E and the disk-shaped section 222 with that of clutch B. This is also made clear by the nomenclature chosen. The hub 523 is connected to the drive input shaft AN. On the side of the hub 523 facing away from the planetary gearwheel assembly RS1, the disk-shaped section 522 is connected to the hub 523 and extends radially outwards as far as a diameter which corresponds approximately to the outer diameter of the disk pack 500 of clutch E. The cylindrical section 521 is attached at the outer diameter of the disk-shaped section 522 and extends in the axial direction as far as the disk pack 500 of clutch E, relatively near to the first planetary gearwheel assembly RS1. On its inner diameter the cylindrical section 521 has a carrier profile for holding the outer disks of disk pack 500. As already described earlier several times, the cylindrical section 521 and the disk-shaped section 522 of the disk support ZYLBE form a clutch space within which the disks 500 and the servo device 510 (including its pressure space 511, piston 514, restoring element 513, pressure equalization space 512 and compression disk 515) are arranged, radially over the hub 523 of the disk support ZYLBE. The pressure space 511 of the servo device 510 is formed by the sections 521, 522 and 523 of the disk support ZYLBE and the piston 514 of the servo device 510, and the pressure equalization space 512 by the piston 514 and the compression disk 515 of the servo device 510. The pressure equalization space 512 is closer to the planetary gearwheel assembly RS1 than is the pressure space 511.

In addition, the cylindrical section 521 of the disk support ZYLBE has on its side facing the planetary gearwheel assembly RS1 a carrier profile on its outer diameter for holding the lining disks of the disk pack 200 of clutch B. Axially adjacent to this disk carrier profile, on its side facing away from the planetary gearwheel assembly RS1, the cylindrical section 521 is connected to the disk-shaped section 522 of the disk support ZYLBE, which extends—starting from the outer diameter of the cylindrical section 521—radially outwards as far as a diameter which is preferably smaller than the mean diameter of the outer disks of disk pack 200 of the clutch B.

To form a piston- or pressure space 211 and a pressure equalization space 212 of the servo device 210 of clutch B, a cylindrical support disk 217 is provided, which is spatially arranged radially over the cylindrical section 521 of the disk support ZYLBE. This support disk 217 has a disk-shaped section whose inner diameter is pushed over the cylindrical section 521 of the disk support ZYLBE in the area of the axially outer (facing away from the gearwheel assembly) edge of the cylindrical section 521, is axially secured to the cylindrical section 521 in this area, and is thereby also sealed (pressure-medium-tight) against the section 521. To the outer diameter of the disk-shaped section of the support disk 217 is connected a cylindrical section, which extends axially in the direction of the disk pack 200 or the planetary gearwheel assembly RS1. The cylindrical support disk 217 and the cylindrical section 521 of the disk support ZYLBE form the piston- or pressure space 211 of the servo device 210, within which the piston 214 of the servo device 210 is arranged and can move axially. The piston is sealed (pressure-medium-tight) against the cylindrical sections of the support disk 217 and 521 of the disk support ZYLBE, but can move axially. The pressure medium feed indexed 218 to the pressure space 211 runs in sections as a radial bore through the disk-shaped section 522 and the hub 523 of the disk support ZYLBE.

The piston 214 of the servo device 210—like the support disk 217—is formed as a cylinder open towards the disk pack 200, so that the bottom of the cylinder forms the separating surface from the pressure space 211. The cylindrical skirt of the piston 214 covers the disk-shaped section 222 of the disk support ZYLBE and extends axially as far as the disk pack 200 of clutch B. Between the cylinder bottom of the piston 214 and the disk-shaped section 222 of the disk support ZYLBE is held the restoring element 213 of the servo device 210, here for example an annular packet of helical springs connected parallel to one another.

To form the pressure equalization space 212 of the servo device 210, the cylindrical skirt of the piston 214 is sealed in a lubricant-tight way against the disk-shaped section 222 of the disk support ZYLBE, but can move axially. Accordingly, the pressure equalization space 212 is formed by the piston 214, the disk-shaped section 222 and the cylindrical section 521 of the disk support ZYLBE. This pressure equalization space 212 is filled with lubricant not under pressure, from the pressure equalization space 512 of the clutch E. For this, radial bores are provided both in the cylindrical section 521 of the disk support ZYLBE and in the piston 514 of the servo device of the clutch B, which open into the pressure equalization spaces 212 and 512. The corresponding lubricant feed is indexed 219.

As can be seen from FIG. 17, the servo device 210 of clutch B is thus spatially arranged radially over the servo device 510 of clutch E, such that the two respective pressure spaces 212 and 512, and also the respective restoring devices 313 and 513 are spatially arranged radially approximately over one another. The section of the outer casing surface of the disk support ZYLBE common to both clutches B, E which separates the two pressure spaces 211, 511 and the two pressure equalization spaces 212, 512 from one another, is thus in principle the cylindrical section 521 of the disk support ZYLBE.

As can also be seen from FIG. 17, the spatial arrangement of the two brakes C and D (with their disk packs 300 and 400 and their servo devices 310 and 410 respectively) relative to the planetary gearwheel assemblies and the structural group of clutches B and E, is identical to that of the fourth component arrangement according to the invention illustrated in FIG. 15.

Figure 18:
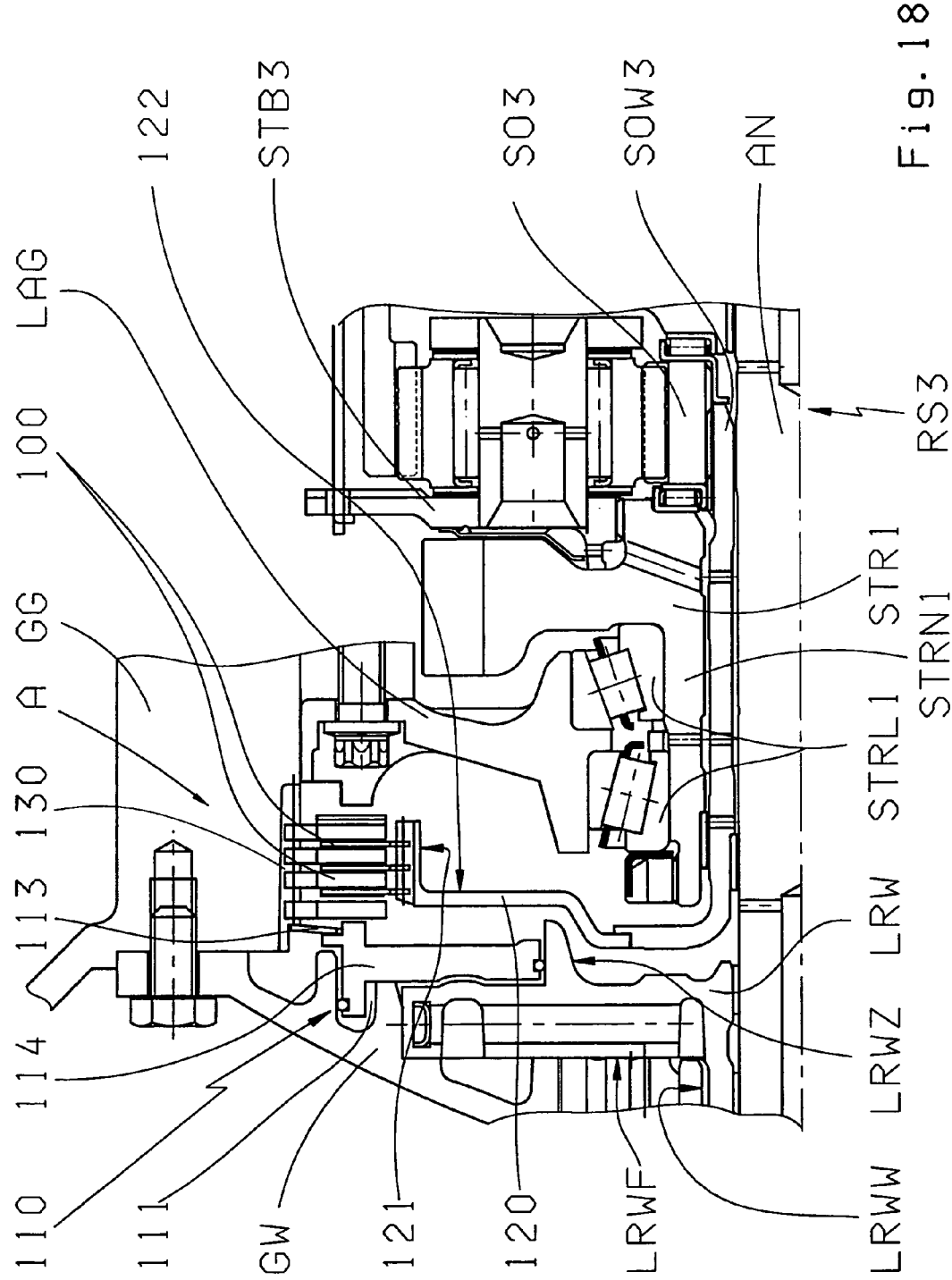
FIG. 18 is a sectional view of a transmission with a sixth example design detail.
Figure 19:
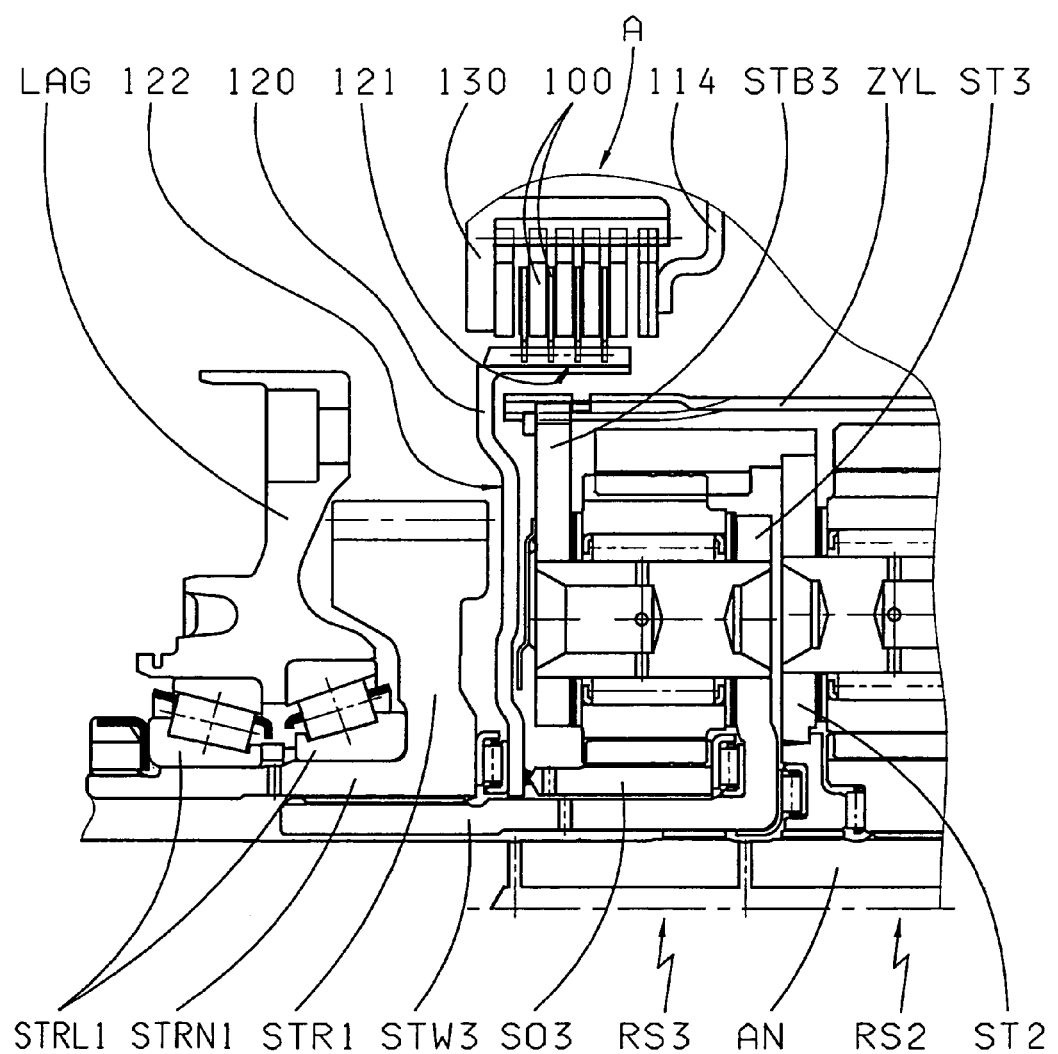
FIG. 19 is a sectional view of a transmission with a seventh example design detail.
Figure 20:
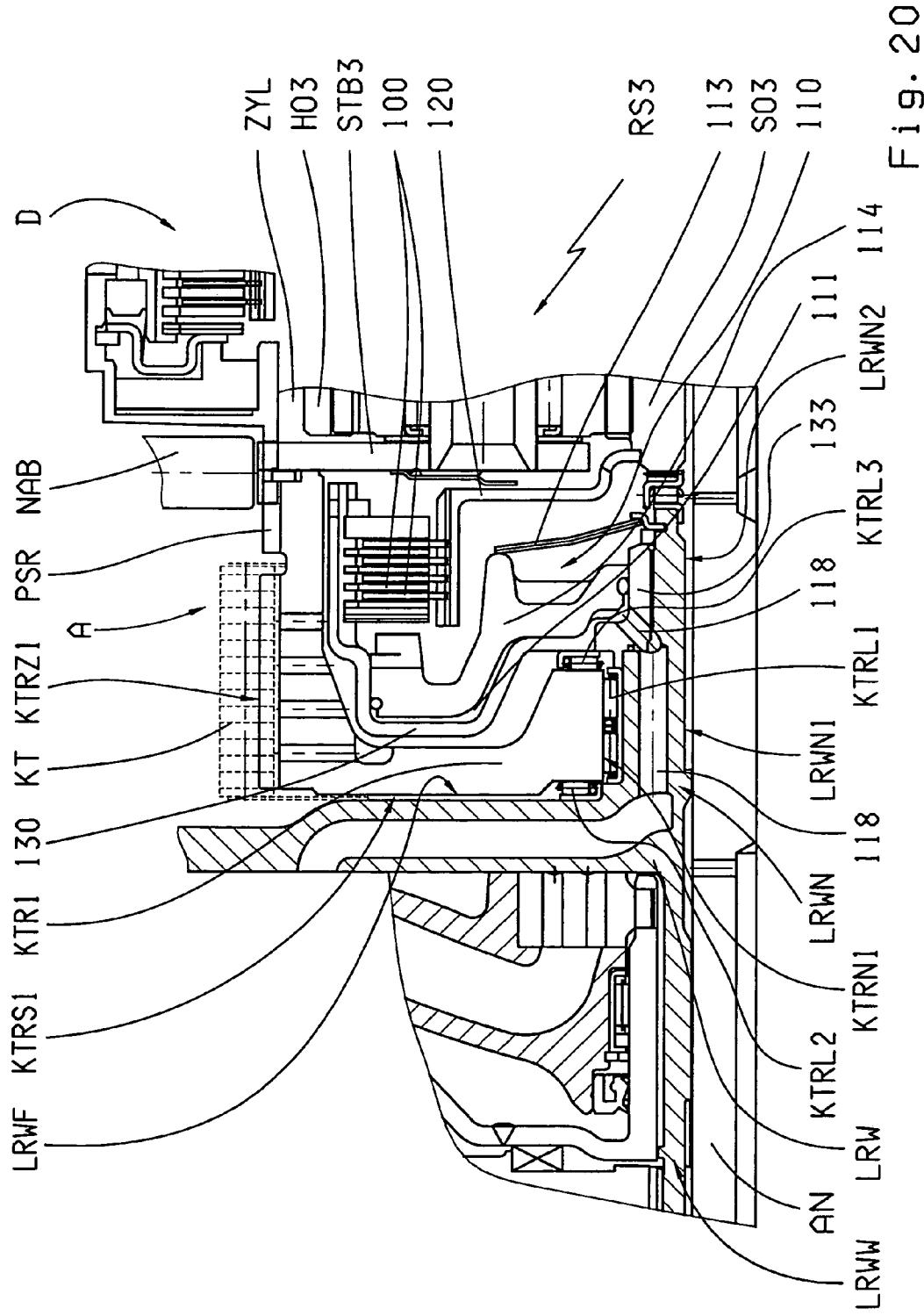

With reference to FIGS. 18 to 20, various design details will be more fully explained below, which concern the arrangement and design of the brake A in combination with the spur gearing or chain drive and which can in principle be appropriately combined with the various component arrangements and design details according to the invention described earlier. As is known, the spur gearing or chain drive constitutes the kinematic connection between the output of the coupled planetary transmission (consisting of the three individual planetary gearwheel assemblies) and the drive output shaft of the automatic transmission.

FIG. 18 shows a sectional view of a transmission with a sixth example design detail. The first spur gearwheel STR1 of the spur gearing is here spatially arranged axially between the third planetary gearwheel assembly RS3 and the brake A, on the one hand axially directly adjacent to the sun gearwheel SO3 and the web plate STB3 of the third planetary gearwheel assembly RS3 (arranged on the side of the third planetary gearwheel assembly RS3 facing away from the middle planetary gearwheel assembly RS2), and on the other hand axially directly adjacent to the input element 120 of the brake A formed as an inner disk support. In the example illustrated, between the spur gearwheel STR1 and the web plate STB3 a positive locking connection is provided, with the corresponding carrier profile arranged spatially on the inner diameter of the web plate STB3. To support the axial forces of the oblique gear teeth of the first spur gearwheel STR1 in the direction of the first planetary gearwheel assembly, an axial bearing is arranged between the spur gearwheel STR1 and the sun gearwheel SO3. The mounting STRL1 of the first spur gearwheel STR1 is made as a rigid conical-roller mounting with two immediately adjacent conical-roller bearings. The inner bearing rings of these two conical-roller bearings are held on a spur gearwheel hub STRN1 of the first spur gearwheel STR1, which extends axially in the direction opposite to the third planetary gearwheel assembly RS3 and is clamped axially by a shaft nut. The outer bearing rings of the two conical-roller bearings are inset each into a respective bearing bore of a mounting plate LAG and each rest against a contact shoulder of the mounting plate LAG which is axially between the two conical-roller bearings and extends radially inwards. Thus, the spur gearwheel hub STRN1 of the spur gearwheel STR1 passes centrally through the mounting plate LAG arranged on the side of the first spur gearwheel STR1 facing away from the gearwheel assembly. Obviously, instead of the two individual conical-roller bearings of the spur gearwheel mounting STRL1, a combination conical-roller bearing can for example be provided, or else a grooved ball bearing.

The mounting plate LAG itself is inset directly into a corresponding mounting plate bore of the transmission housing GG, being supported axially against a contact shoulder of the transmission housing GG arranged in the area of this mounting plate bore, and being bolted to the transmission housing GG. As the axial assembly direction, here it is for example provided that the mounting plate LAG (pre-assembled with the spur gearwheel mounting STRL1 and the first spur gearwheel STR1) is inserted axially into the transmission housing GG in the direction towards the planetary gearwheel assembly RS3.

The brake A is arranged on the side of the mounting plate LAG facing away from the planetary gearwheel assembly RS3. The disk pack 100 and also the inner disk support 120 of the brake A are directly axially adjacent to the mounting plate LAG. The outer diameter of the disk pack 100 of brake A with its outer and lining disks is here, for example, somewhat larger than the outer diameter of the mounting plate LAG. The outer disk support 130 of brake A is integrated in the transmission housing GG. Correspondingly, on the side of the mounting plate bore of the transmission housing GG facing away from the planetary gearwheel assembly, in the area directly adjacent to the mounting plate bore, and on a diameter somewhat larger than that of the bore, the transmission housing GG has a suitable inner profile for holding the outer profile of the outer disks of the disk pack 100 of brake A. On the side of the disk pack 100 of brake A opposite to the mounting plate LAG is arranged the housing wall GW, in which the servo device 110 of brake A is also partially integrated. The servo device 110 actuates the disk pack 100 of brake A on closing, axially in the direction of the mounting plate LAG such that the disk pack 100 rests axially against the mounting plate LAG. Thus, the brake A is arranged directly between the housing wall GW and the mounting plate LAG.

In an alternative design for attaching the mounting plate, on which the first spur gearwheel of the spur gearing stage is mounted, it can also be provided on the transmission housing that the outer diameter of the mounting plate is larger than the outer diameter of the disk pack of brake A, such that this mounting plate now rests in part axially against the outer housing wall GW in a diameter zone over the disk pack of the brake A. In this case the mounting plate is bolted directly to the outer housing wall from the inside space of the transmission housing, such that the corresponding force-transferring threads of the bolts are spatially arranged radially over the disk pack of the brake A. In turn, the outer housing wall is bolted to the transmission housing in a known way. Advantageously therefore, the force flow of the brake A during its actuation does not pass across a housing separation joint that has to be sealed.

In an alternative design version of the mounting plate, it can also be provided that the hub of the first spur gearwheel of the spur gearing stage is omitted, such that the conical-roller bearing or grooved ball bearing of this first spur gearwheel is spatially arranged radially under the teeth of the first spur gearwheel. The outer bearing ring of the conical-roller or the grooved ball bearing is inset in a corresponding bearing bore of the first spur gearwheel, but could even be omitted entirely if the roller paths of the conical rollers or balls are directly integrated in the first spur gearwheel. The inner bearing ring of the conical-roller or the grooved ball bearing can be fixed on a hub-shaped section of the mounting plate which extends axially towards the third planetary gearwheel assembly RS3 and passes centrally through the first spur gearwheel.

As a design detail, in FIG. 18—as already indicated—the servo device 110 of brake A is only partially integrated in the housing wall GW. In the example illustrated, this housing wall GW is on the one hand the outer wall of the automatic transmission near the drive motor, but on the other hand, at the same time also a pump housing of an oil pump of the automatic transmission for supplying pressure medium to the shift control elements and lubricant to the various shift control elements, gear teeth and bearings. Correspondingly, various ducts for delivering the pressure medium and lubricant are integrated in the housing wall. Set into the housing wall GW is also a rotationally immobile stator shaft LRW, for example bolted thereto. On the one hand this stator shaft LRW forms a kind of fixed hub to support the torque of a starting element, for example a Trilok converter, interposed in the force flow between the drive motor and the drive input shaft. Kinematically, the starting element is connected outside the inside space of the transmission to a shaft section LRWW of the stator shaft LRW. On the other hand, various ducts for pressure medium and lubricant delivery are also integrated in a flange section LRWF of this stator shaft. In addition, the stator shaft LRW has an axially comparatively short cylindrical section LRWZ which extends axially towards the inside space of the transmission. The outer diameter of this cylindrical section LRWZ of the stator shaft LRW forms the inner diameter of the piston- or pressure space 111 of the servo device 110 of the brake A and correspondingly an axially inner sliding surface of the piston 114 of the servo device 110 of brake A, which is arranged and able to move axially over the cylindrical section LRWZ. The outer diameter of the piston- or pressure space 111 of the servo device 110 and the corresponding axial outer sliding surface of the piston 114 of the servo device 110 is formed by an axial recess of the housing wall GW (or pump housing), on a diameter larger than the outer diameter of the flange section LRWF of the stator shaft LRW. Thus, the pressure space 111 of the servo device 110 is formed by the piston 114, the housing wall GW, the flange section LRWF of the stator shaft section LRW, and the cylindrical stator shaft section LRWZ. The (non-rotating) pressure medium feed to this pressure space 111 is not shown in FIG. 18, for simplicity. The restoring element 113 of the servo device 110 for restoring the piston is in this case made as a cup spring, which rests axially on one side against the piston 114 in the area of the piston's outer diameter and on the other side against the transmission housing GG in the area of the disk carrier profile of the transmission housing GG for the outer disks of the brake A.

The input element 120 of the brake A is an inner disk support and is for example made as a cylindrical sheet structure. This axially short inner disk support 120 has a cylindrical section 121 at whose outer diameter a carrier profile is provided to hold the lining disks of the disk pack 100 of the brake A. On the side of this cylindrical section 121 facing towards the housing wall GW, an at least partially disk-shaped section 122 of the inner disk support 120 of the brake A is attached to the cylindrical section 121 and extends parallel to the flange-shaped stator shaft section LRWF radially inwards as far as a hub-shaped section of the sun shaft SOW3, to which this disk-shaped section 122 of the inner disk support 120 of brake A is welded. The sun shaft SOW3 is in turn connected in a positive locking way to the sun gearwheel SO3 of the third planetary gearwheel assembly RS3 via a suitable carrier profile, so that the sun shaft SOW3 can also be interpreted as the hub of the inner disk support 120 of brake A. In turn, the drive input shaft AN runs radially within the sun shaft SOW3 and passes centrally through the stator shaft LRW inserted into the housing wall GW.

FIG. 19 now shows a sectional view of a transmission with a seventh example design detail, and concerns a spatial arrangement of the brake A relative to the third planetary gearwheel assembly RS3 and the first spur gearwheel STR1 of the spur gearing, which differs from that of FIG. 18. The mounting of the spur gearwheel STR1 on the transmission housing is the same as in FIG. 18. Correspondingly, the spur gearwheel STR1 has a spur gearwheel hub STRN1 which extends axially in the direction opposite to the planetary gearwheel assembly RS3. On the outer diameter of the spur gearwheel hub STRN1 are pushed the inner bearing rings of the two conical-roller bearing rings of the spur gearwheel mounting STRL1 arranged directly next to one another, and these rings are fixed axially to the spur gearwheel hub STRN1 by means of a shaft nut. The outer bearing rings of the two conical-roller bearings are mounted in the mounting plate LAG attached to the transmission housing. To form the kinematic connection of the spur gearwheel STR1 and the web ST3 of the third planetary gearwheel assembly RS3, an internal carrier profile is provided on the inner diameter of the spur gearwheel hub STRN1, viewed in the axial direction radially under the teeth of the spur gearwheel STR1, in which a corresponding outer carrier profile of a web shaft STW3 engages. Starting from the carrier profile, this web shaft STW3 extends axially in the direction of the second (middle) planetary gearwheel assembly RS2 as far as its web ST2 and in doing so passes centrally through the sun gearwheel SO3 of the third planetary gearwheel assembly RS3. On the side of the third planetary gearwheel assembly RS3 facing towards the second planetary gearwheel assembly RS2, the web shaft STW3 is connected to the web ST3 of the third planetary gearwheel assembly RS3. In the example illustrated in FIG. 19 the web ST3 and the web shaft STW3 are made as one piece.

Viewed spatially, the brake A is arranged radially over the third planetary gearwheel assembly RS3. The input element 120 of brake A is formed as a cylindrical inner disk support which spans across the third planetary gearwheel assembly RS3 in one section. The disk-shaped section 122 of this inner disk support 120 extends parallel to the web plate STB3 of the third planetary gearwheel assembly RS3 and separates the third planetary gearwheel assembly RS3 spatially from the spur gearwheel STR1. On its inner diameter, the disk-shaped section 122 is connected to the sun wheel SO3 of the third planetary gearwheel assembly RS3, in this case for example welded. In this area an axial bearing is also arranged, which separates the disk-shaped section 122 of the inner disk support 120 of brake A from the spur gearwheel STR1. The disk-shaped section 122 of the inner disk support 120 extends radially outwards as far as a diameter somewhat larger than the outer diameter of the web plate STB3 of the third planetary gearwheel assembly RS3 or somewhat larger than the outer diameter of the cylinder ZYL via which the web plate STB3 is connected to another planetary gearwheel assembly element (not shown here). To the outer diameter of the disk-shaped section 122 is connected the cylindrical section 121 of the inner disk support 120 of brake A, which extends axially towards the second (middle) planetary gearwheel assembly RS2. On the outer diameter of the cylindrical section 121 a carrier profile is provided to hold the lining disks of the disk pack 100 of brake A. FIG. 19 only shows the starting element 130 of brake A formed as an outer disk support and the servo device (of which, only a part of the piston 114 is shown here) for actuating the disk pack 100.

Finally, FIG. 20 shows a sectional view of a transmission with an eighth example design detail, again concerning a different spatial arrangement of the brake A relative to the third planetary gearwheel assembly RS3, this time in combination with a chain drive. The essential elements of this design detail according to FIG. 20 are the object of the not previously published German patent application DE 10236607.1 by the present applicant, whose disclosure is also intended to form part of the content of the present invention.

In accordance with the eighth design detail shown in FIG. 20, a chain drive is provided as the active connection between the output element of the coupled planetary transmission comprising the three individual planetary gearwheel assemblies and the drive output shaft of the automatic transmission. The chain of this chain drive shown in FIG. 20 is indexed KT, and the (first) chain sprocket wheel of the chain drive on the planetary transmission side is KTR1. This driven (first) chain sprocket wheel KTR1 and the brake A are both axially adjacent to the third planetary gearwheel assembly RS3, with the brake A arranged radially under the sprocket teeth of the sprocket wheel KTR1.

This driven (first) sprocket wheel KTR1 is geometrically formed as a cylinder open in the direction of the (third) planetary gearwheel assembly RS3, with a hub section KTRN1, a disk-shaped sprocket wheel section KTRS1 and a cylindrical sprocket wheel section KTRZ1. This cylindrical sprocket wheel section KTRZ1 extends axially on a diameter larger than the outer diameter of the brake A, in particular larger than the outer diameter of the latter's output element 130 formed as an outer disk carrier. At its outer diameter the cylindrical sprocket wheel section KTRZ1 has on the one hand suitable chain sprockets, in which the chain KT engages in order to transmit the speed and torque, and on the other hand, in this case, for example additional parking brake gear-teeth in which a parking brake pawl (for simplicity, not shown here) can engage in order to block the drive output shaft on the transmission housing of the automatic transmission. The cylindrical sprocket wheel section KTRZ1 of the sprocket wheel KTR1 thus forms at the same time a parking brake gear PSR. In the example illustrated in FIG. 20, the parking brake gear-teeth (associated with the parking brake gear PSR) are arranged closer to the third planetary gearwheel assembly RS3 than are the chain sprockets of the sprocket wheel KTR1. On the side of the cylindrical sprocket wheel section KTRZ1 facing away from the planetary gearwheel assembly RS3, the disk-shaped sprocket wheel section KTRS1 is attached to the cylindrical sprocket wheel section KTRZ1 and extends radially inwards as far as the hub section KTRN1 of the sprocket wheel KTR1. As will be explained in detail later, this hub section KTRN1 is in turn mounted on a hub LRWN of a stator shaft LRW attached fast to the transmission housing. On its side facing towards the planetary gearwheel assembly RS3, the cylindrical sprocket wheel section KTRZ1 is connected to the web plate STB3 of the third planetary gearwheel assembly RS3, preferably in a positive locking way. In the example illustrated, correspondingly formed fingers of the cylindrical sprocket wheel section KTRZ1 which extend axially engage in matching axial recesses in the web plate STB3, these recesses being arranged distributed circumferentially approximately on the diameter of the annular gearwheel HO3 of the third planetary gearwheel assembly RS3.

The cylindrical sprocket wheel section KTRZ1 of the driven sprocket wheel KTR1 thus forms a cylindrical space, within which the brake A is arranged. As already mentioned, the disk pack 100 with its outer and lining disks is axially directly adjacent to the web plate STB3 of the planetary gearwheel assembly RS3. The input element 120 of brake A, formed as an inner disk support, has the geometrical form of a pot closed in the direction of the planetary gearwheel assembly RS3, with a cylindrical outer surface at whose outer diameter a carrier profile is provided to hold the lining disks of the disk pack 100, and whose bottom, which extends parallel to the web plate STB3, is connected at its inner diameter to the sun gearwheel SO3 of the third planetary gearwheel assembly RS3, in this case for example welded. Correspondingly, the output element 130 of brake A formed as the outer disk support is in the geometrical shape of a pot open towards the planetary gearwheel assembly RS3, within which the servo device 110 and the disk pack 100 of brake A are arranged. In the example illustrated, this outer disk support 130 has a hub 133 connected in a positive locking way to the stator shaft LRW attached fast to the transmission housing. On the inner diameter of the cylindrical outer surface of the outer disk support 130 of brake A, a carrier profile is provided to hold the outer disks of the disk pack 100. The piston 114 of the servo device 110 is adjacent to the disk- and hub-shaped outer surface of this outer disk support 130 and, together with these outer surface sections, forms the pressure space 111 of the servo device 110. In this, the piston 114 is arranged in one section axially between the disk-shaped outer surface of the outer disk support 130 and the disk pack 100, and in another section, radially under the disk pack 100 as viewed in the axial direction. When the pressure space 111 is pressurized, the piston 114 actuates the disk pack 100 axially towards the nearby planetary gearwheel assembly RS3, against the force of the restoring element 113 which in this case consists for example of two cup springs arranged in series, which are supported on the hub 133.

As in FIG. 18, the stator shaft LRW attached fast to the housing forms on the one hand a kind of hub attached to the housing for supporting the torque of a starting element interposed in the force flow between the drive motor and the drive input shaft, for example a Trilok converter. Kinematically, the starting element is connected outside the inside space of the transmission, to a shaft section LRWW of the stator shaft LRW. On the other hand, the stator shaft LRW also has a flange section LRWF extending radially, which closes off the inside space of the transmission on the side of the chain drive KTR1 facing away from the planetary gearwheel assembly RS3. In addition, this stator shaft LRW has a cylindrical hub section LRWN which extends axially towards the inside space of the transmission, and which is geometrically divided into two sections LRWN1 and LRWN2 of which the section near the flange is indexed LRWN1 and the section near the planetary gearwheel assembly is indexed LRWN2. The sprocket wheel KTR1 is mounted radially over the section LRWN1 near the flange. The corresponding bearing is for example formed as a space-saving radial needle bearing and is indexed KTRL1. For the axial support of the sprocket wheel KTR1, two axial needle bearings KTRL2 and KTRL3 are provided, the axial needle bearing KTRL2 being arranged axially between the flange section LRWF of the stator shaft LRW attached to the transmission housing and the sprocket wheel KTR1, and the axial needle bearing KTRL3 being arranged axially between the sprocket wheel KTR1 and the outer casing surface of the outer disk support 130 of the brake A near the hub.

In addition, FIG. 20 shows a pressure medium feed 118 to the pressure space 111 of the servo device 110 of brake A, a section of which passes within the stator shaft LRW and the hub 133 of the outer disk support 130 of brake A.

A person with knowledge of the field will also if necessary be able to make the flange section LRWF and the hub section LRWN of the stator shaft LRW as part of the transmission housing or of a transmission housing wall.

As a further detail, FIG. 20 shows a drive output speed sensor NAB of the usual type, which senses the tooth profile of the parking brake gear PSR in order to determine a speed and/or rotation direction of the drive output shaft of the automatic transmission.

As already mentioned, in relation to the axis-parallel arrangement of the drive input and output shafts of the automatic transmission, the transmissions illustrated schematically and described earlier should be regarded only as examples. A person with knowledge of the field will know how to apply the essential features of the proposed individual component arrangements and design details according to the invention, appropriately as necessary, in other spatial arrangements of the input and output shafts relative to one another. Thus, as a variant of the non-coaxial shaft arrangement it can also be provided that the drive input and output shafts of the automatic transmission are at an angle to one another, for example at a relative angle of 90° for a vehicle power train with the drive motor positioned longitudinally to the driving direction ("front-longitudinal-drive" or "rear-longitudinal-drive"), or for example with an angle relative to one another not equal to 90° in order to adapt the power train to restricted structural space in the vehicle. For such applications, instead of the spur gearing or chain drive, bevel gearing (if necessary with hypoid teeth) or even spur gearing with beveloid teeth can be provided. Vehicles with coaxial drive input and output shafts ("standard drive") are also widely used. Essential features of the proposed component arrangements and design details according to the invention can also be appropriately and simply adopted with automatic transmissions of that type, which have coaxial drive input and output shafts. In this case, therefore, it is appropriate for the drive output shaft (which is coaxial with the input shaft) to be arranged on the side of the third planetary gearwheel assembly RS3 facing away from the second planetary gearwheel assembly RS2, on the side of the automatic transmission where the brake A is also arranged. Thus, the drive output shaft passes centrally through both the brake A and the third planetary gearwheel assembly RS3.

As already mentioned, the transmission schemes on which FIGS. 3 to 20 are based for the kinematic clutch of the gearwheel assembly elements of the three individual planetary gearwheel assemblies to one another and to the five shift control elements and the drive input and output shafts of the automatic transmission are to be regarded as examples only. From the prior art of DE 199 12 480 A1 a modified kinematic clutch of individual gearwheel assembly elements is known, in which, in contrast to the previous kinematic gear assembly clutch on which FIGS. 3 to 20 are based, the annular gearwheel HO1 of the first planetary gearwheel assembly RS1 and the web ST2 of the second planetary gearwheel assembly RS2 and the output shaft AB are permanently connected together, and the web ST3 of the third planetary gearwheel assembly RS3 is connected permanently to the annular gearwheel HO2 of the second planetary gearwheel assembly RS2 while the web ST1 of the first planetary gearwheel assembly RS1 is permanently connected to the annular gearwheel HO3 of the third planetary gearwheel assembly RS3, with otherwise unchanged kinematic clutch of the three individual planetary gearwheel assemblies RS1, RS2, RS3 to the five shift control elements A to E and to the drive input shaft. A person with knowledge of the field will know how to adopt, appropriately and as needed, the features essential to the invention and relating to the arrangements and design details proposed earlier in FIGS. 3 to 20 for the individual shift control elements and the spur- or chain drive on the output side, in this modified gearwheel assembly clutch as well.

Reference Numerals

A First shift control element, brake
B Second shift control element, clutch
C Third shift control element, brake
D Fourth shift control element, brake
E Fifth shift control element, clutch
FD Idler wheel of the fourth shift control element
ZYLBE Disk support of the second and fifth shift control elements
ZYLCD Outer disk support of the third and fourth shift control elements
AN Drive input shaft
AB Drive output shaft
GG Transmission housing
GW Housing wall
GN Hub attached fast to the transmission housing
GZ Housing partition wall
LAG Mounting plate
LRW Stator shaft
LRWF Flange section of the stator shaft
LRWW Shaft section of the stator shaft
LRWZ Cylindrical section of the stator shaft
LRWN Hub section of the stator shaft
LRWN1 Hub section of the stator shaft near the flange
LRWN2 Hub section of the stator shaft near the planetary gearwheel assembly
NAN Drive input speed sensor
NAB Drive output speed sensor
PSR Parking brake gear
ZYL Cylinder
STST Spur gear stage, spur gearing
STR1 First spur gearwheel of the spur gearing stage
STR2 Second spur gearwheel of the spur gearing stage
STR3 Third spur gearwheel of the spur gearing stage
STRL1 Mounting of the first spur gearwheel of the spur gearing stage
STRN1 Hub of the first spur gearwheel of the spur gearing stage
DIFF Differential
KT Chain
KTR1 (Driven, first) sprocket wheel
KTRL1 Radial bearing of the (first) sprocket wheel
KTRL2 Axial bearing of the (first) sprocket wheel on the housing side
KTRL3 Axial bearing of the (first) sprocket wheel on the shift control element side
KTRN1 Hub section of the (first) sprocket wheel
KTRS1 Disk-shaped section of the (first) sprocket wheel
KTRZ1 Cylindrical section of the (first) sprocket wheel
RS1 First planetary gearwheel assembly
HO1 Annular gearwheel of the first planetary gearwheel assembly
SO1 Sun gearwheel of the first planetary gearwheel assembly
ST1 Web of the first planetary gearwheel assembly
PL1 Planetary gearwheel of the first planetary gearwheel assembly
SOW1 Sun shaft of the first planetary gearwheel assembly
STB11 First web plate of the first planetary gearwheel assembly
STB12 Second web plate of the first planetary gearwheel assembly
STW1 Web shaft of the first planetary gearwheel assembly
RS2 Second planetary gearwheel assembly
HO2 Annular gearwheel of the second planetary gearwheel assembly
SO2 Sun gearwheel of the second planetary gearwheel assembly
ST2 Web of the second planetary gearwheel assembly
PL2 Planetary gearwheel of the second planetary gearwheel assembly
RS3 Third planetary gearwheel assembly
HO3 Annular gearwheel of the third planetary gearwheel assembly
SO3 Sun gearwheel of the third planetary gearwheel assembly
ST3 Web of the third planetary gearwheel assembly
PL3 Planetary gearwheel of the third planetary gearwheel assembly
SOW3 Sun shaft of the third planetary gearwheel assembly
STB3 Web plate of the third planetary gearwheel assembly
STW3 Web shaft of the third planetary gearwheel assembly
100 Disks of the first shift control element
110 Servo device of the first shift control element
111 Pressure space of the servo device of the first shift control element
113 Restoring element of the servo device of the first shift control element
114 Piston of the servo device of the first shift control element
118 Pressure medium feed to the pressure space of the first shift control element
120 Input element of the first shift control element
121 Cylindrical section of the input element of the first shift control element
122 Disk-shaped section of the input element of the first shift control element
130 Output element of the first shift control element
133 Hub of the output element of the first shift control element
200 Disks of the second shift control element
201 Locking ring for the disks of the second shift control element
202 Material ridge, abutment surface for the disks of the second shift control element
210 Servo device of the second shift control element
211 Pressure space of the servo device of the second shift control element
212 Pressure equalization space of the servo device of the second shift control element
212a Coolant space
213 Restoring element of the servo device of the second shift control element
214 Piston
215 Compression disk
216 Actuating rod
217 Cylindrical support disk of the servo device of the second shift control element
218 Pressure medium feed to the pressure space of the second shift control element
219 Lubricant feed to the pressure equalization space of the second shift control element
219a Coolant bore
219b Coolant feed to the disks of the second shift control element 220 Input element of the second shift control element
222 Cylindrical section of the input element of the second shift control element
222 Disk-shaped section of the input element of the second shift control element
230 Output element of the second shift control element
231 Cylindrical section of the output element of the second shift control element
232 Disk-shaped section of the output element of the second shift control element
300 Disks of the third shift control element
303 Brake band of the third shift control element
310 Servo device of the third shift control element
311 Pressure space of the servo device of the third shift control element
313 Restoring element of the servo device of the third shift control element
313a Pressure plate
313b Annular section of the pressure plate
313c Slotted section of the pressure plate
314 Piston of the servo device of the third shift control element
318 Pressure medium feed to the pressure space of the third shift control element
320 Input element of the third shift control element
321 Cylindrical section of the input element of the third shift control element
322 Disk-shaped section of the input element of the third shift control element
330 Output element of the third shift control element
400 Disks of the fourth shift control element
410 Servo device of the fourth shift control element
411 Pressure space of the servo device of the fourth shift control element
413 Restoring element of the servo device of the fourth shift control element
414 Piston of the servo device of the fourth shift control element
420 Input element of the fourth shift control element
421 Cylindrical section of the input element of the fourth shift control element
430 Output element of the fourth shift control element
500 Disks of the fifth shift control element
501 Locking ring for the disks of the fifth shift control element
510 Servo device of the fifth shift control element
511 Pressure space of the servo device of the fifth shift control element
512 Pressure equalization space of the fifth shift control element
513 Restoring element of the servo device of the fifth shift control element
514 Piston of the servo device of the fifth shift control element
515 Compression disk of the servo device of the fifth shift control element
518 Pressure medium feed to the pressure space of the fifth shift control element
519 Lubricant feed to the pressure equalization space of the fifth shift control element
520 Input element of the fifth shift control element
521 (First) cylindrical section of the input element of the fifth shift control element
522 (First) disk-shaped section of the input element of the fifth shift control element
523 Hub of the input element of the fifth shift control element
524 Second cylindrical section of the input element of the fifth shift control element
525 Second disk-shaped section of the input element of the fifth shift control element
526 First cylindrical hub section of the hub of the input element of the fifth shift control element
527 Second cylindrical hub section of the hub of the input element of the fifth shift control element
530 Output element of the fifth shift control element
531 Cylindrical section of the output element of the fifth shift control element
532 Disk-shaped section of the output element of the fifth shift control element

The invention claimed is:

1. A multi-stage automatic transmission comprising:
a drive input shaft (AN) and a drive output shaft (AB);
at least first, second and third individual planetary gearwheel assemblies (RS1, RS2, RS3), and at least first, second, third, fourth and fifth shift control elements (A to E);
the first, the second and the third planetary gearwheel assemblies (RS1, RS2, RS3) are arranged coaxially in series next to one another with the second planetary gearwheel assembly (RS2) arranged spatially between the first and the third planetary gearwheel assemblies (RS1, RS3);
a sun gearwheel (SO3) of the third planetary gearwheel assembly (RS3) can be fixed relative to a transmission housing (GG) of the multi-stage automatic transmission by the first shift control element (A);
the drive input shaft (AN) is connected to a sun gearwheel (SO2) of the second planetary gearwheel assembly (RS2);
the drive input shaft (AN) can be connected to one of a sun gearwheel (SO1) of the first planetary gearwheel assembly (RS1) by the second shift control element (B) and to a web (ST1) of the first planetary gearwheel assembly (RS1) by the fifth shift control element (E);
the sun gearwheel (SO1) of the first planetary gearwheel assembly (RS1) is affixable to the transmission housing (GG) by the third shift control element (C) and the web (ST1) of the first planetary gearwheel assembly (RS1) is affixable to the transmission housing (GG) by the fourth shift control element (D);
the drive output shaft (AB), an annular gearwheel (HO1) of the first planetary gearwheel assembly (RS1) and a web (ST3) of the third planetary gearwheel assembly (RS3) are all connected with one another, a web (ST2) of the second planetary gearwheel assembly (RS2) is connected with an annular gearwheel (HO3) of the third planetary gearwheel assembly (RS3), and the web (ST1) of the first planetary gear wheel assembly (RS1) is connected with an annular gearwheel (HO2) of the second planetary gearwheel assembly (RS2);
the second and the fifth shift control elements (B, E) are combined as one structural group having respective second and fifth disk packs (200, 500) of the second and the fifth shift control elements (B, E) and respective second and fifth servo devices (210, 510) of the second and the fifth shift control elements (B, E) for actuating the respective second and the fifth disk packs (200, 500);
a common disk support (ZYLBE), for the second and the fifth shift control elements (B, E), for holding the second and the fifth disk packs (200, 500);
the common disk support (ZYLBE) for the second and the fifth shift control elements (B, E) forms a coupling space, within which the fifth disk pack (500) of the fifth shift control element (E) and the fifth servo device (510) of the fifth shift control element (E) are arranged;

the second and the fifth servo devices (210, 510) of the second and the fifth shift control elements (B, E) each comprise at least a respective pressure space (211, 511) and a piston (214, 514);

the respective pressure spaces (211, 511) of the second and the fifth servo devices (210, 510) are at least partially enclosed by the common disk support (ZYBLE) and are separated from one another by a surface of the common disk support (ZYLBE); and the pressure spaces (211, 511) of the second and the fifth servo devices (210, 510) are both spatially arranged on a side of the fifth disk pack (500) of the fifth shift control element (E) from which the fifth disk pack (500) of the fifth shift control element (E) is actuated.

2. The multi-stage automatic transmission according to claim 1, wherein actuation directions of the second and the fifth servo devices (210, 510) when the respective second and fifth disk packs (200, 500) is actuated, are opposite to one another, and the pressure spaces (211, 511) of the second and the fifth servo devices (210, 510) of the second and the fifth shift control elements (B, E) are arranged directly adjacent to one another, and the piston (214) of the second servo device (210) of the second shift control element (B) spans completely across the second disk pack (200) of the second shift control element (B) in an axial direction, radially on the outside.

3. The multi-stage automatic transmission according to claim 2, wherein the piston (214) of the second servo device (210) of the second shift control element (B) comprises an actuating rod (216), which acts upon the second disk pack (200) from a side of the second disk pack (200) which is opposite to the pressure space (211) of the second servo device (210) of the second shift control element (B).

4. The multi-stage automatic transmission according to claim 2, wherein for dynamic pressure compensation, the second servo device (210) of the second shift control element (B) comprises a respective pressure equalization space (212) which is arranged on the side of the pressure space (211) of the second servo device (210) of the second shift control element (B) opposite to the pressure space (511) of the fifth servo device (510) of the fifth shift control element (E), for dynamic pressure compensation, the fifth servo device (510) of the fifth shift control element (E) comprises a respective pressure equalization space (512) which is arranged on the side of the pressure space (511) of the fifth servo device (510) of the fifth shift control element (E) opposite to the pressure space (211) of the second servo device (210) of the second shift control element (B), and the respective pressure spaces (211, 511) of the second and the fifth servo devices (210, 510) of the second and the fifth shift control elements (B, E) are directly adjacent to the outer casing surface of the common disk support (ZYLBE) for the second and the fifth shift control elements (B, E).

5. The multi-stage automatic transmission according to claim 1, wherein the fifth servo device (510) of the fifth shift control element (E) actuates the fifth disk pack (500) of the fifth shift control element (E) axially in a direction of the first planetary gearwheel assembly (RS1), and the second servo device (210) of the second shift control element (B) actuates the second disk pack (200) of the second shift control element (B) axially in a direction away from the first planetary gearwheel assembly (RS1).

6. The multi-stage automatic transmission according to claim 1, wherein actuation directions of the second and the fifth servo devices (210, 510) of the second and the fifth shift control elements (B, E), when actuating the respective second and fifth disk packs (200, 500), are in the same direction.

7. The multi-stage automatic transmission according to claim 6, wherein the second and the fifth servo devices (210, 510) of the second and the fifth shift control elements (B, E) actuate the respective disk pack (200, 500) of the second or the fifth shift control element (B, E) axially in a direction towards the first planetary gearwheel assembly (RS1).

8. The multi-stage automatic transmission according to claim 6, wherein for dynamic pressure compensation, the second servo device (210) of the second shift control element (B) comprises a respective second pressure equalization space (212) which is arranged on the side of the pressure space (211) of the second servo device (210) of the second shift control element (B) facing towards the pressure space (511) of the fifth servo device (510) of the fifth shift control element (E), for dynamic pressure compensation, the fifth servo device (510) of the fifth shift control element (E) comprises a respective fifth pressure equalization space (512) which is arranged on the side of the pressure space (511) of the fifth servo device (510) of the fifth shift control element (E) opposite to the pressure space (211) of the second servo device (210) of the second shift control element (B), and the fifth pressure space (511) of the fifth servo device (510) of the fifth shift control element (E) and the pressure equalization space (212) of the second servo device (210) of the second shift control element (B) are directly adjacent to an outer casing surface of the common disk support (ZYLBE) for the second and the fifth shift control elements (B, E).

9. The multi-stage automatic transmission according to claim 1, wherein the second pressure space (211) of the second servo device (210) of the second shift control element (B) and the fifth pressure space (511) of the servo device (510) of the fifth shift control element (E) are arranged axially adjacent to one another.

10. The multi-stage automatic transmission according to claim 6, wherein the second servo device (210) of the second shift control element (B) is spatially arranged at least mainly radially over the fifth servo device (510) of the fifth shift control element (E), with at least one of the second pressure space (211) of the second servo device (210) of the second shift control element (B) spatially at least mainly radially over the pressure space (511) of the fifth servo device (510) of the fifth shift control element (E), and a piston (214) of the second servo device (210) of the second shift control element (B) is arranged spatially at least mainly radially over a piston (514) of the fifth servo device (510) of the fifth shift control element (E).

11. The multi-stage automatic transmission according to claim 10, wherein for dynamic pressure compensation, the second and the fifth servo devices (210, 510) of the second and the fifth shift control elements (B, E) each comprise a respective pressure equalization space (212, 512), the pressure equalization space (212) of the second servo device (210) of the second shift control element (B) is spatially arranged at least mainly radially over a pressure equalization space (512) of the fifth servo device (510) of the fifth shift control element (E), and the pressure equalization space (212) of the second servo device (210) of the second shift control element (B) is fed with lubricant not under pressure from the pressure equalization space (512) of the fifth servo device (510) of the fifth shift control element (E).

12. The multi-stage automatic transmission according to claim 1, wherein the contour of a piston (214) of the second servo device (210) of the second shift control element (B) is adapted to match an outer contour of the disk support (ZYLBE) common to the second and the fifth shift control elements (B, E).

13. The multi-stage automatic transmission according to claim 1, wherein one of the second servo device (210) of the second shift control element (B) and the fifth servo device (510) of the fifth shift control element (E) is mounted on the drive input shaft.

14. The multi-stage automatic transmission according to claim 1, wherein one of a pressure medium feed (218, 518) to the pressure space (211, 511) of at least one of the second and the fifth shift control element (B, E), and a lubricant feed (219, 519) to at least one of the pressure equalization space (212, 512) of the second and the fifth shift control element (B, E) takes place at least partly via a hub (GN) attached fast to the transmission housing.

15. The multi-stage automatic transmission according to claim 1, wherein the structural group, comprising the second and the fifth shift control elements (B, E), is arranged close to the first planetary gearwheel assembly (RS1), at least mainly axially adjacent to the first planetary gearwheel assembly (RS1) on the side thereof opposite to the second planetary gearwheel assembly (RS2).

16. The multi-stage automatic transmission according to claim 1, wherein the second disk pack (200) of the second shift control element (B) and the fifth disk pack (500) of the fifth shift control element (E) are spatially arranged one over the other, such that the second disk pack (200) of the second shift control element (B), viewed in an axial direction, is arranged at least mainly radially over the fifth disk pack (500) of the fifth shift control element (F).

17. The multi-stage automatic transmission according to claim 1, wherein the second disk pack (200) of the second shift control element (B) and the fifth disk pack (500) of the fifth shift control element (E) are spatially arranged axially next to one another on an at least similar diameter, such that the second disk pack (200) of the second shift control element (B) is positioned closer to the first planetary gearwheel assembly (RS1) than the fifth disk pack (500) of the fifth shift control element (E).

18. The multi-stage automatic transmission according to claim 1, wherein the second disk pack (200) of the second shift control element (B) and the fifth disk pack (500) of the fifth shift control element (E) are spatially arranged axially next to one another on different diameters, such that the second disk pack (200) of the second shift control element (B) has a larger diameter than the fifth disk pack (500) of the fifth shift control element (E) and, viewed in an axial direction, is arranged at least partly over the first planetary gearwheel assembly (RS1), and such that the fifth disk pack (500) of the fifth shift control element (F), viewed in a radial direction, is arranged at least partly axially adjacent to the first planetary gearwheel assembly (RS1).

19. The multi-stage automatic transmission according to claim 1, wherein the common disk support (ZYLBE) for the second and the fifth shift control elements (B, E) is formed at the same time as the inner disk support for the second shift control element (B) and as the outer disk support for the fifth shift control element (E), for holding lining disks of the second disk pack (200) of the second shift control element (B) and outer disks of the fifth disk pack (500) of the fifth shift control element (E).

20. The multi-stage automatic transmission according to claim 1, wherein the second and the fifth shift control elements (B, E) can be actuated completely independently of one another, and the actuation of the second disk pack (200) of the second shift control element (B) has no mechanical reaction effect on the fifth disk pack (500) of the fifth shift control element (E) and the actuation of the fifth disk pack (500) of the fifth shift control element (E) has no mechanical reaction effect on the second disk pack (200) of the second shift control element (B).

21. The multi-stage automatic transmission according to claim 1, wherein viewed axially, the fourth shift control element (D) is arranged in an radially area over the first, the second and the third planetary gearwheel assemblies (RS1, RS2, RS3).

22. The multi-stage automatic transmission according to claim 1, wherein viewed axially, the third shift control element (C) is arranged in an area radially over at least the first, the second and the third planetary gearwheel assemblies (RS1, RS2, RS3), with the third shift control element (C) located closer to the first planetary gearwheel assembly (RS1) than the fourth shift control element (D).

23. The multi-stage automatic transmission according to claim 1, wherein viewed axially, the third shift control element (C) is arranged at least partially radially over the second shift control element (B).

24. The multi-stage automatic transmission according to claim 1, wherein third and fourth disk packs (300, 400) of the third and the third fourth shift control elements (C, D) are arranged next to one another and have at least similar diameter.

25. The multi-stage automatic transmission according to claim 1, wherein the actuation direction of a third servo device (310) of the third shift control element (C) and the actuation direction of a fourth servo device of the fourth shift control element (D) when the respective shift control element (C, D) is closed, are in opposite directions.

26. The multi-stage automatic transmission according to claim 1, wherein the actuation direction of a third servo device (310) of the third shift control element (C) and the actuation direction of a fourth servo device of the fourth shift control element (D) when the respective shift control element (C, D) is closed, are in the same direction.

27. The multi-stage automatic transmission according to claim 1, wherein at least one of a third and a fourth servo devices (310, 410) of the third and the fourth shift control elements (C, D) is arranged axially between the disk packs (300, 400) of the third and the fourth shift control elements (C, D).

28. The multi-stage automatic transmission according to claim 1, wherein the structural group, comprising the second and the fifth shift control elements (B, E), is immediately adjacent to one of an outer wall of the transmission housing (GG) and to a housing cover attached rotationally fast to the transmission housing (GG).

29. The multi-stage automatic transmission according to claim 1, wherein the drive input shaft (AN) and the drive output shaft (AB) are not coaxial with one another, and the drive input shaft (AN) and the drive output shaft (AB) are on of axis-parallel and extend at an angle to one another.

30. The multi-stage automatic transmission according to claim 1, wherein one of a spur gearing stage STST and a chain drive is provided by which the annular gearwheel (HO1) of the first planetary gearwheel assembly (RS1) and the web (ST3, ST") of one of the third or second planetary gearwheel assembly (RS3, RS2), connected to the annular gearwheel (HO1), are in active connection with the drive output shaft (AB), and one of a first spur gearwheel (STR1) of the spur gearing stage (STST) and a first chain sprocket wheel (KTR1) of the chain drive is arranged axially between the third planetary gearwheel assembly (RS3) and the first shift control element (A).

31. The multi-stage automatic transmission according to claim 30, wherein one of the first spur gearwheel (STR1) of the spur gearing stage (STST) and the first chain sprocket wheel (KTR1) of the chain drive is mounted on a housing partition wall (GZ), which is arranged between one of the spur gearing stage (STST) and the chain drive and the third planetary gearwheel assembly (RS3), and the housing partition wall (GZ) is one of attached rotationally fast to the transmission housing (GG) and made as one piece with the transmission housing (GG).

32. The multi-stage automatic transmission according to claim 30, wherein one of the first spur gearwheel (STR1) of the spur gearing stage (STST) and the first chain sprocket wheel (KTR1) of the chain drive is mounted on one of a housing partition wall (GZ) and on a mounting plate (LAG), which is arranged axially between the spur gearing stage (STST) and the chain drive and the first shift control element (A), such that the housing partition wall (GZ) or mounting plate (LAG) is one of attached rotationally fast to the transmission housing (GG), made as one piece with the transmission housing (GG), and attached rotationally fasttoa housing wall (GW) which is fixed to the transmission housing.

33. The multi-stage automatic transmission according to claim 30, wherein one of the sun gearwheel (SO3) of the third planetary gearwheel assembly (RS3) and a sun shaft (SOW3) is in active connection with the sun gearwheel (SO3) of the third planetary gearwheel assembly (RS3), and a hub of the input element (120) of the first shift control element passes centrally through one of the housing partition wall (GZ) and the first spur gearwheel (STR1) of the spur gearing stage (STST) and the first sprocket wheel (KTR1) of the chain drive.

34. The multi-stage automatic transmission according to claim 1, wherein one of a spur gearing stage (STST) and a chain drive is provided via which the annular gearwheel (HO1) of the first planetary gearwheel assembly (RS1) and the web (ST3, ST2) of one of the third and the second planetary gearwheel assembly (RS3, RS2,) connected to the annular gearwheel (HO1), are in active connection with the drive output shaft (AB), and one of a first spur gearwheel (STR1) of the spur gearing stage (STST) and a first sprocket wheel (KTR1) of the chain drive is adjacent to one of an outer wall of the transmission housing (GG) and to a housing cover fixed thereto.

35. The multi-stage automatic transmission according to claim 34, wherein one of the first spur gearwheel (STR1) of the spur gearing stage (STST) and the first sprocket wheel (KTR1) of the chain drive is mounted on at least one of the outer wall of the transmission housing (GG), the housing cover attached thereto and on the drive input shaft (AN).

36. The multi-stage automatic transmission according to claim 34, wherein the first shift control element (A) is spatially arranged between one of the third planetary gearwheel assembly (RS3) and the first spur gearwheel (STR1) of the spur gearing stage (STST) and between the third planetary gearwheel assembly (RS3) and the first sprocket wheel (KTR1) of the chain drive.

37. The multi-stage automatic transmission according to claim 34, wherein the first shift control element (A) is spatially arranged at least partially over the third planetary gearwheel assembly (RS3).

38. The multi-stage automatic transmission according to claim 34, wherein the first shift control element (A) is spatially arranged within a cylindrical space, which is formed by the first sprocket wheel (KTR1) of the chain drive, such that the first shift control element (A) is axially adjacent to the third planetary gearwheel assembly (RS3).

39. The multi-stage automatic transmission according to claim 38, wherein a first disk pack (100) of the first shift control element (A) is axially adjacent to the third planetary gearwheel assembly (RS3).

40. The multi-stage automatic transmission according to claim 1, wherein the drive input (AN) and drive output (AB) shafts are coaxial.

41. The multi-stage automatic transmission according to claim 40, wherein the drive output shaft (AB), in active connection with the annular gearwheel (HO1) of the first planetary gearwheel assembly (RS1), passes centrally through the third planetary gearwheel assembly (RS3) in an axial direction.

42. The multi-stage automatic transmission according to claim 40, wherein the first shift control element (AS) is spatially arranged on a side of the third planetary gearwheel assembly (RS3) facing away from the second planetary gearwheel assembly (RS2).

43. Multi-stage automatic transmission according to claim 40, wherein the drive output shaft (AB), in active connection with the annular gearwheel (HO1) of the first planetary gearwheel assembly (RS1), passes centrally through a coupling space of the first shift control element (A) in an axial direction.

44. The multi-stage automatic transmission according to claim 40, wherein the first shift control element (A) is spatially arranged at least partially radially over the third planetary gearwheel assembly (RS3).

45. The multi-stage automatic transmission according to claim 1, wherein a first servo device (110) of the first shift control element (A) is integrated in one of the transmission housing (GG) and in a housing wall (GW) attached thereto.

46. The multi-stage automatic transmission according to claim 1, wherein an outer disk support is integrated in one of the transmission housing (GG) and in a housing wall (GW) fixed thereto as the output element (130) of the first shift control element (A).

47. The multi-stage automatic transmission according to claim 1, wherein by the selective engagement of desired ones of the first, the second, the third, the fourth and the fifth shift control elements (A to E) at least six forward gears can be engaged in such manner that to shift up or down from one gear to the next gear, in each case only one shift control element at the time is disengaged, and a different shift control element is engaged.

48. The multi-stage automatic transmission according to claim 1, wherein in a first forward gear the first and the fourth shift control elements (A, D) are engaged, in a second forward gear the first and the third shift control elements (A, C) are engaged, in a third forward gear the first and the second shift control elements (A, B) are engaged, in a fourth forward gear the first and the fifth shift control elements (A, E) are engaged, in a fifth forward gear the second and the fifth shift control elements (B, E) are engaged, in the sixth forward gear the third and the fifth shift control elements (C, E)are engaged, and in a reverse gear the second and the fourth shift control elements (B, D) are engaged.

49. A multi-stage automatic transmission comprising:
a drive input shaft (AN) and a drive output shaft (AB);
at least first, second and third individual planetary gearwheel assemblies (RS1, RS2, RS3), and at least first, second, third, fourth and fifth shift control elements (A to E);
the first, the second and the third planetary gearwheel assemblies (RS1, RS2, RS3) are arranged coaxially in series next to one another with the second planetary gearwheel assembly (RS2) arranged spatially between the first and the third planetary gearwheel assemblies (RS1, RS3);
a sun gearwheel (SO3) of the third planetary gearwheel assembly (RS3) is affixable to a transmission housing (GG) of the multi-stage automatic transmission by the first shift control element (A);
the drive input shaft (AN) is connected to a sun gearwheel (SO2) of the second planetary gearwheel assembly (RS2);
the drive input shaft (AN) is connectable to a sun gearwheel (SO1) of the first planetary gearwheel assembly (RS1) by the second shift control element (B) and to a web (ST1) of the first planetary gearwheel assembly (RS1) by the fifth shift control element (E);
the sun gearwheel (SO1) of the first planetary gearwheel assembly (RS1) is affixable to the transmission housing (GG) by the third shift control element (C) and the web (ST1) of the first planetary gearwheel assembly (RS1) is affixable to the transmission housing (GG) by the fourth shift control element (D);
the drive output shaft (AB), an annular gearwheel (HOl) of the first planetary gearwheel assembly (RS1) and a web (ST3) of the third planetary gearwheel assembly (RS3) are all connected with one another, a web (ST2) of the second planetary gearwheel assembly (RS2) is connected with an annular gearwheel (HO3) of the third planetary gearwheel assembly (RS3), and the web STi of the first planetary gear wheel assembly (RS1) is connected with an annular gearwheel (HO2) of the second planetary gearwheel assembly (RS2);
the second and the fifth shift control elements (B, E) are combined as one structural group having respective second and fifth disk packs (200, 500) of the second and the fifth shift control elements (B, E) and respective second and fifth servo devices (210, 510) of the second and the fifth shift control elements (B, E) for actuating the respective second and fifth disk packs (200, 500);
a common disk support (ZYLBE), for the second and the fifth shift control elements (B, E), for holding the second and the fifth disk packs (200, 500);
the common disk support (ZYLBE) forthe second and the fifth shift control elements (B, E) forms a coupling space, within which the fifth disk pack (500) of the fifth shift control element (E) and the fifth servo device (510) of the fifth shift control element (E) are arranged;
the second and the fifth servo devices (210, 510) of the second and the fifth shift control elements (B, E) each comprise at least a respective pressure space (211, 511) and a piston (214, 514);
the respective pressure spaces (211, 511) of the second and the fifth servo devices (210, 510) are at least partially enclosed by the common disk support (ZYBLE) and are separated from one another by an outer casing surface of the common disk support (ZYLBE) forthe second and the fifth shift control elements (B, E); and
wherein the common disk support (ZYLBE) for the second and the fifth shift control elements (B, E) is formed as an outer disk support of the second and the fifth shift control elements (B, E), to hold outer disks of the disk packs (200, 500) of the second and the fifth shift control elements (B, E).

50. A multi-stage automatic transmission comprising:
a drive input shaft (AN) and a drive output shaft (AB);
at least first, second and third individual planetary gearwheel assemblies (RS1, RS2, RS3), and at least first, second, third, fourth and fifth shift control elements (A to E);
the first, the second and the third planetary gearwheel assemblies (RS1, RS2, RS3) are arranged coaxially in series next to one another, and the second planetary gearwheel assembly (RS2) is arranged spatially between the first and the third planetary gearwheel assemblies (RS1, RS3);
a sun gearwheel (SO3) of the third planetary gearwheel assembly (RS3) is affixable to a transmission housing (GG) of the multi-stage automatic transmission by the first shift control element (A);
the drive input shaft (AN) is connected to a sun gearwheel (SO2) of the second planetary gearwheel assembly (RS2);
the drive input shaft (AN) is connectable to one of a sun gearwheel (SO1) of the first planetary gearwheel assembly (RS1) by the second shift control element (B) and to a web (ST1) of the first planetary gearwheel assembly (RS1) by the fifth shift control element (E);
the sun gearwheel (SO1) of the first planetary gearwheel assembly (RS1) is affixable to the transmission housing (GG) by the third shift control element (C) and the web (ST1) of the first planetary gearwheel assembly (RS1) is affixable to the transmission housing (GG) by the fourth shift control element (D);
the drive output shaft (AB), an annular gearwheel (HO1) of the first planetary gearwheel assembly (RS1) and aweb (ST3) of the third planetary gearwheel assembly (RS3) are all connected with one another, a web (ST2) of the second planetary gearwheel assembly (RS2) is connected with an annular gearwheel (HO3) of the third planetary gearwheel assembly (RS3), and the web (ST1) of the first planetary gear wheel assembly (RS1) is connected with an annular gearwheel (HO2) of the second planetary gearwheel assembly (RS2);
the second and the fifth shift control elements (B, E) are combined as one structural group having respective second and fifth disk packs (200, 500) of the second and the fifth shift control elements (B, E) and respective second and fifth servo devices (210, 510) of the second and the fifth shift control elements (B, E) for actuating the respective second and fifth disk packs (200, 500); and
a common disk support (ZYLBE), for the second and the fifth shift control elements (B, E), for holding the second and fifth disk packs (200, 500);
the common disk support (ZYLBE) for the second and the fifth shift control elements (B, E) forms a coupling space, within which the fifth disk pack (500) of the fifth shift control element (E) and the fifth servo device (510) of the fifth shift control element (E) are arranged;
the second and the fifth servo devices (210, 510) of the second and the fifth shift control elements (B, E) each comprise at least a respective pressure space (211, 511) and a piston (214, 514); and the respective pressure spaces (211, 511) of the second and the fifth servo devices (210, 510) are at least partially enclosed by the common disk support (ZYBLE) and are separated from one another by a common partition of the common disk support (ZYLBE).

* * * * *